(12) United States Patent
Togashi et al.

(10) Patent No.: US 7,298,604 B2
(45) Date of Patent: Nov. 20, 2007

(54) MULTILAYER CAPACITOR AND METHOD OF ADJUSTING EQUIVALENT SERIES RESISTANCE OF MULTILAYER CAPACITOR

(75) Inventors: Masaaki Togashi, Nikaho (JP); Taisuke Ahiko, Nikaho (JP)

(73) Assignee: TDK Corporation, Tokyo (JP)

( * ) Notice: Subject to any disclaimer, the term of this patent is extended or adjusted under 35 U.S.C. 154(b) by 144 days.

(21) Appl. No.: 11/334,528

(22) Filed: Jan. 19, 2006

(65) Prior Publication Data
US 2006/0164789 A1    Jul. 27, 2006

(30) Foreign Application Priority Data
Jan. 25, 2005    (JP)    ............................ P2005-017280

(51) Int. Cl.
*H01G 4/228*    (2006.01)
(52) U.S. Cl. ............................... 361/306.3; 361/321.1; 361/321.2; 361/306.1; 361/311; 361/313; 361/303
(58) Field of Classification Search ............ 361/306.3, 361/306.1, 306.2, 321.1, 321.2, 302–305, 361/308.1, 308.3, 311–313, 321.4, 321.5, 361/301.1, 301.4
See application file for complete search history.

(56) References Cited

U.S. PATENT DOCUMENTS

| | | | |
|---|---|---|---|
| 5,835,340 A * | 11/1998 | Wada et al. | 361/321.5 |
| 6,243,253 B1 * | 6/2001 | DuPre et al. | 361/306.3 |
| 6,430,025 B2 * | 8/2002 | Naito et al. | 361/303 |
| 6,765,781 B2 * | 7/2004 | Togashi | 361/306.3 |
| 6,853,267 B2 * | 2/2005 | Chiba et al. | 333/185 |
| 6,914,767 B2 * | 7/2005 | Togashi et al. | 361/303 |
| 6,940,710 B1 * | 9/2005 | Lee et al. | 361/321.2 |

FOREIGN PATENT DOCUMENTS

| | | |
|---|---|---|
| JP | A 2001-185441 | 7/2001 |
| JP | A 2004-47983 | 2/2004 |

* cited by examiner

*Primary Examiner*—Nguyen T. Ha
(74) *Attorney, Agent, or Firm*—Oliff & Berridge, PLC

(57) ABSTRACT

A multilayer capacitor includes a multilayer body in which dielectric layers and inner electrodes are alternately laminated, and terminal electrodes formed on the multilayer body. The inner electrodes include first inner electrodes and second inner electrodes alternately arranged. The terminal electrodes include at least three terminal electrodes. The first inner electrodes are electrically connected to each other via a through-hole conductor. The second inner electrodes are electrically connected to each other via a through-hole conductor. At least two first inner electrodes in the first inner electrodes are electrically connected via a lead conductor to at least two respective terminal electrodes whose number is smaller than the total number of the terminal electrodes by at least 1 in the at least three terminal electrodes. At least one second inner electrode in the second inner electrodes is electrically connected via a lead conductor to the remainder of terminal electrodes other than the terminal electrodes electrically connected to the first inner electrodes via the lead conductor. An equivalent series resistance is set to a desirable value by adjusting the number of at least one species of the first and second inner electrodes electrically connected to the terminal electrodes via the lead conductors.

36 Claims, 32 Drawing Sheets

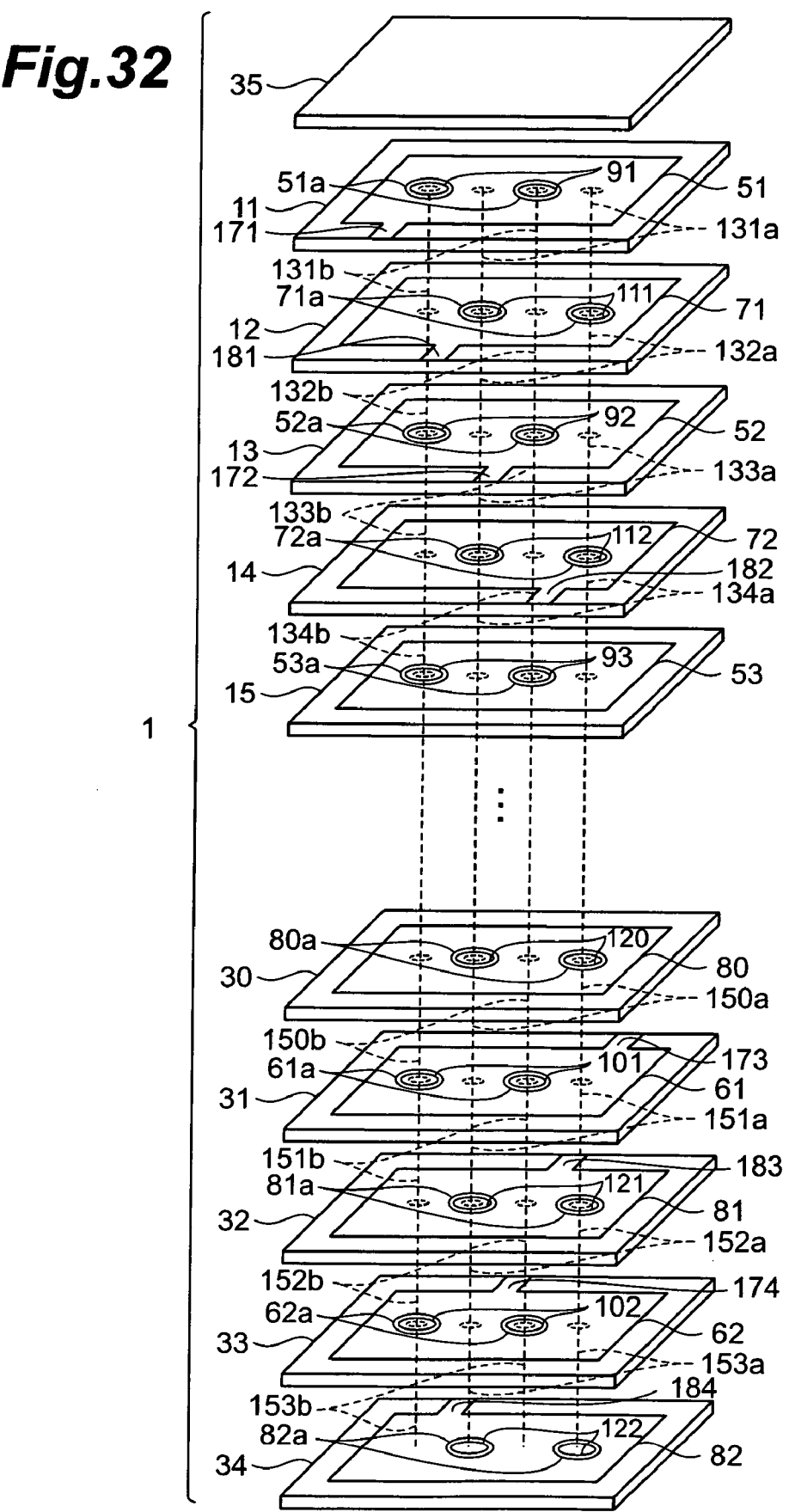

MULTILAYER CAPACITOR AND METHOD OF ADJUSTING EQUIVALENT SERIES RESISTANCE OF MULTILAYER CAPACITOR

BACKGROUND OF THE INVENTION

1. Field of the Invention

The present invention relates to a multilayer capacitor and a method of adjusting an equivalent series resistance of a multilayer capacitor.

2. Related Background Art

Known as this kind of multilayer capacitor is one comprising a multilayer body in which a plurality of dielectric layers and a plurality of inner electrodes are alternately laminated, and a plurality of terminal electrodes formed on the multilayer body (see, for example, Japanese Patent Application Laid-Open Nos. 2001-185441 and 2004-47983).

Power supplies for central processing units (CPUs) mounted in digital electronic devices have been increasing their load current while lowering their voltage. Therefore, it has become quite difficult to suppress the fluctuation in power supply voltage under a tolerable level in response to a drastic change in load current, whereby a multilayer capacitor known as decoupling capacitor has come into connection with a power supply as described in Japanese Patent Application Laid-Open Nos. 2001-185441. At the time when the load current fluctuates transiently, the multilayer capacitor supplies a current to the CPU, thereby suppressing the fluctuation of the power supply voltage.

In recent years, as the CPUs have further been raising their operating frequencies, the load current has been becoming faster and greater. Therefore, the multilayer capacitor used in the decoupling capacitor is demanded to increase its capacity and equivalent series resistance (ESR). The multilayer capacitor disclosed in Japanese Patent Application Laid-Open No. 2004-47983 employs a terminal electrode having a multilayer structure including an inner resistance layer, thereby increasing the ESR.

SUMMARY OF THE INVENTION

However, the following problem exists in the multilayer capacitor disclosed in Japanese Patent Application Laid-Open No. 2004-47983 when adjusting the equivalent series resistance to a desirable value. Namely, for adjusting the equivalent series resistance to a desirable value, the multilayer capacitor disclosed in Japanese Patent Application Laid-Open No. 2004-47983 must regulate the thickness of the inner resistance layer included in the terminal electrode and the material composition of the inner resistance layer, which makes it quite difficult to control the equivalent series resistance.

It is an object of the present invention to provide a multilayer capacitor and a method of adjusting an equivalent series resistance of a multilayer capacitor, which can regulate the equivalent series resistance easily with a high precision.

In a typical multilayer capacitor, all the inner electrodes are connected to their corresponding terminal electrodes via lead conductors. Consequently, the lead conductors exist by the number of inner electrodes, thereby lowering the equivalent series resistance. As the number of layers of the dielectric layers and inner electrodes is made greater in order to increase the capacity of the multilayer capacitor, the number of lead conductors becomes greater. Since resistance components of lead conductors are connected to the terminal electrodes in parallel, the equivalent series resistance of the multilayer capacitor further decreases as the number of lead conductors increases. Thus, the demand for increasing the capacity of the capacitor and the demand for increasing the equivalent series resistance contradict each other.

Therefore, the inventors diligently conducted studies about multilayer capacitors which can satisfy both of the demands for increasing the capacity and equivalent series resistance. As a result, the inventors have found a new fact that, even when the number of dielectric layers and the number of laminated inner electrodes are the same, the equivalent series resistance can be adjusted to a desirable value if the inner electrodes are connected to each other with a through-hole conductor while making it possible to change the number of lead conductors. The inventors have also found a new fact that the equivalent series resistance can be adjusted to a desirable value if the inner electrodes are connected to each other with a through-hole conductor while making it possible to change positions of lead conductors in the laminating direction of the multilayer body. When the number of lead conductors is made smaller than that of inner electrodes in particular, the adjustment can be made such as to increase the equivalent series resistance.

In view of such results of studies, in one aspect, the present invention provides a multilayer capacitor comprising a multilayer body in which a plurality of dielectric layers and a plurality of inner electrodes are alternately laminated, and a plurality of terminal electrodes formed on the multilayer body; wherein the plurality of inner electrodes include a plurality of first inner electrodes and a plurality of second inner electrodes alternately arranged; wherein the plurality of terminal electrodes include at least three terminal electrodes; wherein the plurality of first inner electrodes are electrically connected to each other via a through-hole conductor; wherein the plurality of second inner electrodes are electrically connected to each other via a through-hole conductor; wherein at least two first inner electrodes in the plurality of first inner electrodes are electrically connected via a lead conductor to at least two respective terminal electrodes whose number is smaller than the total number of the terminal electrodes by at least 1 in the at least three terminal electrodes; wherein at least one second inner electrode in the plurality of second inner electrodes is electrically connected via a lead conductor to the remainder of terminal electrodes other than the terminal electrodes electrically connected to the first inner electrodes via the lead conductor; and wherein an equivalent series resistance is set to a desirable value by adjusting the number of at least one species of the first and second inner electrodes electrically connected to the terminal electrodes via the lead conductors.

In another aspect, the present invention provides a method of adjusting an equivalent series resistance of a multilayer capacitor comprising a multilayer body in which a plurality of dielectric layers and a plurality of inner electrodes are alternately laminated, and a plurality of terminal electrodes formed on the multilayer body; wherein the plurality of inner electrodes include a plurality of first inner electrodes and a plurality of second inner electrodes alternately arranged; and wherein the plurality of terminal electrodes include at least three terminal electrodes; the method comprising the steps of electrically connecting the plurality of first inner electrodes to each other via a through-hole conductor; electrically connecting the plurality of second inner electrodes to each other via a through-hole conductor; electrically connecting, in the plurality of first inner electrodes, at least two first inner electrodes via a lead conductor to at least two respective terminal electrodes whose number is smaller than the total number of the terminal electrodes by at least 1 in the at least three terminal electrodes; electrically connecting, in the plurality of second inner electrodes, at least one second inner electrode via a lead conductor to the remainder of terminal electrodes other than the terminal electrodes electrically connected to the first inner electrodes; and setting the equivalent series resistance to a desirable value by adjusting the number of at least one species of the first and second inner electrodes electrically connected to the terminal electrodes via the lead conductors.

By adjusting the number of at least one species of the first and second inner electrodes electrically connected to the terminal electrodes via the lead conductors, each of the multilayer capacitor and method of adjusting an equivalent series resistance of a multilayer capacitor in accordance with these aspects of the present invention sets the equivalent series resistance to a desirable value. As a result, the equivalent series resistance can be regulated easily with a high precision.

In still another aspect, the present invention provides a multilayer capacitor comprising a multilayer body in which a plurality of dielectric layers and a plurality of inner electrodes are alternately laminated, and a plurality of terminal electrodes formed on the multilayer body; wherein the plurality of inner electrodes include a plurality of first inner electrodes and a plurality of second inner electrodes alternately arranged; wherein the plurality of terminal electrodes include at least three terminal electrodes; wherein the plurality of first inner electrodes are electrically connected to each other via a through-hole conductor; wherein the plurality of second inner electrodes are electrically connected to each other via a through-hole conductor; wherein at least two first inner electrodes in the plurality of first inner electrodes are electrically connected via a lead conductor to at least two respective terminal electrodes whose number is smaller than the total number of the terminal electrodes by at least 1 in the at least three terminal electrodes; wherein at least one second inner electrode in the plurality of second inner electrodes is electrically connected via a lead conductor to the remainder of terminal electrodes other than the terminal electrodes electrically connected to the first inner electrodes via the lead conductor; and wherein an equivalent series resistance is set to a desirable value by adjusting a position of at least one species of the first and second inner electrodes electrically connected to the terminal electrodes via the lead conductors in the laminating direction of the multilayer body.

In still another aspect, the present invention provides a method of adjusting an equivalent series resistance of a multilayer capacitor comprising a multilayer body in which a plurality of dielectric layers and a plurality of inner electrodes are alternately laminated, and a plurality of terminal electrodes formed on the multilayer body; wherein the plurality of inner electrodes include a plurality of first inner electrodes and a plurality of second inner electrodes alternately arranged; and wherein the plurality of terminal electrodes include at least three terminal electrodes; the method comprising the steps of electrically connecting the plurality of first inner electrodes to each other via a through-hole conductor; electrically connecting the plurality of second inner electrodes to each other via a through-hole conductor; electrically connecting, in the plurality of first inner electrodes, at least two first inner electrodes via a lead conductor to at least two respective terminal electrodes whose number is smaller than the total number of the terminal electrodes by at least 1 in the at least three terminal electrodes; electrically connecting, in the plurality of second inner electrodes, at least one second inner electrode via a lead conductor to the remainder of terminal electrodes other than the terminal electrodes electrically connected to the first inner electrodes; and setting the equivalent series resistance to a desirable value by adjusting a position of at least one species of the first and second inner electrodes electrically connected to the terminal electrodes via the lead conductors in the laminating direction of the multilayer body.

By adjusting a position of at least one species of the first and second inner electrodes electrically connected to the terminal electrodes via the lead conductors in the laminating direction of the multilayer body, each of the multilayer capacitor and method of adjusting an equivalent series resistance of a multilayer capacitor in accordance with these aspects of the present invention sets the equivalent series resistance to a desirable value. As a result, the equivalent series resistance can be regulated easily with a high precision.

In still another aspect, the present invention provides a multilayer capacitor comprising a multilayer body in which a plurality of dielectric layers and a plurality of inner electrodes are alternately laminated, and a plurality of terminal electrodes formed on the multilayer body; wherein the plurality of inner electrodes include a plurality of first inner electrodes and a plurality of second inner electrodes alternately arranged; wherein the plurality of terminal electrodes include at least three terminal electrodes; wherein the plurality of first inner electrodes are electrically connected to each other via a through-hole conductor; wherein the plurality of second inner electrodes are electrically connected to each other via a through-hole conductor; wherein at least one first inner electrode in the plurality of first inner electrodes is electrically connected via a lead conductor to at least two terminal electrodes whose number is smaller than the total number of the terminal electrodes by at least 1 in the at least three terminal electrodes; wherein at least one second inner electrode in the plurality of second inner electrodes is electrically connected via a lead conductor to the remainder of terminal electrodes other than the terminal electrodes electrically connected to the first inner electrode via the lead conductor; and wherein an equivalent series resistance is set to a desirable value by adjusting the number of at least one species of the first and second inner electrodes electrically connected to the terminal electrodes via the lead conductors.

In still another aspect, the present invention provides a method of adjusting an equivalent series resistance of a multilayer capacitor comprising a multilayer body in which a plurality of dielectric layers and a plurality of inner electrodes are alternately laminated, and a plurality of terminal electrodes formed on the multilayer body; wherein the plurality of inner electrodes include a plurality of first inner electrodes and a plurality of second inner electrodes alternately arranged; and wherein the plurality of terminal electrodes include at least three terminal electrodes; the method comprising the steps of electrically connecting the plurality of first inner electrodes to each other via a through-hole conductor; electrically connecting the plurality of second inner electrodes to each other via a through-hole conductor; electrically connecting, in the plurality of first inner electrodes, at least one first inner electrode via a lead conductor to at least two terminal electrodes whose number is smaller than the total number of the terminal electrodes by at least 1 in the at least three terminal electrodes; electrically connecting, in the plurality of second inner electrodes, at least one second inner electrode via a lead conductor to the remainder of terminal electrodes other than the terminal electrodes electrically connected to the first inner electrode; and setting the equivalent series resistance to a desirable value by adjusting the number of at least one species of the first and second inner electrodes electrically connected to the terminal electrodes via the lead conductors.

By adjusting the number of at least one species of the first and second inner electrodes electrically connected to the terminal electrodes via the lead conductors, each of the multilayer capacitor and method of adjusting an equivalent series resistance of a multilayer capacitor in accordance with these aspects of the present invention sets the equivalent series resistance to a desirable value. As a result, the equivalent series resistance can be regulated easily with a high precision.

In still another aspect, the present invention provides a multilayer capacitor comprising a multilayer body in which a plurality of dielectric layers and a plurality of inner electrodes are alternately laminated, and a plurality of terminal electrodes formed on the multilayer body; wherein the plurality of inner electrodes include a plurality of first inner electrodes and a plurality of second inner electrodes alternately arranged; wherein the plurality of terminal electrodes include at least three terminal electrodes; wherein the plurality of first inner electrodes are electrically connected to each other via a through-hole conductor; wherein the plurality of second inner electrodes are electrically connected to each other via a through-hole conductor; wherein at least one first inner electrode in the plurality of first inner electrodes is electrically connected via a lead conductor to at least two terminal electrodes whose number is smaller than the total number of the terminal electrodes by at least 1 in the at least three terminal electrodes; wherein at least one second inner electrode in the plurality of second inner electrodes is electrically connected via a lead conductor to the remainder of terminal electrodes other than the terminal electrodes electrically connected to the first inner electrode via the lead conductor; and wherein an equivalent series resistance is set to a desirable value by adjusting a position of at least one species of the first and second inner electrodes electrically connected to the terminal electrodes via the lead conductors in the laminating direction of the multilayer body.

In still another aspect, the present invention provides a method of adjusting an equivalent series resistance of a multilayer capacitor comprising a multilayer body in which a plurality of dielectric layers and a plurality of inner electrodes are alternately laminated, and a plurality of terminal electrodes formed on the multilayer body; wherein the plurality of inner electrodes include a plurality of first inner electrodes and a plurality of second inner electrodes alternately arranged; and wherein the plurality of terminal electrodes include at least three terminal electrodes; the method comprising the steps of electrically connecting the plurality of first inner electrodes to each other via a through-hole conductor; electrically connecting the plurality of second inner electrodes to each other via a through-hole conductor; electrically connecting, in the plurality of first inner electrodes, at least one first inner electrode via a lead conductor to at least two terminal electrodes whose number is smaller than the total number of the terminal electrodes by at least 1 in the at least three terminal electrodes; electrically connecting, in the plurality of second inner electrodes, at least one second inner electrode via a lead conductor to the remainder of terminal electrodes other than the terminal electrodes electrically connected to the first inner electrode; and setting the equivalent series resistance to a desirable value by adjusting a position of at least one species of the first and second inner electrodes electrically connected to the terminal electrodes via the lead conductors in the laminating direction of the multilayer body.

By adjusting a position of at least one species of the first and second inner electrodes electrically connected to the terminal electrodes via the lead conductors in the laminating direction of the multilayer body, each of the multilayer capacitor and method of adjusting an equivalent series resistance of a multilayer capacitor in accordance with these aspects of the present invention sets the equivalent series resistance to a desirable value. As a result, the equivalent series resistance can be regulated easily with a high precision.

Preferably, the plurality of terminal electrodes include at least two first terminal electrodes and at least two second terminal electrodes, the plurality of first inner electrodes are electrically connected to at least two first terminal electrodes via the lead conductor and through-hole conductor, and the plurality of second inner electrodes are electrically connected to at least two second terminal electrodes via the lead conductor and through-hole conductor.

Preferably, the equivalent series resistance is set to the desirable value by further adjusting the number of through-hole conductors electrically connecting the plurality of first inner electrodes to each other and the number of through-hole conductors electrically connecting the plurality of second inner electrodes to each other. In this case, the equivalent series resistance can be regulated with a higher precision.

Preferably, the plurality of first inner electrodes are connected in parallel, and the plurality of second inner electrodes are connected in parallel. In this case, even when the ohmic value fluctuates among the first or second inner electrodes, its influence on the equivalent series resistance of the multilayer capacitor as a whole is small, whereby the equivalent series resistance regulation can be restrained from lowering its precision.

In still another aspect, the present invention provides a multilayer capacitor comprising a multilayer body in which a plurality of dielectric layers and a plurality of inner electrodes are alternately laminated, and a plurality of terminal electrodes formed on the multilayer body; the multilayer capacitor having a capacitor portion including a first number of first inner electrodes and a second number of second inner electrodes alternately arranged as the plurality of inner electrodes; wherein the first number of first inner electrodes are electrically connected to each other via a through-hole conductor; wherein the second number of second inner electrodes are electrically connected to each other via a through-hole conductor; wherein, in the first number of first inner electrodes, at least one first inner electrode whose number is smaller than the first number by at least 1 is connected via a lead conductor to the respective terminal electrode in the plurality of terminal electrodes; wherein, in the second number of second inner electrodes, at least one second inner electrode whose number is smaller than the second number by at least 1 is connected via a lead conductor to the respective terminal electrode in the remainder of terminal electrodes other than the terminal electrode electrically connected to the first inner electrode via the lead conductor; and wherein an equivalent series resistance is set to a desirable value by adjusting the number of at least one species of the first and second inner electrodes electrically connected to the terminal electrodes via the lead conductors.

In still another aspect, the present invention provides a method of adjusting an equivalent series resistance of a multilayer capacitor comprising a multilayer body in which a plurality of dielectric layers and a plurality of inner electrodes are alternately laminated, and a plurality of terminal electrodes formed on the multilayer body; the multilayer capacitor having a capacitor portion including a first number of first inner electrodes and a second number of second inner electrodes alternately arranged as the plurality of inner electrodes; the method comprising the steps of electrically connecting the first number of first inner electrodes to each other via a through-hole conductor; electrically connecting the second number of second inner electrodes to each other via a through-hole conductor; electrically connecting via a lead conductor, in the first number of first inner electrodes, at least one first inner electrode whose number is smaller than the first number by at least 1 to the respective terminal electrode in the plurality of terminal electrodes; electrically connecting via a lead conductor, in the second number of second inner electrodes, at least one second inner electrode whose number is smaller than the second number by at least 1 to the respective terminal electrode in the remainder of terminal electrodes other than the terminal electrode electrically connected to the first inner electrode via the lead conductor; and setting the equivalent series resistance to a desirable value by adjusting the number of at least one species of the first and second inner electrodes electrically connected to the terminal electrodes via the lead conductors.

By adjusting the number of at least one species of the first and second inner electrodes electrically connected to the terminal electrodes via the lead conductors, each of the multilayer capacitor and method of adjusting an equivalent series resistance of a multilayer capacitor in accordance with these aspects of the present invention sets the equivalent series resistance to a desirable value. As a result, the equivalent series resistance can be regulated easily with a high precision.

In still another aspect, the present invention provides a multilayer capacitor comprising a multilayer body in which a plurality of dielectric layers and a plurality of inner electrodes are alternately laminated, and a plurality of terminal electrodes formed on the multilayer body; the multilayer capacitor having a capacitor portion including a first number of first inner electrodes and a second number of second inner electrodes alternately arranged as the plurality of inner electrodes; wherein the first number of first inner electrodes are electrically connected to each other via a through-hole conductor; wherein the second number of second inner electrodes are electrically connected to each other via a through-hole conductor; wherein, in the first number of first inner electrodes, at least one first inner electrode whose number is smaller than the first number by at least 1 is connected via a lead conductor to the respective terminal electrode in the plurality of terminal electrodes; wherein, in the second number of second inner electrodes, at least one second inner electrode whose number is smaller than the second number by at least 1 is connected via a lead conductor to the respective terminal electrode in the remainder of terminal electrodes other than the terminal electrode electrically connected to the first inner electrode via the lead conductor; and wherein an equivalent series resistance is set to a desirable value by adjusting a position of at least one species of the first and second inner electrodes electrically connected to the terminal electrodes via the lead conductors in the laminating direction of the multilayer body.

In still another aspect, the present invention provides a method of adjusting an equivalent series resistance of a multilayer capacitor comprising a multilayer body in which a plurality of dielectric layers and a plurality of inner electrodes are alternately laminated, and a plurality of terminal electrodes formed on the multilayer body; the multilayer capacitor having a capacitor portion including a first number of first inner electrodes and a second number of second inner electrodes alternately arranged as the plurality of inner electrodes; the method comprising the steps of electrically connecting the first number of first inner electrodes to each other via a through-hole conductor; electrically connecting the second number of second inner electrodes to each other via a through-hole conductor; electrically connecting via a lead conductor, in the first number of first inner electrodes, at least one first inner electrode whose number is smaller than the first number by at least 1 to the respective terminal electrode in the plurality of terminal electrodes; electrically connecting via a lead conductor, in the second number of second inner electrodes, at least one second inner electrode whose number is smaller than the second number by at least 1 to the respective terminal electrode in the remainder of terminal electrodes other than the terminal electrode electrically connected to the first inner electrode via the lead conductor; and setting the equivalent series resistance to a desirable value by adjusting a position of at least one species of the first and second inner electrodes electrically connected to the terminal electrodes via the lead conductors in the laminating direction of the multilayer body.

By adjusting a position of at least one species of the first and second inner electrodes electrically connected to the terminal electrodes via the lead conductors in the laminating direction of the multilayer body, each of the multilayer capacitor and method of adjusting an equivalent series resistance of a multilayer capacitor in accordance with these aspects of the present invention sets the equivalent series resistance to a desirable value. As a result, the equivalent series resistance can be regulated easily with a high precision.

In still another aspect, the present invention provides a multilayer capacitor comprising a multilayer body in which a plurality of dielectric layers and a plurality of inner electrodes are alternately laminated, and a plurality of terminal electrodes formed on the multilayer body; the multilayer capacitor having a capacitor portion including a first number of first inner electrodes and a second number of second inner electrodes alternately arranged as the plurality of inner electrodes; wherein the first number of first inner electrodes are electrically connected to each other via a through-hole conductor; wherein the second number of second inner electrodes are electrically connected to each other via a through-hole conductor; wherein, in the first number of first inner electrodes, at least one first inner electrode whose number is smaller than the first number by at least 1 is connected via a lead conductor to at least one terminal electrode in the plurality of terminal electrodes; wherein, in the second number of second inner electrodes, at least one second inner electrode whose number is smaller than the second number by at least 1 is connected via a lead conductor to at least one terminal electrode in the remainder of terminal electrodes other than the terminal electrode electrically connected to the first inner electrode via the lead conductor; and wherein an equivalent series resistance is set to a desirable value by adjusting the number of at least one species of the first and second inner electrodes electrically connected to the terminal electrodes via the lead conductors.

In still another aspect, the present invention provides a method of adjusting an equivalent series resistance of a multilayer capacitor comprising a multilayer body in which a plurality of dielectric layers and a plurality of inner electrodes are alternately laminated, and a plurality of terminal electrodes formed on the multilayer body; the multilayer capacitor having a capacitor portion including a first number of first inner electrodes and a second number of second inner electrodes alternately arranged as the plurality of inner electrodes; the method comprising the steps of electrically connecting the first number of first inner electrodes to each other via a through-hole conductor; electrically connecting the second number of second inner electrodes to each other via a through-hole conductor; electrically connecting via a lead conductor, in the first number of first inner electrodes, at least one first inner electrode whose number is smaller than the first number by at least 1 to at least one terminal electrode in the plurality of terminal electrodes; electrically connecting via a lead conductor, in the second number of second inner electrodes, at least one second inner electrode whose number is smaller than the second number by at least 1 to at least one terminal electrode in the remainder of terminal electrodes other than the terminal electrode electrically connected to the first inner electrode via the lead conductor; and setting the equivalent series resistance to a desirable value by adjusting the number of at least one species of the first and second inner electrodes electrically connected to the terminal electrodes via the lead conductors.

By adjusting the number of at least one species of the first and second inner electrodes electrically connected to the terminal electrodes via the lead conductors, each of the multilayer capacitor and method of adjusting an equivalent series resistance of a multilayer capacitor in accordance with these aspects of the present invention sets the equivalent series resistance to a desirable value. As a result, the equivalent series resistance can be regulated easily with a high precision.

In still another aspect, the present invention provides a multilayer capacitor comprising a multilayer body in which a plurality of dielectric layers and a plurality of inner electrodes are alternately laminated, and a plurality of terminal electrodes formed on the multilayer body; the multilayer capacitor having a capacitor portion including a first number of first inner electrodes and a second number of second inner electrodes alternately arranged as the plurality of inner electrodes; wherein the first number of first inner electrodes are electrically connected to each other via a through-hole conductor; wherein the second number of second inner electrodes are electrically connected to each other via a through-hole conductor; wherein, in the first number of first inner electrodes, at least one first inner electrode whose number is smaller than the first number by at least 1 is connected via a lead conductor to at least one terminal electrode in the plurality of terminal electrodes; wherein, in the second number of second inner electrodes, at least one second inner electrode whose number is smaller than the second number by at least 1 is connected via a lead conductor to at least one terminal electrode in the remainder of terminal electrodes other than the terminal electrode electrically connected to the first inner electrode via the lead conductor; and wherein an equivalent series resistance is set to a desirable value by adjusting a position of at least one species of the first and second inner electrodes electrically connected to the terminal electrodes via the lead conductors in the laminating direction of the multilayer body.

In still another aspect, the present invention provides a method of adjusting an equivalent series resistance of a multilayer capacitor comprising a multilayer body in which a plurality of dielectric layers and a plurality of inner electrodes are alternately laminated, and a plurality of terminal electrodes formed on the multilayer body; the multilayer capacitor having a capacitor portion including a first number of first inner electrodes and a second number of second inner electrodes alternately arranged as the plurality of inner electrodes; the method comprising the steps of electrically connecting the first number of first inner electrodes to each other via a through-hole conductor; electrically connecting the second number of second inner electrodes to each other via a through-hole conductor; electrically connecting via a lead conductor, in the first number of first inner electrodes, at least one first inner electrode whose number is smaller than the first number by at least 1 to at least one terminal electrode in the plurality of terminal electrodes; electrically connecting via a lead conductor, in the second number of second inner electrodes, at least one second inner electrode whose number is smaller than the second number by at least 1 to at least one terminal electrode in the remainder of terminal electrodes other than the terminal electrode electrically connected to the first inner electrode via the lead conductor; and setting the equivalent series resistance to a desirable value by adjusting a position of at least one species of the first and second inner electrodes electrically connected to the terminal electrodes via the lead conductors in the laminating direction of the multilayer body.

By adjusting a position of at least one species of the first and second inner electrodes electrically connected to the terminal electrodes via the lead conductors in the laminating direction of the multilayer body, each of the multilayer capacitor and method of adjusting an equivalent series resistance of a multilayer capacitor in accordance with these aspects of the present invention sets the equivalent series resistance to a desirable value. As a result, the equivalent series resistance can be regulated easily with a high precision.

Preferably, the equivalent series resistance is set to the desirable value by further adjusting the number of through-hole conductors electrically connecting the plurality of first inner electrodes to each other and the number of through-hole conductors electrically connecting the plurality of second inner electrodes to each other. In this case, the equivalent series resistance can be regulated with a higher precision.

Preferably, the plurality of first inner electrodes are connected in parallel, and the plurality of second inner electrodes are connected in parallel. In this case, even when the ohmic value fluctuates among the first or second inner electrodes, its influence on the equivalent series resistance of the multilayer capacitor as a whole is small, whereby the equivalent series resistance regulation can be restrained from lowering its precision.

The present invention can provide a multilayer capacitor and a method of adjusting an equivalent series resistance of a multilayer capacitor, which can adjust the equivalent series resistance easily with a high precision.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications

BRIEF DESCRIPTION OF THE DRAWINGS

FIG. 32 is an exploded perspective view of the multilayer body included in the multilayer capacitor in accordance with a modified example of the second embodiment.

DESCRIPTION OF THE PREFERRED EMBODIMENTS

In the following, preferred embodiments of the present invention will be explained in detail with reference to the accompanying drawings. In the explanation, constituents identical to each other or those having functions identical to each other will be referred to with numerals identical to each other without repeating their overlapping descriptions. Words "upper" and "lower" used in the explanation conform to the vertical direction in each drawing. The multilayer capacitor in accordance with each embodiment is described so as to include a method of adjusting an equivalent series resistance of a multilayer capacitor in accordance with the present invention.

First Embodiment

Figure 1:
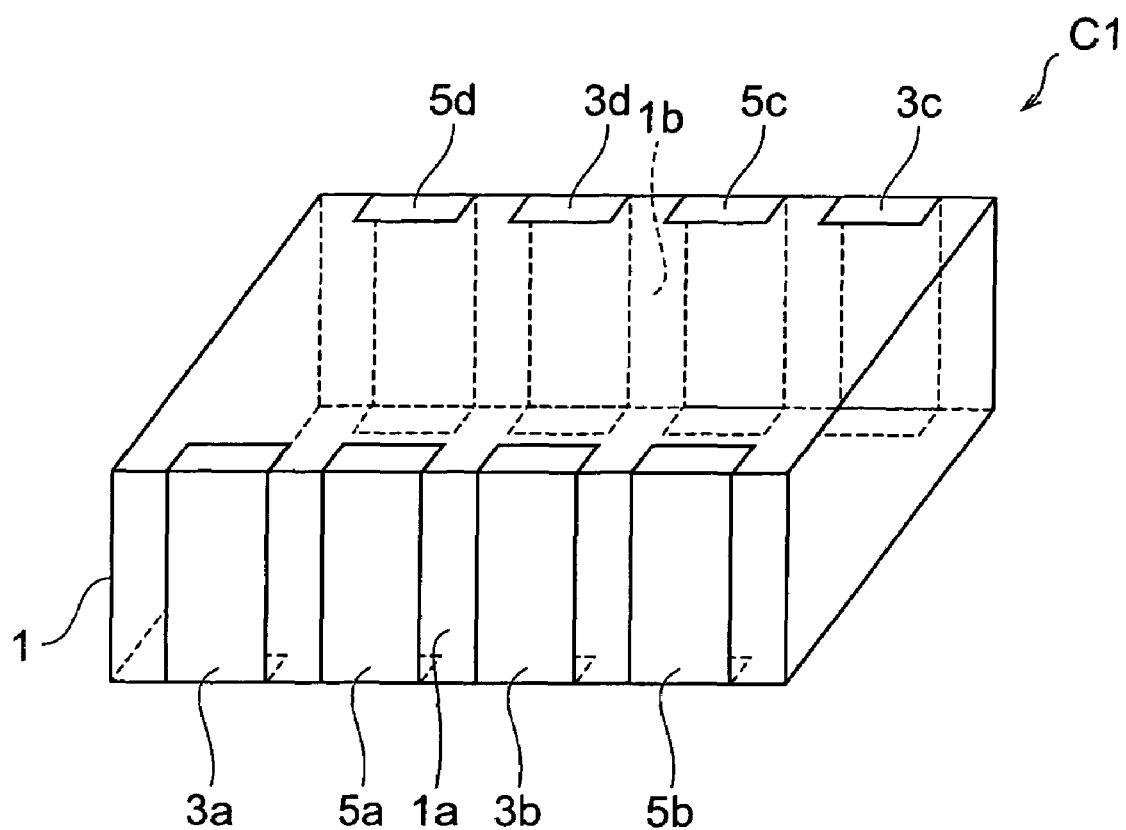
FIG. 1 is a perspective view showing the multilayer capacitor in accordance with a first embodiment.
Figure 2:
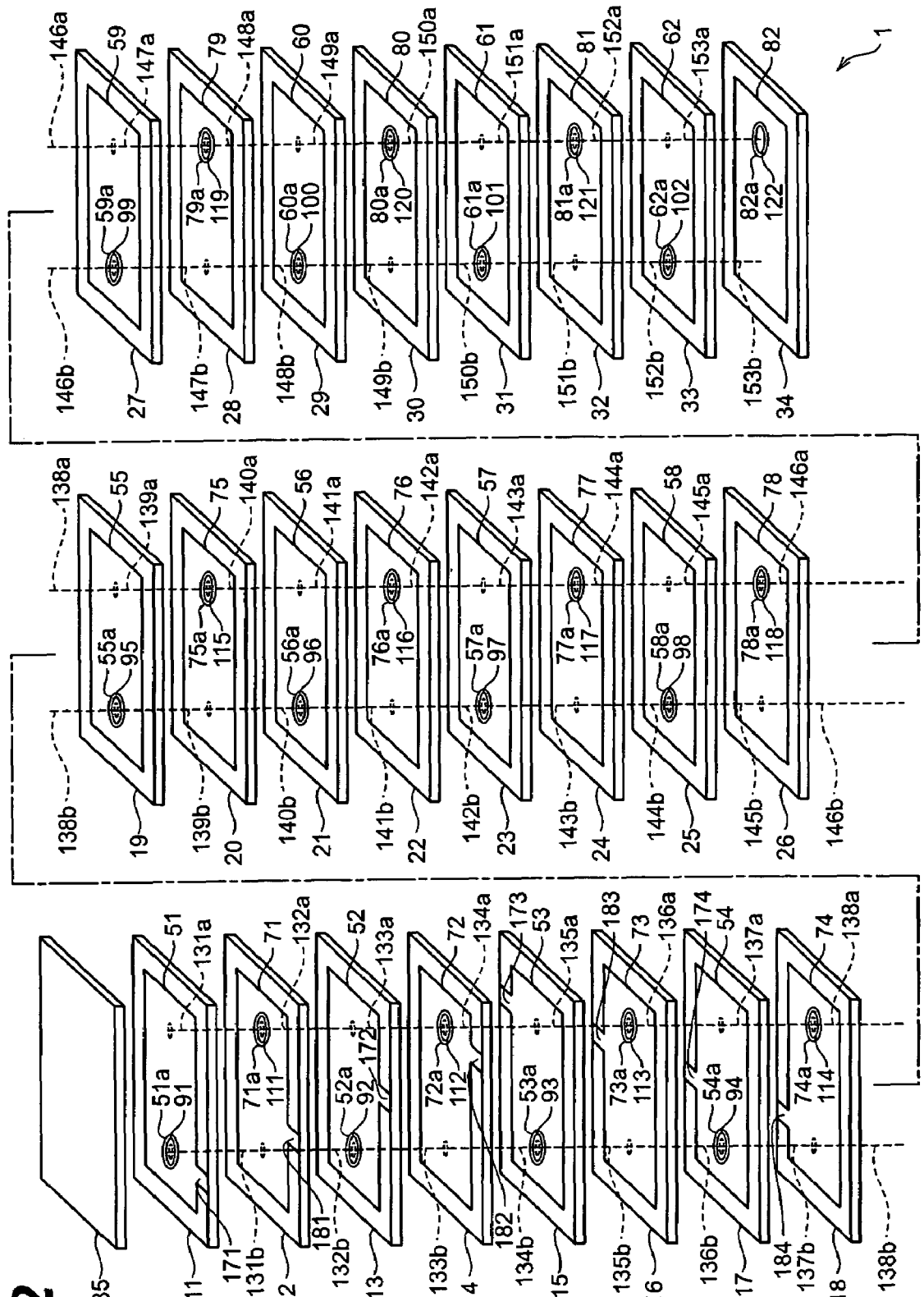
FIG. 2 is an exploded perspective view of the multilayer body included in the multilayer capacitor in accordance with the first embodiment.

With reference to FIGS. 1 and 2, the structure of the multilayer capacitor C1 in accordance with a first embodiment will be explained. FIG. 1 is a perspective view showing the multilayer capacitor in accordance with the first embodiment. FIG. 2 is an exploded perspective view of the multilayer body included in the multilayer capacitor in accordance with the first embodiment.

As shown in FIG. 1, the multilayer capacitor C1 comprises a multilayer body 1, a plurality of (4 in this embodiment) first terminal electrodes 3a to 3d formed on the multilayer body 1, and a plurality of (4 in this embodiment) second terminal electrodes 5a to 5d similarly formed on the multilayer body 1.

The first terminal electrodes 3a, 3b and second terminal electrodes 5a, 5b are positioned on the side of a side face 1a of the multilayer body 1. The first terminal electrodes 3c, 3d and second terminal electrodes 5c, 5d are positioned on the side of a side face 1b of the multilayer body 1. The first terminal electrodes 3a to 3d are electrically insulated from the second terminal electrodes 5a to 5d.

As is also shown in FIG. 2, the multilayer body 1 is constructed by alternately laminating a plurality of (25 in this embodiment) dielectric layers 11 to 35 and a plurality of (12 each in this embodiment) first and second inner electrodes 51 to 62, 71 to 82. In the actual multilayer capacitor C1, the dielectric layers 11 to 35 are integrated together to such an extent that their boundaries are indiscernible.

Each of the first inner electrodes 51 to 62 has a rectangular form. The first inner electrodes 51 to 62 are formed at respective positions separated by a predetermined gap from a side face parallel to the laminating direction of the dielectric layers 11 to 35 (hereinafter simply referred to as "laminating direction") in the multilayer body 1. The first inner electrodes 51 to 62 are formed with openings 51a to 62a such as to expose the dielectric layers 11, 13, 15, 17, 19, 21, 23, 25, 27, 29, 31, 33, respectively. On the dielectric layers 11, 13, 15, 17, 19, 21, 23, 25, 27, 29, 31, 33, land-like inner conductors 91 to 102 are positioned at regions corresponding to the openings 51a to 62a formed in the first inner electrodes 51 to 62, respectively.

Each of the second inner electrodes 71 to 82 has a rectangular form. The second inner electrodes 71 to 82 are formed at respective positions separated by a predetermined gap from a side face parallel to the laminating direction in the multilayer body 1. The second inner electrodes 71 to 82 are formed with openings 71a to 82a such as to expose the dielectric layers 12, 14, 16, 18, 20, 22, 24, 26, 28, 30, 32, 34, respectively. On the dielectric layers 12, 14, 16, 18, 20, 22, 24, 26, 28, 30, 32, 34, land-like inner conductors 111 to 122 are positioned at regions corresponding to the openings 71a to 82a formed in the first inner electrodes 71 to 82, respectively.

Through-hole conductors 131a, 131b penetrating through the dielectric layer 11 in its thickness direction are formed at respective positions corresponding to the inner conductors 111 and 91 in the dielectric layer 11. The through-hole conductor 131a is electrically connected to the first inner electrode 51. The through-hole conductor 131b is electrically connected to the inner conductor 91. While in a state laminated with the dielectric layers 11, 12, the through-hole conductor 131a is electrically connected to the inner conductor 111. While in a state laminated with the dielectric layers 11, 12, the through-hole conductor 131b is electrically connected to the second inner electrode 71.

Through-hole conductors 132a, 132b penetrating through the dielectric layer 12 in its thickness direction are formed at respective positions corresponding to the inner conductors 111 and 92 in the dielectric layer 12. The through-hole conductor 132a is electrically connected to the inner conductor 111. The through-hole conductor 132b is electrically connected to the second inner electrode 71. While in a state laminated with the dielectric layers 12, 13, the through-hole conductor 132a is electrically connected to the first inner electrode 52. While in a state laminated with the dielectric layers 12, 13, the through-hole conductor 132b is electrically connected to the inner conductor 92.

Through-hole conductors 133a, 133b penetrating through the dielectric layer 13 in its thickness direction are formed at respective positions corresponding to the inner conductors 112 and 92 in the dielectric layer 13. The through-hole conductor 133a is electrically connected to the first inner electrode 52. The through-hole conductor 133b is electrically connected to the inner conductor 92. While in a state laminated with the dielectric layers 13, 14, the through-hole conductor 133a is electrically connected to the inner conductor 112. While in a state laminated with the dielectric layers 13, 14, the through-hole conductor 133b is electrically connected to the second inner electrode 72.

Through-hole conductors 134a, 134b penetrating through the dielectric layer 14 in its thickness direction are formed at respective positions corresponding to the inner conductors 112 and 93 in the dielectric layer 14. The through-hole conductor 134a is electrically connected to the inner conductor 112. The through-hole conductor 134b is electrically connected to the second inner electrode 72. While in a state laminated with the dielectric layers 14, 15, the through-hole conductor 134a is electrically connected to the first inner electrode 53. While in a state laminated with the dielectric layers 14, 15, the through-hole conductor 134b is electrically connected to the inner conductor 93.

Through-hole conductors 135a, 135b penetrating through the dielectric layer 15 in its thickness direction are formed at respective positions corresponding to the inner conductors 113 and 93 in the dielectric layer 15. The through-hole conductor 135a is electrically connected to the first inner electrode 53. The through-hole conductor 135b is electrically connected to the inner conductor 93. While in a state laminated with the dielectric layers 15, 16, the through-hole conductor 135a is electrically connected to the inner conductor 113. While in a state laminated with the dielectric layers 15, 16, the through-hole conductor 135b is electrically connected to the second inner electrode 73.

Through-hole conductors 136a, 136b penetrating through the dielectric layer 16 in its thickness direction are formed at respective positions corresponding to the inner conductors 113 and 94 in the dielectric layer 16. The through-hole conductor 136a is electrically connected to the inner conductor 113. The through-hole conductor 136b is electrically connected to the second inner electrode 73. While in a state laminated with the dielectric layers 16, 17, the through-hole conductor 136a is electrically connected to the first inner electrode 54. While in a state laminated with the dielectric layers 16, 17, the through-hole conductor 136b is electrically connected to the inner conductor 94.

Through-hole conductors 137a, 137b penetrating through the dielectric layer 17 in its thickness direction are formed at respective positions corresponding to the inner conductors 114 and 94 in the dielectric layer 17. The through-hole conductor 137a is electrically connected to the first inner electrode 54. The through-hole conductor 137b is electrically connected to the inner conductor 94. While in a state laminated with the dielectric layers 17, 18, the through-hole conductor 137a is electrically connected to the inner conductor 114. While in a state laminated with the dielectric layers 17, 18, the through-hole conductor 137b is electrically connected to the second inner electrode 74.

Through-hole conductors 138a, 138b penetrating through the dielectric layer 18 in its thickness direction are formed at respective positions corresponding to the inner conductors 114 and 95 in the dielectric layer 18. The through-hole conductor 138a is electrically connected to the inner conductor 114. The through-hole conductor 138b is electrically connected to the second inner electrode 74. While in a state laminated with the dielectric layers 18, 19, the through-hole conductor 138a is electrically connected to the first inner electrode 55. While in a state laminated with the dielectric layers 18, 19, the through-hole conductor 138b is electrically connected to the inner conductor 95.

Through-hole conductors 139*a*, 139*b* penetrating through the dielectric layer 19 in its thickness direction are formed at respective positions corresponding to the inner conductors 115 and 95 in the dielectric layer 19. The through-hole conductor 139*a* is electrically connected to the first inner electrode 55. The through-hole conductor 139*b* is electrically connected to the inner conductor 95. While in a state laminated with the dielectric layers 19, 20, the through-hole conductor 139*a* is electrically connected to the inner conductor 115. While in a state laminated with the dielectric layers 19, 20, the through-hole conductor 139*b* is electrically connected to the second inner electrode 75.

Through-hole conductors 140*a*, 140*b* penetrating through the dielectric layer 20 in its thickness direction are formed at respective positions corresponding to the inner conductors 115 and 96 in the dielectric layer 20. The through-hole conductor 140*a* is electrically connected to the inner conductor 115. The through-hole conductor 140*b* is electrically connected to the second inner electrode 75. While in a state laminated with the dielectric layers 20, 21, the through-hole conductor 140*a* is electrically connected to the first inner electrode 56. While in a state laminated with the dielectric layers 20, 21, the through-hole conductor 140*b* is electrically connected to the inner conductor 96.

Through-hole conductors 141*a*, 141*b* penetrating through the dielectric layer 21 in its thickness direction are formed at respective positions corresponding to the inner conductors 116 and 96 in the dielectric layer 21. The through-hole conductor 141*a* is electrically connected to the first inner electrode 56. The through-hole conductor 141*b* is electrically connected to the inner conductor 96. While in a state laminated with the dielectric layers 21, 22, the through-hole conductor 141*a* is electrically connected to the inner conductor 116. While in a state laminated with the dielectric layers 21, 22, the through-hole conductor 141*b* is electrically connected to the second inner electrode 76.

Through-hole conductors 142*a*, 142*b* penetrating through the dielectric layer 22 in its thickness direction are formed at respective positions corresponding to the inner conductors 116 and 97 in the dielectric layer 22. The through-hole conductor 142*a* is electrically connected to the inner conductor 116. The through-hole conductor 142*b* is electrically connected to the second inner electrode 76. While in a state laminated with the dielectric layers 22, 23, the through-hole conductor 142*a* is electrically connected to the first inner electrode 57. While in a state laminated with the dielectric layers 22, 23, the through-hole conductor 142*b* is electrically connected to the inner conductor 97.

Through-hole conductors 143*a*, 143*b* penetrating through the dielectric layer 23 in its thickness direction are formed at respective positions corresponding to the inner conductors 117 and 97 in the dielectric layer 23. The through-hole conductor 143*a* is electrically connected to the first inner electrode 57. The through-hole conductor 143*b* is electrically connected to the inner conductor 97. While in a state laminated with the dielectric layers 23, 24, the through-hole conductor 143*a* is electrically connected to the inner conductor 117. While in a state laminated with the dielectric layers 23, 24, the through-hole conductor 143*b* is electrically connected to the second inner electrode 77.

Through-hole conductors 144*a*, 144*b* penetrating through the dielectric layer 24 in its thickness direction are formed at respective positions corresponding to the inner conductors 117 and 98 in the dielectric layer 24. The through-hole conductor 144*a* is electrically connected to the inner conductor 117. The through-hole conductor 144*b* is electrically connected to the second inner electrode 77. While in a state laminated with the dielectric layers 24, 25, the through-hole conductor 144*a* is electrically connected to the first inner electrode 58. While in a state laminated with the dielectric layers 24, 25, the through-hole conductor 144*b* is electrically connected to the inner conductor 98.

Through-hole conductors 145*a*, 145*b* penetrating through the dielectric layer 25 in its thickness direction are formed at respective positions corresponding to the inner conductors 118 and 98 in the dielectric layer 25. The through-hole conductor 145*a* is electrically connected to the first inner electrode 58. The through-hole conductor 145*b* is electrically connected to the inner conductor 98. While in a state laminated with the dielectric layers 25, 26, the through-hole conductor 145*a* is electrically connected to the inner conductor 118. While in a state laminated with the dielectric layers 25, 26, the through-hole conductor 145*b* is electrically connected to the second inner electrode 78.

Through-hole conductors 146*a*, 146*b* penetrating through the dielectric layer 26 in its thickness direction are formed at respective positions corresponding to the inner conductors 118 and 99 in the dielectric layer 26. The through-hole conductor 146*a* is electrically connected to the inner conductor 118. The through-hole conductor 146*b* is electrically connected to the second inner electrode 78. While in a state laminated with the dielectric layers 26, 27, the through-hole conductor 146*a* is electrically connected to the first inner electrode 59. While in a state laminated with the dielectric layers 26, 27, the through-hole conductor 146*b* is electrically connected to the inner conductor 99.

Through-hole conductors 147*a*, 147*b* penetrating through the dielectric layer 27 in its thickness direction are formed at respective positions corresponding to the inner conductors 119 and 99 in the dielectric layer 27. The through-hole conductor 147*a* is electrically connected to the first inner electrode 59. The through-hole conductor 147*b* is electrically connected to the inner conductor 99. While in a state laminated with the dielectric layers 27, 28, the through-hole conductor 147*a* is electrically connected to the inner conductor 119. While in a state laminated with the dielectric layers 27, 28, the through-hole conductor 147*b* is electrically connected to the second inner electrode 79.

Through-hole conductors 148*a*, 148*b* penetrating through the dielectric layer 28 in its thickness direction are formed at respective positions corresponding to the inner conductors 119 and 100 in the dielectric layer 28. The through-hole conductor 148*a* is electrically connected to the inner conductor 118. The through-hole conductor 148*b* is electrically connected to the second inner electrode 79. While in a state laminated with the dielectric layers 28, 29, the through-hole conductor 148*a* is electrically connected to the first inner electrode 60. While in a state laminated with the dielectric layers 28, 29, the through-hole conductor 148*b* is electrically connected to the inner conductor 100.

Through-hole conductors 149*a*, 149*b* penetrating through the dielectric layer 29 in its thickness direction are formed at respective positions corresponding to the inner conductors 120 and 100 in the dielectric layer 29. The through-hole conductor 149*a* is electrically connected to the first inner electrode 60. The through-hole conductor 149*b* is electrically connected to the inner conductor 100. While in a state laminated with the dielectric layers 29, 30, the through-hole conductor 149*a* is electrically connected to the inner conductor 120. While in a state laminated with the dielectric layers 29, 30, the through-hole conductor 149*b* is electrically connected to the second inner electrode 80.

Through-hole conductors 150*a*, 150*b* penetrating through the dielectric layer 30 in its thickness direction are formed at respective positions corresponding to the inner conductors 120 and 101 in the dielectric layer 30. The through-hole conductor 150*a* is electrically connected to the inner conductor 119. The through-hole conductor 150*b* is electrically connected to the second inner electrode 80. While in a state laminated with the dielectric layers 30, 31, the through-hole conductor 150*a* is electrically connected to the first inner electrode 61. While in a state laminated with the dielectric layers 30, 31, the through-hole conductor 150*b* is electrically connected to the inner conductor 101.

Through-hole conductors 151*a*, 151*b* penetrating through the dielectric layer 31 in its thickness direction are formed at respective positions corresponding to the inner conductors 121 and 101 in the dielectric layer 31. The through-hole conductor 151*a* is electrically connected to the first inner electrode 61. The through-hole conductor 151*b* is electrically connected to the inner conductor 101. While in a state laminated with the dielectric layers 31, 32, the through-hole conductor 151*a* is electrically connected to the inner conductor 121. While in a state laminated with the dielectric layers 31, 32, the through-hole conductor 151*b* is electrically connected to the second inner electrode 81.

Through-hole conductors 152*a*, 152*b* penetrating through the dielectric layer 32 in its thickness direction are formed at respective positions corresponding to the inner conductors 121 and 102 in the dielectric layer 32. The through-hole conductor 152*a* is electrically connected to the inner conductor 120. The through-hole conductor 152*b* is electrically connected to the second inner electrode 81. While in a state laminated with the dielectric layers 32, 33, the through-hole conductor 152*a* is electrically connected to the first inner electrode 62. While in a state laminated with the dielectric layers 32, 33, the through-hole conductor 152*b* is electrically connected to the inner conductor 102.

Through-hole conductors 153*a*, 153*b* penetrating through the dielectric layer 33 in its thickness direction are formed at respective positions corresponding to the inner conductors 122 and 102 in the dielectric layer 33. The through-hole conductor 153*a* is electrically connected to the first inner electrode 62. The through-hole conductor 153*b* is electrically connected to the inner conductor 102. While in a state laminated with the dielectric layers 33, 34, the through-hole conductor 153*a* is electrically connected to the inner conductor 122. While in a state laminated with the dielectric layers 31, 32, the through-hole conductor 153*b* is electrically connected to the second inner electrode 82.

When the dielectric layers 11 to 33 are laminated, the through-hole conductors 131*a* to 153*a* are arranged substantially linearly in parallel with each other in the laminating direction, and are electrically connected to each other, so as to construct a conductive path. The first inner electrodes 51 to 62 are electrically connected together via the through-hole conductors 131*a* to 153*a* and inner conductors 111 to 122.

The first inner electrode 51 is electrically connected to the first terminal electrode 3*a* via a lead conductor 171. The first inner electrode 52 is electrically connected to the first terminal electrode 3*b* via a lead conductor 172. The first inner electrode 53 is electrically connected to the first terminal electrode 3*c* via a lead conductor 173. The first inner electrode 54 is electrically connected to the first terminal electrode 3*d* via a lead conductor 174. As a consequence, the first inner electrodes 55 to 62 are also electrically connected to the first terminal electrodes 3*a* to 3*d*, whereby the first inner electrodes 51 to 62 are connected in parallel.

The lead conductors 171, 172 are integrally formed with their corresponding first inner electrodes 51, 52, and extend therefrom so as to reach the side face 1*a* of the multilayer body 1. The lead conductors 173, 174 are integrally formed with their corresponding first inner electrodes 53, 54, and extend therefrom so as to reach the side face 1*b* of the multilayer body 1.

As with the through-hole conductors 131*a* to 153*a*, the through-hole conductors 131*b* to 153*b* are arranged substantially linearly in parallel with each other in the laminating direction when the dielectric layers 11 to 33 are laminated, and construct a conductive path when electrically connected together. The second inner electrodes 71 to 82 are electrically connected together via the through-hole conductors 131*b* to 153*b* and inner conductors 91 to 102.

The second inner electrode 71 is electrically connected to the second terminal electrode 5*a* via a lead conductor 181. The second inner electrode 72 is electrically connected to the second terminal electrode 5*b* via a lead conductor 182. The second inner electrode 73 is electrically connected to the second terminal electrode 5*c* via a lead conductor 183. The second inner electrode 74 is electrically connected to the second terminal electrode 5*d* via a lead conductor 184. As a consequence, the second inner electrodes 75 to 82 are also electrically connected to the second terminal electrodes 5*a* to 5*d*, whereby the second inner electrodes 71 to 82 are connected in parallel.

The lead conductors 181, 182 are integrally formed with their corresponding second inner electrodes 71, 72, and extend therefrom so as to reach the side face 1*a* of the multilayer body 1. The lead conductors 183, 184 are integrally formed with their corresponding second inner electrodes 73, 74, and extend therefrom so as to reach the side face 1*b* of the multilayer body 1.

In the multilayer capacitor C1, the number of first inner electrodes 51 to 54 connected to the first terminal electrodes 3*a* to 3*d* via the lead conductors 171 to 174 is 4, which is smaller than the total number (12 in this embodiment) of the first inner electrodes 51 to 62. In the multilayer capacitor C1, the number of second inner electrodes 71 to 74 connected to the second terminal electrodes 5*a* to 5*d* via the lead conductors 181 to 184 is 4, which is smaller than the total number (12 in this embodiment) of the second inner electrodes 71 to 82.

When the first terminal electrode 3*a* is concerned, the combined resistance component of the through-hole conductors 131*a* to 153*a* is connected in series to the first terminal electrode 3*a*.

When the first terminal electrode 3*b* is concerned, at the first inner electrode 52 as a boundary, the resistance component of the through-hole conductors 131*a* to 153*a* is divided into the combined resistance component of the through-hole conductors 131*a*, 132*a* positioned on one side of the first inner electrode 52 in the laminating direction and the combined resistance component of the through-hole conductors 133*a* to 153*a* positioned on the other side of the first inner electrode 52 in the laminating direction. The combined resistance component of the through-hole conductors 131*a*, 132*a* and the combined resistance component of the through-hole conductors 133*a* to 153*a* are connected in parallel to the first terminal electrode 3*b*.

When the first terminal electrode 3*c* is concerned, at the first inner electrode 53 as a boundary, the resistance component of the through-hole conductors 131*a* to 153*a* is divided into the combined resistance component of the through-hole conductors 131*a* to 134*a* positioned on one side of the first inner electrode 53 in the laminating direction and the combined resistance component of the through-hole conductors 135*a* to 153*a* positioned on the other side of the first inner electrode 53 in the laminating direction. The combined resistance component of the through-hole conductors 131a to 134a and the combined resistance component of the through-hole conductors 135a to 153a are connected in parallel to the first terminal electrode 3c.

When the first terminal electrode 3d is concerned, at the first inner electrode 54 as a boundary, the combined resistance component of the through-hole conductors 131a to 153a is divided into the combined resistance component of the through-hole conductors 131a to 136a positioned on one side of the first inner electrode 54 in the laminating direction and the combined resistance component of the through-hole conductors 137a to 153a positioned on the other side of the first inner electrode 54 in the laminating direction. The combined resistance component of the through-hole conductors 131a to 136a and the combined resistance component of the through-hole conductors 137a to 153a are connected in parallel to the first terminal electrode 3d.

When the second terminal electrode 5a is concerned, at the second inner electrode 71 as a boundary, the resistance component of the through-hole conductors 131b to 153b is divided into the resistance component of the through-hole conductor 131b positioned on one side of the second inner electrode 71 in the laminating direction and the combined resistance component of the through-hole conductors 132b to 153b positioned on the other side of the second inner electrode 71 in the laminating direction. The resistance component of the through-hole conductor 131b and the combined resistance component of the through-hole conductors 132b to 153b are connected in parallel to the second terminal electrode 5a.

When the second terminal electrode 5b is concerned, at the second inner electrode 72 as a boundary, the resistance component of the through-hole conductors 131b to 153b is divided into the combined resistance component of the through-hole conductors 131b to 133b positioned on one side of the second inner electrode 72 in the laminating direction and the combined resistance component of the through-hole conductors 134b to 153b positioned on the other side of the second inner electrode 72 in the laminating direction. The combined resistance component of the through-hole conductors 131b to 133b and the combined resistance component of the through-hole conductors 134b to 153b are connected in parallel to the second terminal electrode 5b.

When the second terminal electrode 5c is concerned, at the second inner electrode 73 as a boundary, the resistance component of the through-hole conductors 131b to 153b is divided into the combined resistance component of the through-hole conductors 131b to 135b positioned on one side of the second inner electrode 73 in the laminating direction and the combined resistance component of the through-hole conductors 136b to 153b positioned on the other side of the second inner electrode 73 in the laminating direction. The combined resistance component of the through-hole conductors 131b to 135b and the combined resistance component of the through-hole conductors 136b to 153b are connected in parallel to the second terminal electrode 5c.

When the second terminal electrode 5d is concerned, at the second inner electrode 74 as a boundary, the resistance component of the through-hole conductors 131b to 153b is divided into the combined resistance component of the through-hole conductors 131b to 137b positioned on one side of the second inner electrode 74 in the laminating direction and the combined resistance component of the through-hole conductors 138b to 153b positioned on the other side of the second inner electrode 74 in the laminating direction. The combined resistance component of the through-hole conductors 131b to 137b and the combined resistance component of the through-hole conductors 138b to 153b are connected in parallel to the second terminal electrode 5d.

As a consequence, the multilayer capacitor C1 yields an equivalent series resistance greater than that of the conventional multilayer capacitor in which all the inner electrodes are connected to their corresponding terminal electrodes via lead conductors.

As in the foregoing, this embodiment adjusts the number of first inner electrodes 51 to 54 electrically connected to the first terminal electrodes 3a to 3d via the lead conductors 171 to 174 and the number of second inner electrodes 71 to 74 electrically connected to the second terminal electrodes 5a to 5d via the lead conductors 181 to 184, thereby setting the equivalent series resistance of the multilayer capacitor C1 to a desirable value. As a result, the equivalent series resistance can be regulated easily with a high precision.

In this embodiment, the first inner electrodes 51 to 62 are connected in parallel, while the second inner electrodes 71 to 82 are connected in parallel. Therefore, even when the ohmic value varies among the first inner electrodes 51 to 62 or among the second inner electrodes 71 to 82, such a variation is less influential in the equivalent series resistance of the multilayer capacitor C1 as a whole, whereby the accuracy in equivalent series resistance control can be restrained from lowering.

Second Embodiment

Figure 3:
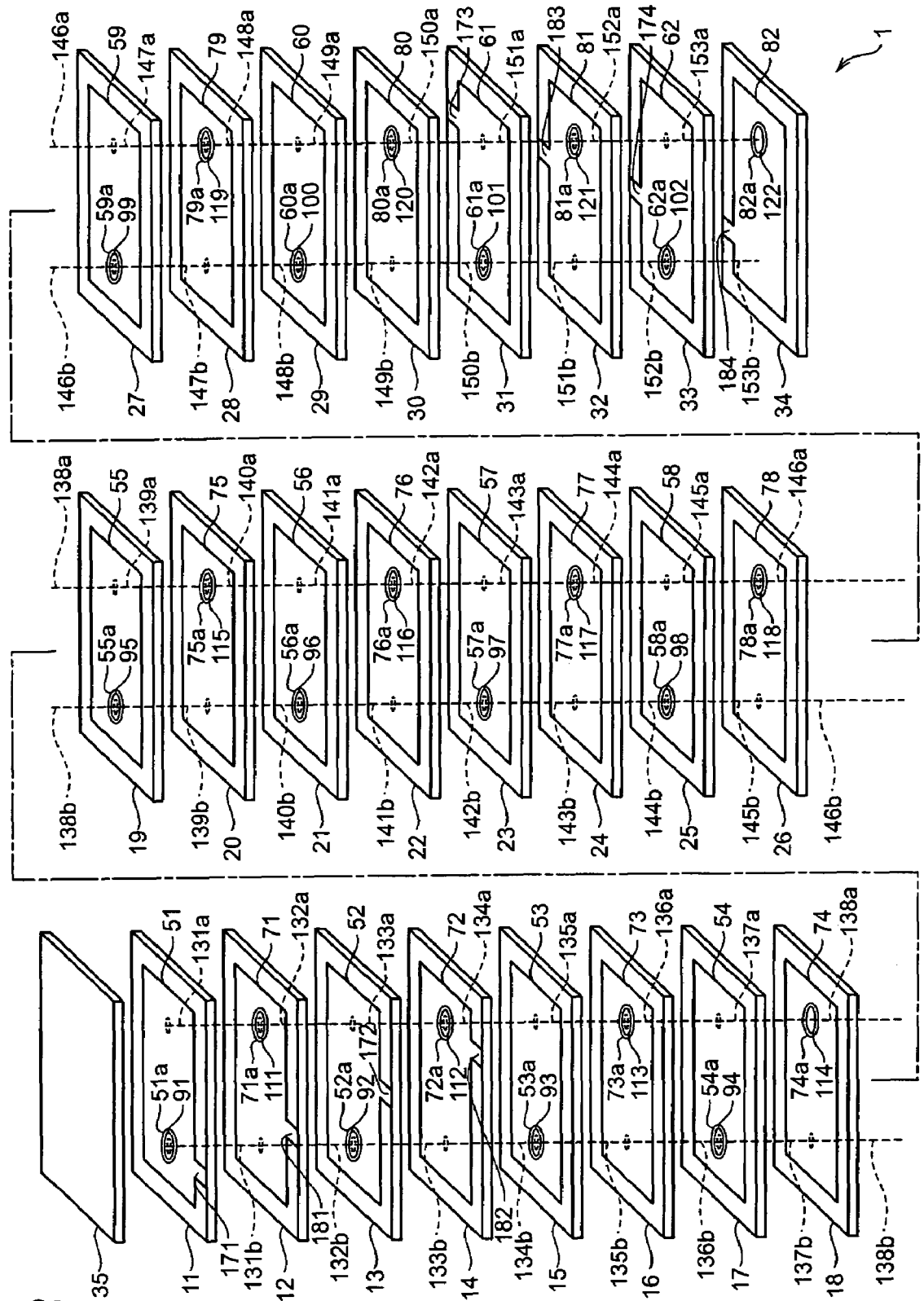
FIG. 3 is an exploded perspective view of the multilayer body included in the multilayer capacitor in accordance with a second embodiment.

With reference to FIG. 3, the structure of the multilayer capacitor in accordance with a second embodiment will now be explained. The multilayer capacitor in accordance with the second embodiment differs from the multilayer capacitor C1 in accordance with the first embodiment in terms of positions of first inner electrodes electrically connected to first terminal electrodes 3a to 3d via lead conductors 171 to 174 in the laminating direction and positions of second inner electrodes electrically connected to second terminal electrodes 5a to 5d via lead conductors 181 to 184 in the laminating direction. FIG. 3 is an exploded perspective view of the multilayer body included in the multilayer capacitor in accordance with the second embodiment.

As with the multilayer capacitor C1 in accordance with the first embodiment, the multilayer capacitor in accordance with the second embodiment comprises a multilayer body 1, first terminal electrodes 3a to 3d formed on the multilayer body 1, and second terminal electrodes 5a to 5d similarly formed on the multilayer body 1, though they are not depicted.

In the multilayer capacitor in accordance with the second embodiment, as shown in FIG. 3, a first inner electrode 61 is electrically connected to the first terminal electrode 3c via the lead conductor 173. A first inner electrode 62 is electrically connected to the first terminal electrode 3d via the lead conductor 174. As a consequence, first inner electrodes 53 to 60 are also electrically connected to the first terminal electrodes 3a to 3d, whereby first inner electrodes 51 to 62 are connected in parallel. The lead conductors 173, 174 are integrally formed with their corresponding first inner electrodes 61, 62, and extend therefrom so as to reach a side face 1b of the multilayer body 1.

A second inner electrode 81 is electrically connected to the second terminal electrode 5c via the lead conductor 183. A second inner electrode 82 is electrically connected to the second terminal electrode 5d via the lead conductor 184. As a consequence, first inner electrodes 73 to 80 are electrically connected to the second terminal electrodes 5a to 5d, whereby second inner electrodes 71 to 82 are connected in parallel. The lead conductors 183, 184 are integrally formed with their corresponding second inner electrodes 81, 82, and extend therefrom so as to reach the side face 1b of the multilayer body 1.

In the multilayer capacitor in accordance with the second embodiment, the number of first inner electrodes 51, 52, 61, 62 connected to the first terminal electrodes 3a to 3d via the lead conductors 171 to 174 is 4, which is smaller than the total number (12 in this embodiment) of first inner electrodes 51 to 62. In the multilayer capacitor in accordance with the second embodiment, the number of second inner electrodes 71, 72, 81, 82 connected to the second terminal electrodes 5a to 5d via the lead conductors 181 to 184 is 4, which is smaller than the total number (12 in this embodiment) of second inner electrodes 71 to 82. As a consequence, the multilayer capacitor in accordance with the second embodiment yields an equivalent series resistance greater than that of the conventional multilayer capacitor in which all the inner electrodes are connected to their corresponding terminal electrodes via lead conductors.

When the first terminal electrode 3a is concerned, the combined resistance component of the through-hole conductors 131a to 153a is connected in series to the first terminal electrode 3a.

When the first terminal electrode 3b is concerned, at the first inner electrode 52 as a boundary, the resistance component of the through-hole conductors 131a to 153a is divided into the combined resistance component of the through-hole conductors 131a, 132a positioned on one side of the first inner electrode 52 in the laminating direction and the combined resistance component of the through-hole conductors 133a to 153a positioned on the other side of the first inner electrode 52 in the laminating direction. The combined resistance component of the through-hole conductors 131a, 132a and the combined resistance component of the through-hole conductors 133a to 153a are connected in parallel to the first terminal electrode 3b.

When the first terminal electrode 3c is concerned, at the first inner electrode 61 as a boundary, the resistance component of the through-hole conductors 131a to 153a is divided into the combined resistance component of the through-hole conductors 131a to 150a positioned on one side of the first inner electrode 61 in the laminating direction and the combined resistance component of the through-hole conductors 151a to 153a positioned on the other side of the first inner electrode 61 in the laminating direction. The combined resistance component of the through-hole conductors 131a to 150a and the combined resistance component of the through-hole conductors 151a to 153a are connected in parallel to the first terminal electrode 3c.

When the first terminal electrode 3d is concerned, at the first inner electrode 62 as a boundary, the combined resistance component of the through-hole conductors 131a to 153a is divided into the combined resistance component of the through-hole conductors 131a to 152a positioned on one side of the first inner electrode 62 in the laminating direction and the resistance component of the through-hole conductor 153a positioned on the other side of the first inner electrode 62 in the laminating direction. The combined resistance component of the through-hole conductors 131a to 152a and the resistance component of the through-hole conductor 153a are connected in parallel to the first terminal electrode 3d.

When the second terminal electrode 5a is concerned, at the second inner electrode 71 as a boundary, the resistance component of the through-hole conductors 131b to 153b is divided into the resistance component of the through-hole conductor 131b positioned on one side of the second inner electrode 71 in the laminating direction and the combined resistance component of the through-hole conductors 132b to 153b positioned on the other side of the second inner electrode 71 in the laminating direction. The resistance component of the through-hole conductor 131b and the combined resistance component of the through-hole conductors 132b to 153b are connected in parallel to the second terminal electrode 5a.

When the second terminal electrode 5b is concerned, at the second inner electrode 72 as a boundary, the resistance component of the through-hole conductors 131b to 153b is divided into the combined resistance component of the through-hole conductors 131b to 133b positioned on one side of the second inner electrode 72 in the laminating direction and the combined resistance component of the through-hole conductors 134b to 153b positioned on the other side of the second inner electrode 72 in the laminating direction. The combined resistance component of the through-hole conductors 131b to 133b and the combined resistance component of the through-hole conductors 134b to 153b are connected in parallel to the second terminal electrode 5b.

When the second terminal electrode 5c is concerned, at the second inner electrode 81 as a boundary, the resistance component of the through-hole conductors 131b to 153b is divided into the combined resistance component of the through-hole conductors 131b to 151b positioned on one side of the second inner electrode 81 in the laminating direction and the combined resistance component of the through-hole conductors 152b, 153b positioned on the other side of the second inner electrode 81 in the laminating direction. The combined resistance component of the through-hole conductors 131b to 151b and the combined resistance component of the through-hole conductors 152b, 153b are connected in parallel to the second terminal electrode 5c.

When the second terminal electrode 5d is concerned, the combined resistance component of the through-hole conductors 131b to 153b is connected in series to the second terminal electrode 5d.

Because of the difference in the above-mentioned resistance components of the through-hole conductors 131a to 153a, 131b to 153b, the multilayer capacitor in accordance with the second embodiment yields an equivalent series resistance greater than that of the multilayer capacitor C1 in accordance with the first embodiment.

As in the foregoing, this embodiment adjusts the positions of first inner electrodes 51, 52, 61, 62 electrically connected to the first terminal electrodes 3a to 3d via the lead conductors 171 to 174 in the laminating direction and the positions of second inner electrodes 71, 72, 81, 82 electrically connected to the second terminal electrodes 5a to 5d via the lead conductors 181 to 184 in the laminating direction, thereby setting the equivalent series resistance of the multilayer capacitor to a desirable value. As a result, the equivalent series resistance can be regulated easily with a high precision.

Third Embodiment

Figure 4:
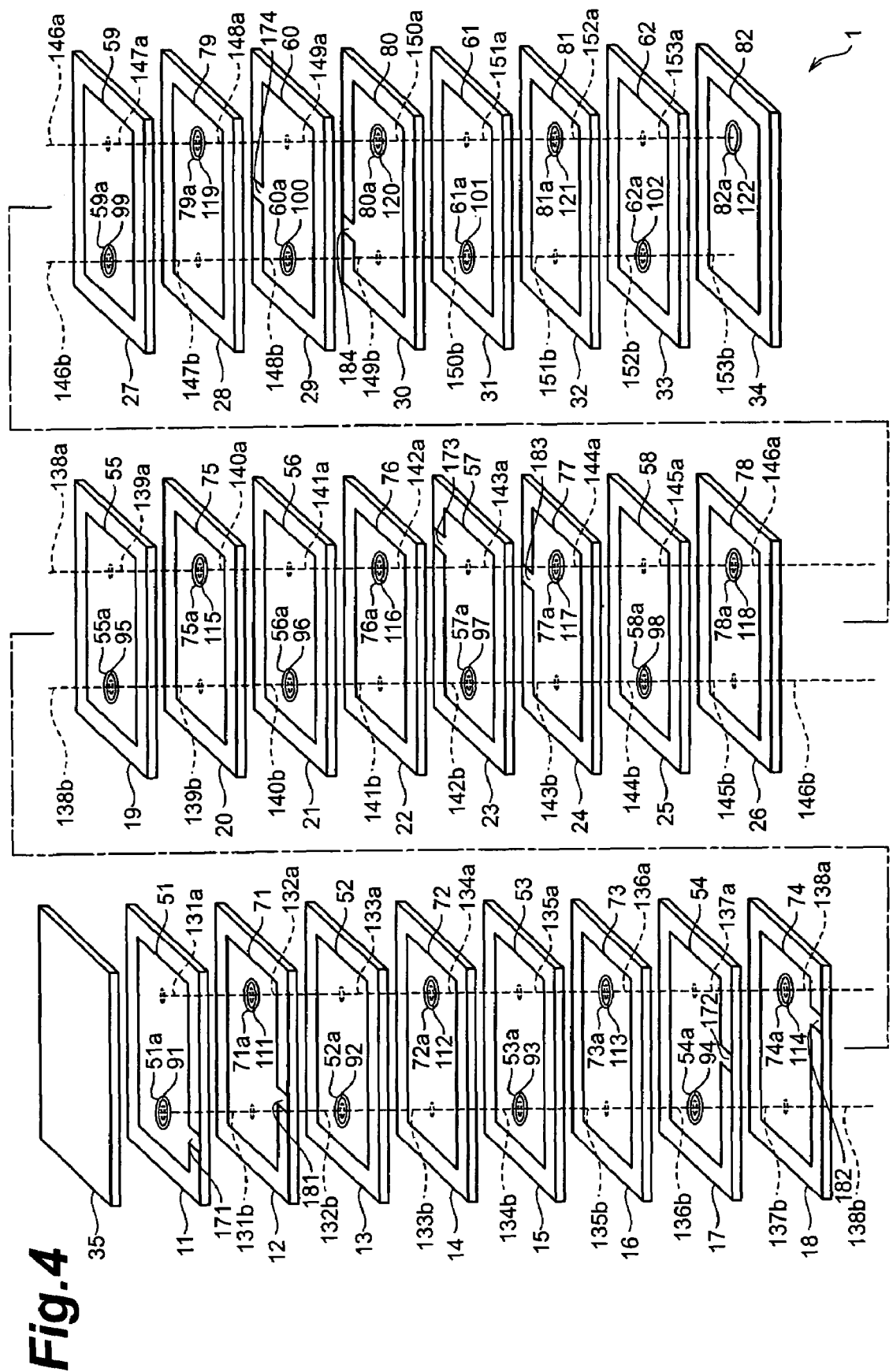
FIG. 4 is an exploded perspective view of the multilayer body included in the multilayer capacitor in accordance with a third embodiment.

With reference to FIG. 4, the structure of the multilayer capacitor in accordance with a third embodiment will now be explained. The multilayer capacitor in accordance with the third embodiment differs from the multilayer capacitor C1 in accordance with the first embodiment in terms of positions of first inner electrodes electrically connected to first terminal electrodes 3a to 3d via lead conductors 171 to 174 in the laminating direction and positions of second inner electrodes electrically connected to second terminal electrodes 5a to 5d via lead conductors 181 to 184 in the laminating direction. FIG. 4 is an exploded perspective view of the multilayer body included in the multilayer capacitor in accordance with the third embodiment.

As with the multilayer capacitor C1 in accordance with the first embodiment, the multilayer capacitor in accordance with the third embodiment comprises a multilayer body 1, first terminal electrodes 3a to 3d formed on the multilayer body 1, and second terminal electrodes 5a to 5d similarly formed on the multilayer body 1, though they are not depicted.

In the multilayer capacitor in accordance with the third embodiment, as shown in FIG. 4, a first inner electrode 54 is electrically connected to the first terminal electrode 3b via the lead conductor 172. A first inner electrode 57 is electrically connected to the first terminal electrode 3c via the lead conductor 173. As a consequence, first inner electrodes 52, 53, 55, 56, 58, 59, 61, 62 are electrically connected to the first terminal electrodes 3a to 3d, whereby first inner electrodes 51 to 62 are connected in parallel. The lead conductor 172 is integrally formed with the first inner electrode 54, and extends therefrom so as to reach a side face 1a of the multilayer body 1. The lead conductors 173, 174 are integrally formed with their corresponding first inner electrodes 57, 60, and extend therefrom so as to reach a side face 1b of the multilayer body 1.

A second inner electrode 74 is electrically connected to the second terminal electrode 5b via the lead conductor 182. A second inner electrode 77 is electrically connected to the second terminal electrode 5c via the lead conductor 183. A second inner electrode 80 is electrically connected to the second terminal electrode 5d via the lead conductor 184. As a consequence, second inner electrodes 72, 73, 75, 76, 78, 79, 81, 82 are also electrically connected to the second terminal electrodes 5a to 5d, whereby second inner electrodes 71 to 82 are connected in parallel. The lead conductor 182 is integrally formed with the second inner electrode 74, and extends therefrom so as to reach the side face 1a of the multilayer body 1. The lead conductors 183, 184 are integrally formed with their corresponding second inner electrodes 77, 80, and extend therefrom so as to reach the side face 1b of the multilayer body 1.

In the multilayer capacitor in accordance with the third embodiment, the number of first inner electrodes 51, 54, 57, 60 connected to the first terminal electrodes 3a to 3d via the lead conductors 171 to 174 is 4, which is smaller than the total number (12 in this embodiment) of first inner electrodes 51 to 62. In the multilayer capacitor in accordance with the third embodiment, the number of second inner electrodes 71, 74, 77, 80 connected to the second terminal electrodes 5a to 5d via the lead conductors 181 to 184 is 4, which is smaller than the total number (12 in this embodiment) of second inner electrodes 71 to 82. As a consequence, the multilayer capacitor in accordance with the third embodiment yields an equivalent series resistance greater than that of the conventional multilayer capacitor in which all the inner electrodes are connected to their corresponding terminal electrodes via lead conductors.

When the first terminal electrode 3a is concerned, at the first inner electrode 54 as a boundary, the resistance component of the through-hole conductors 131a to 153a is divided into the combined resistance component of the through-hole conductors 131a to 136a positioned on one side of the first inner electrode 54 in the laminating direction and the combined resistance component of the through-hole conductors 137a to 153a positioned on the other side of the first inner electrode 54 in the laminating direction. The combined resistance component of the through-hole conductors 131a to 136a and the combined resistance component of the through-hole conductors 137a to 153a are connected in parallel to the first terminal electrode 3b.

When the first terminal electrode 3c is concerned, at the first inner electrode 57 as a boundary, the resistance component of the through-hole conductors 131a to 153a is divided into the combined resistance component of the through-hole conductors 131a to 142a positioned on one side of the first inner electrode 57 in the laminating direction and the combined resistance component of the through-hole conductors 143a to 153a positioned on the other side of the first inner electrode 57 in the laminating direction. The combined resistance component of the through-hole conductors 131a to 142a and the combined resistance component of the through-hole conductors 143a to 153a are connected in parallel to the first terminal electrode 3c.

When the first terminal electrode 3d is concerned, at the first inner electrode 60 as a boundary, the resistance component of the through-hole conductors 131a to 153a is divided into the combined resistance component of the through-hole conductors 131a to 148a positioned on one side of the first inner electrode 60 in the laminating direction and the combined resistance component of the through-hole conductors 149a to 153a positioned on the other side of the first inner electrode 60 in the laminating direction. The combined resistance component of the through-hole conductors 131a to 148a and the combined resistance component of the through-hole conductors 149a to 153a are connected in parallel to the first terminal electrode 3d.

When the second terminal electrode 5b is concerned, at the second inner electrode 74 as a boundary, the resistance component of the through-hole conductors 131b to 153b is divided into the combined resistance component of the through-hole conductors 131b to 137b positioned on one side of the second inner electrode 74 in the laminating direction and the combined resistance component of the through-hole conductors 138b to 153b positioned on the other side of the second inner electrode 74 in the laminating direction. The resistance component of the through-hole conductors 131b to 137b and the combined resistance component of the through-hole conductors 138b to 153b are connected in parallel to the second terminal electrode 5b.

When the second terminal electrode 5c is concerned, at the second inner electrode 77 as a boundary, the resistance component of the through-hole conductors 131b to 153b is divided into the combined resistance component of the through-hole conductors 131b to 143b positioned on one side of the second inner electrode 77 in the laminating direction and the combined resistance component of the through-hole conductors 144b to 153b positioned on the other side of the second inner electrode 77 in the laminating direction. The resistance component of the through-hole conductors 131b to 143b and the combined resistance component of the through-hole conductors 144b to 153b are connected in parallel to the second terminal electrode 5c.

When the second terminal electrode 5d is concerned, at the second inner electrode 80 as a boundary, the resistance component of the through-hole conductors 131b to 153b is divided into the combined resistance component of the through-hole conductors 131b to 149b positioned on one side of the second inner electrode 80 in the laminating direction and the combined, resistance component of the through-hole conductors 150b to 153b positioned on the other side of the second inner electrode 80 in the laminating direction. The combined resistance component of the through-hole conductors 131b to 149b and the combined resistance component of the through-hole conductors 150b to 153b are connected in parallel to the second terminal electrode 5d.

Because of the difference in the above-mentioned resistance components of the through-hole conductors 131a to 153a, 131b to 153b, the multilayer capacitor in accordance with the third embodiment yields an equivalent series resistance smaller than that of the multilayer capacitor C1 in accordance with the first embodiment.

As in the foregoing, this embodiment adjusts the positions of first inner electrodes 51, 54, 57, 60 electrically connected to the first terminal electrodes 3a to 3d via the lead conductors 171 to 174 in the laminating direction and the positions of second inner electrodes 71, 74, 77, 80 electrically connected to the second terminal electrodes 5a to 5d via the lead conductors 181 to 184 in the laminating direction, thereby setting the equivalent series resistance of the multilayer capacitor to a desirable value. As a result, the equivalent series resistance can be regulated easily with a high precision.

Fourth Embodiment

Figure 5:
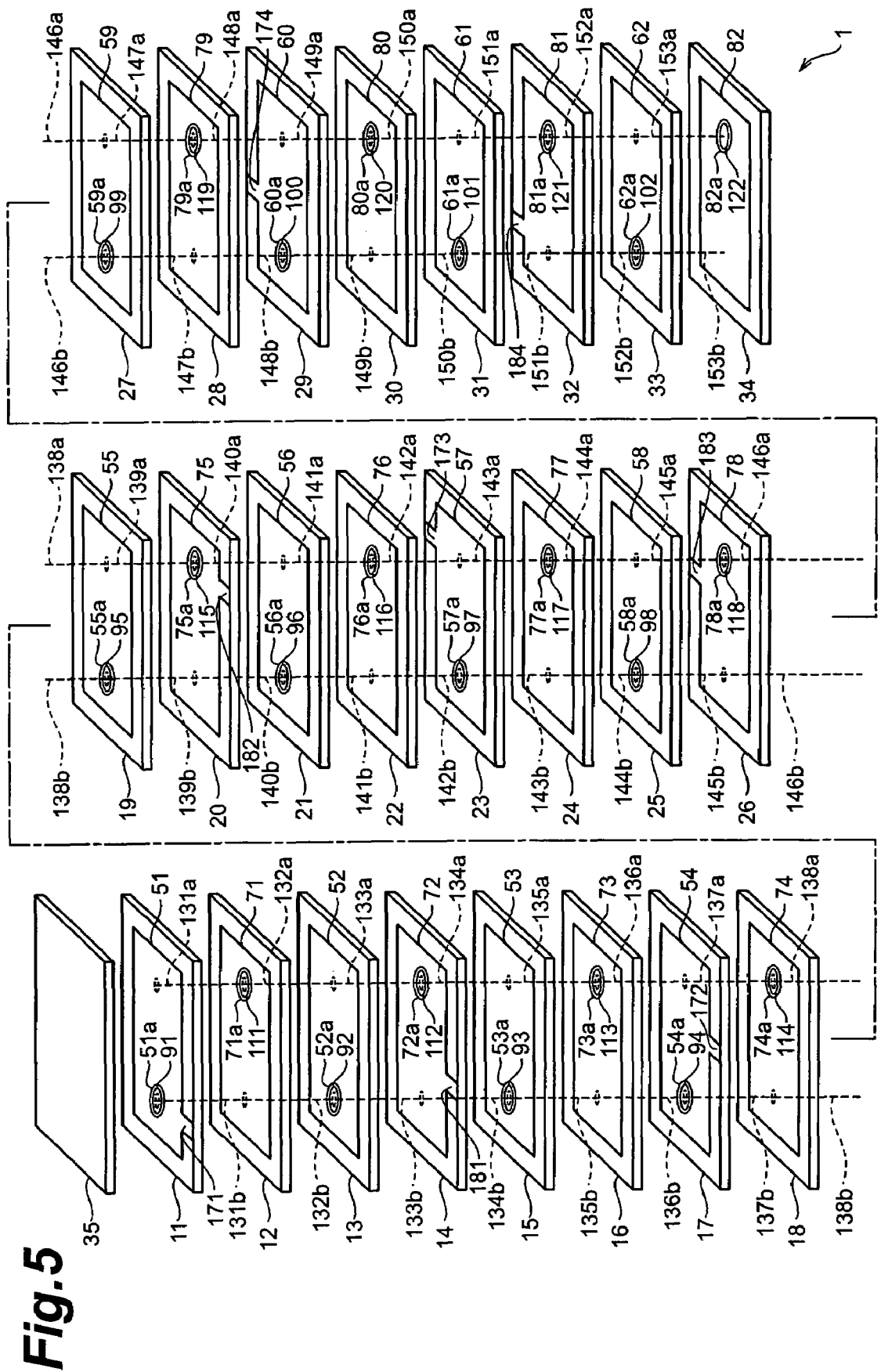
FIG. 5 is an exploded perspective view of the multilayer body included in the multilayer capacitor in accordance with a fourth embodiment.

With reference to FIG. 5, the structure of the multilayer capacitor in accordance with a fourth embodiment will now be explained. The multilayer capacitor in accordance with the fourth embodiment differs from the multilayer capacitor in accordance with the third embodiment in terms of positions of second inner electrodes electrically connected to second terminal electrodes 5a to 5d via lead conductors 181 to 184. FIG. 5 is an exploded perspective view of the multilayer body included in the multilayer capacitor in accordance with the fourth embodiment.

As with the multilayer capacitor C1 in accordance with the first embodiment, the multilayer capacitor in accordance with the fourth embodiment comprises a multilayer body 1, first terminal electrodes 3a to 3d formed on the multilayer body 1, and second terminal electrodes 5a to 5d similarly formed on the multilayer body 1, though they are not depicted.

In the multilayer capacitor in accordance with the fourth embodiment, as shown in FIG. 5, a second inner electrode 72 is electrically connected to the second terminal electrode 5a via the lead conductor 181. A second inner electrode 75 is electrically connected to the second terminal electrode 5b via the lead conductor 182. A second inner electrode 78 is electrically connected to the second terminal electrode 5c via the lead conductor 183. A second inner electrode 81 is electrically connected to the second terminal electrode 5d via the lead conductor 184. As a consequence, second inner electrodes 71, 73, 74, 76, 77, 79, 80, 82 are electrically connected to the second terminal electrodes 5a to 5d, whereby second inner electrodes 71 to 82 are connected in parallel. The lead conductors 181, 182 are integrally formed with their corresponding second inner electrodes 72, 74, and extend therefrom so as to reach a side face 1a of the multilayer body 1. The lead conductors 183, 184 are integrally formed with their corresponding second inner electrodes 77, 80, and extend therefrom so as to reach a side face 1b of the multilayer body 1.

In the multilayer capacitor in accordance with the fourth embodiment, the number of first inner electrodes 51, 54, 57, 60 connected to the first terminal electrodes 3a to 3d via the lead conductors 171 to 174 is 4, which is smaller than the total number (12 in this embodiment) of first inner electrodes 51 to 62. In the multilayer capacitor in accordance with the fourth embodiment, the number of second inner electrodes 72, 75, 78, 81 connected to the second terminal electrodes 5a to 5d via the lead conductors 181 to 184 is 4, which is smaller than the total number (12 in this embodiment) of second inner electrodes 71 to 82. As a consequence, the multilayer capacitor in accordance with the fourth embodiment yields an equivalent series resistance greater than that of the conventional multilayer capacitor in which all the inner electrodes are connected to their corresponding terminal electrodes via lead conductors.

When the second terminal electrode 5a is concerned, at the second inner electrode 72 as a boundary, the resistance component of the through-hole conductors 131b to 153b is divided into the combined resistance component of the through-hole conductors 131b to 133b positioned on one side of the second inner electrode 72 in the laminating direction and the combined resistance component of the through-hole conductors 134b to 153b positioned on the other side of the second inner electrode 72 in the laminating direction. The combined resistance component of the through-hole conductors 131b to 133b and the combined resistance component of the through-hole conductors 134b to 153b are connected in parallel to the second terminal electrode 5a.

When the second terminal electrode 5b is concerned, at the second inner electrode 75 as a boundary, the resistance component of the through-hole conductors 131b to 153b is divided into the combined resistance component of the through-hole conductors 131b to 139b positioned on one side of the second inner electrode 75 in the laminating direction and the combined resistance component of the through-hole conductors 140b to 153b positioned on the other side of the second inner electrode 75 in the laminating direction. The combined resistance component of the through-hole conductors 131b to 139b and the combined resistance component of the through-hole conductors 140b to 153b are connected in parallel to the second terminal electrode 5b.

When the second terminal electrode 5c is concerned, at the second inner electrode 78 as a boundary, the resistance component of the through-hole conductors 131b to 153b is divided into the combined resistance component of the through-hole conductors 131b to 145b positioned on one side of the second inner electrode 78 in the laminating direction and the combined resistance component of the through-hole conductors 146b to 153b positioned on the other side of the second inner electrode 78 in the laminating direction. The combined resistance component of the through-hole conductors 131b to 145b and the combined resistance component of the through-hole conductors 146b to 153b are connected in parallel to the second terminal electrode 5c.

When the second terminal electrode 5d is concerned, at the second inner electrode 81 as a boundary, the resistance component of the through-hole conductors 131b to 153b is divided into the combined resistance component of the through-hole conductors 131b to 151b positioned on one side of the second inner electrode 81 in the laminating direction and the combined resistance component of the through-hole conductors 152b, 153b positioned on the other side of the second inner electrode 81 in the laminating direction. The combined resistance component of the through-hole conductors 131b to 151b and the combined resistance component of the through-hole conductors 152b, 153b are connected in parallel to the second terminal electrode 5d.

Because of the difference in the above-mentioned resistance components of the through-hole conductors 131a to 153a, 131b to 153b, the multilayer capacitor in accordance with the fourth embodiment yields an equivalent series resistance smaller than that of the multilayer capacitor C1 in accordance with the first embodiment.

As in the foregoing, this embodiment adjusts the positions of first inner electrodes 51, 54, 57, 60 electrically connected to the first terminal electrodes 3a to 3d via the lead conductors 171 to 174 in the laminating direction and the positions of second inner electrodes 72, 75, 78, 81 electrically connected to the second terminal electrodes 5a to 5d via the lead conductors 181 to 184 in the laminating direction, thereby setting the equivalent series resistance of the multilayer capacitor to a desirable value. As a result, the equivalent series resistance can be regulated easily with a high precision.

Fifth Embodiment

Figure 6:
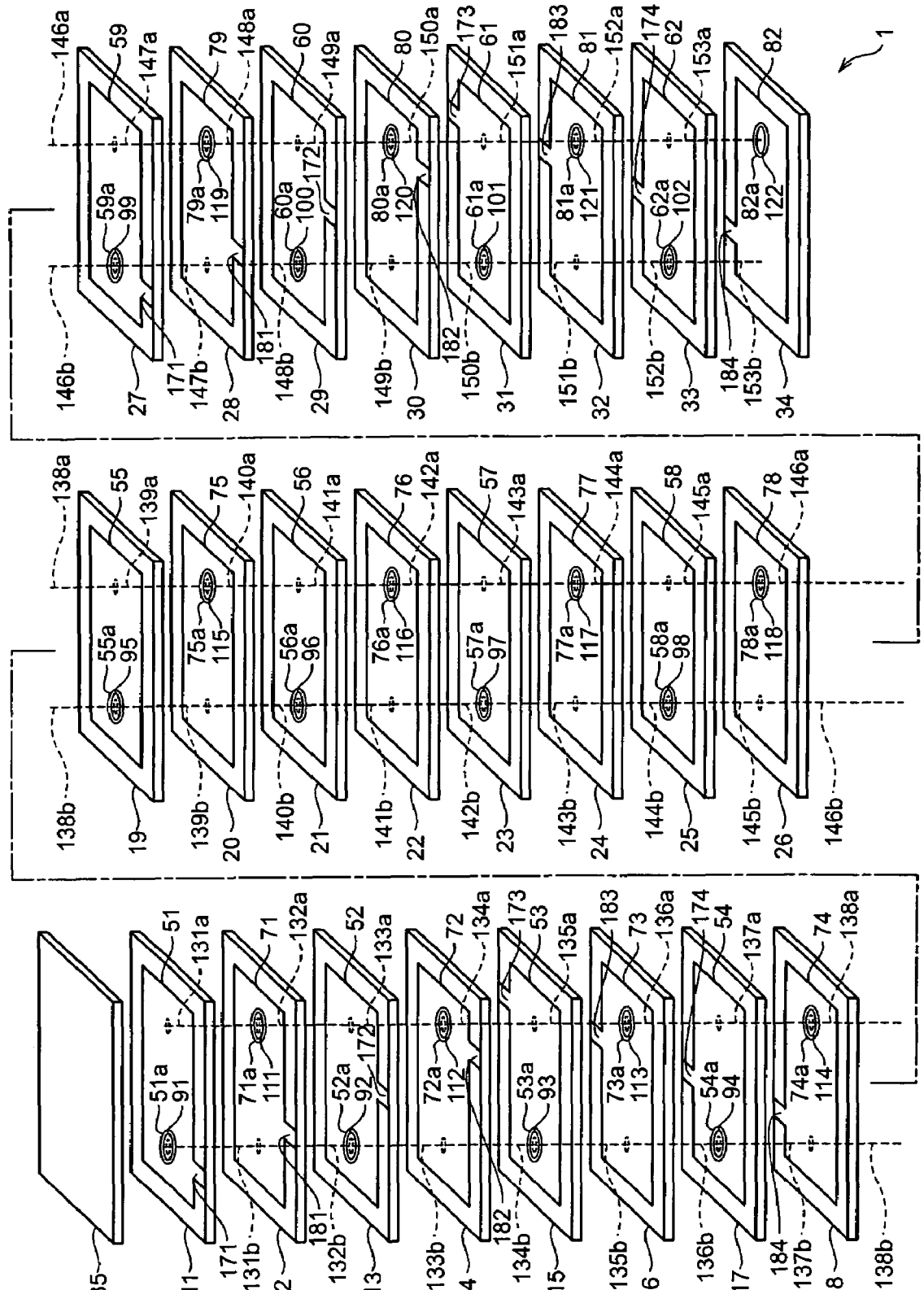
FIG. 6 is an exploded perspective view of the multilayer body included in the multilayer capacitor in accordance with a fifth embodiment.

With reference to FIG. 6, the structure of the multilayer capacitor in accordance with a fifth embodiment will now be explained. The multilayer capacitor in accordance with the fifth embodiment differs from the multilayer capacitor C1 in accordance with the first embodiment in terms of the number of first inner electrodes electrically connected to first terminal electrodes 3a to 3d via lead conductors 171 to 174 and the number of second inner electrodes electrically connected to second terminal electrodes 5a to 5d via lead conductors 181 to 184. FIG. 6 is an exploded perspective view of the multilayer body included in the multilayer capacitor in accordance with the fifth embodiment.

As with the multilayer capacitor C1 in accordance with the first embodiment, the multilayer capacitor in accordance with the fifth embodiment comprises a multilayer body 1, first terminal electrodes 3a to 3d formed on the multilayer body 1, and second terminal electrodes 5a to 5d similarly formed on the multilayer body 1, though they are not depicted.

In the multilayer capacitor in accordance with the fifth embodiment, as shown in FIG. 6, a first inner electrode 59 is electrically connected to the first terminal electrode 3a via the lead conductor 171. A first inner electrode 60 is electrically connected to the first terminal electrode 3b via the lead conductor 172. A first inner electrode 61 is electrically connected to the first terminal electrode 3c via the lead conductor 173. A first inner electrode 62 is electrically connected to the first terminal electrode 3d via the lead conductor 174. As a consequence, first inner electrodes 55 to 58 are also electrically connected to the first terminal electrodes 3a to 3d, whereby first inner electrodes 51 to 62 are connected in parallel. The lead conductors 171, 172 are integrally formed with their corresponding first inner electrodes 59, 60, and extend therefrom so as to reach a side face 1a of the multilayer body 1. The lead conductors 173, 174 are integrally formed with their corresponding first inner electrodes 61, 62, and extend therefrom so as to reach a side face 1b of the multilayer body 1.

A second inner electrode 79 is electrically connected to the second terminal electrode 5a via the lead conductor 181. A second inner electrode 80 is electrically connected to the second terminal electrode 5b via the lead conductor 182. A second inner electrode 81 is electrically connected to the second terminal electrode 5c via the lead conductor 183. A second inner electrode 82 is electrically connected to the second terminal electrode 5d via the lead conductor 184. As a consequence, second inner electrodes 75 to 78 are also electrically connected to the first terminal electrodes 5a to 5d, whereby second inner electrodes 71 to 82 are connected in parallel. The lead conductors 181, 182 are integrally formed with their corresponding second inner electrodes 79, 80, and extend therefrom so as to reach the side face 1a of the multilayer body 1. The lead conductors 183, 184 are integrally formed with their corresponding second inner electrodes 81, 82, and extend therefrom so as to reach the side face 1b of the multilayer body 1.

In the multilayer capacitor in accordance with the fifth embodiment, the number of first inner electrodes 51 to 54, 59 to 62 connected to the first terminal electrodes 3a to 3d via the lead conductors 171 to 174 is 8, which is smaller than the total number of the first inner electrodes 51 to 62. In the multilayer capacitor in accordance with the fifth embodiment, the number of second inner electrodes 71 to 74, 79 to 82 connected to the second terminal electrodes 5a to 5d via the lead conductors 181 to 184 is 8, which is smaller than the total number of the second inner electrodes 71 to 82. Therefore, the multilayer capacitor in accordance with the fifth embodiment yields an equivalent series resistance greater than that of the conventional multilayer capacitor in which all the inner electrodes are connected to their corresponding terminal electrodes via lead conductors.

As compared with the multilayer capacitor C1, the multilayer capacitor in accordance with the fifth embodiment has a greater number of first inner electrodes 51 to 54, 59 to 62 connected to the first terminal electrodes 3a to 3d via the lead conductors 171 to 174, whereas the lead conductors 171 to 174 are connected in parallel to their corresponding first terminal electrodes 3a to 3d. Also, as compared with the multilayer capacitor C1, the multilayer capacitor in accordance with the fifth embodiment has a greater number of second inner electrodes 71 to 74, 79 to 82 connected to the second terminal electrodes 5a to 5d via the lead conductors 181 to 184, whereas the lead conductors 181 to 184 are connected in parallel to their corresponding second terminal electrodes 5a to 5d. Therefore, the multilayer capacitor in accordance with the fifth embodiment yields an equivalent series resistance smaller than that of the multilayer capacitor C1.

As in the foregoing, by adjusting the number of first inner electrodes 51 to 54, 59 to 62 connected to the first terminal electrodes 3a to 3d via the lead conductors 171 to 174 and the number of second inner electrodes 71 to 74, 79 to 82 connected to the second terminal electrodes 5a to 5d via the lead conductors 181 to 184, this embodiment sets the equivalent series resistance of the multilayer capacitor to a desirable value. As a result, the equivalent series resistance can be regulated easily with a high precision.

Sixth Embodiment

Figure 7:
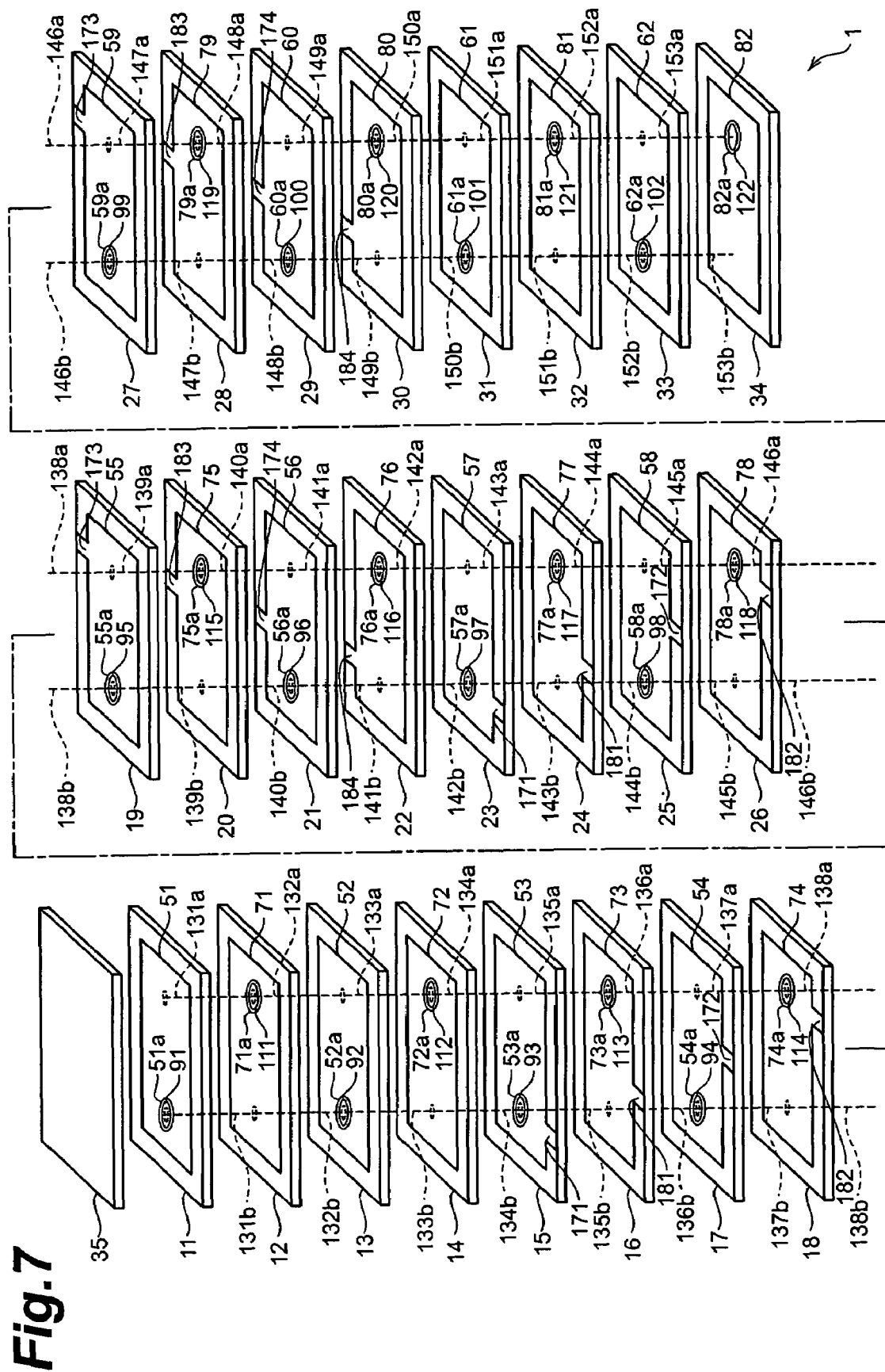
FIG. 7 is an exploded perspective view of the multilayer body included in the multilayer capacitor in accordance with a sixth embodiment.

With reference to FIG. 7, the structure of the multilayer capacitor in accordance with a sixth embodiment will now be explained. The multilayer capacitor in accordance with the sixth embodiment differs from the multilayer capacitor C1 in accordance with the first embodiment in terms of the number of first inner electrodes electrically connected to first terminal electrodes 3a to 3d via lead conductors 171 to 174 and the number of second inner electrodes electrically connected to second terminal electrodes 5a to 5d via lead conductors 181 to 184. The multilayer capacitor in accordance with the sixth embodiment also differs from the multilayer capacitor in accordance with the fifth embodiment in terms of positions of the first inner electrodes electrically connected to the first terminal electrodes 3a to 3d via the lead conductors 171 to 174 in the laminating direction and positions of the second inner electrodes electrically connected to the second terminal electrodes 5a to 5d via the lead conductors 181 to 184 in the laminating direction. FIG. 7 is an exploded perspective view of the multilayer body included in the multilayer capacitor in accordance with the sixth embodiment.

As with the multilayer capacitor C1 in accordance with the first embodiment, the multilayer capacitor in accordance with the sixth embodiment comprises a multilayer body 1, first terminal electrodes 3a to 3d formed on the multilayer body 1, and second terminal electrodes 5a to 5d similarly formed on the multilayer body 1, though they are not depicted.

In the multilayer capacitor in accordance with the sixth embodiment, as shown in FIG. 7, first inner electrodes 53, 57 are electrically connected to the first terminal electrode 3a via the lead conductor 171. First inner electrodes 54, 58 are electrically connected to the first terminal electrode 3b via the lead conductor 172. First inner electrodes 55, 59 are electrically connected to the first terminal electrode 3c via the lead conductor 173. First inner electrodes 56, 60 are electrically connected to the first terminal electrode 3d via the lead conductor 174. As a consequence, first inner electrodes 51, 52, 61, 62 are also electrically connected to the first terminal electrodes 3a to 3d, whereby first inner electrodes 51 to 62 are connected in parallel. The lead conductors 171, 172 are integrally formed with their corresponding first inner electrodes 53, 54, 57, 58, and extend therefrom so as to reach a side face 1a of the multilayer body 1. The lead conductors 173, 174 are integrally formed with their corresponding first inner electrodes 55, 56, 59, 60, and extend therefrom so as to reach a side face 1b of the multilayer body 1.

Second inner electrodes 73, 77 are electrically connected to the second terminal electrode 5a via the lead conductor 181. Second inner electrodes 74, 78 are electrically connected to the second terminal electrode 5b via the lead conductor 182. Second inner electrodes 75, 79 are electrically connected to the second terminal electrode 5c via the lead conductor 183. Second inner electrodes 76, 80 are electrically connected to the second terminal electrode 5d via the lead conductor 184. As a consequence, second inner electrodes 71, 72, 81, 82 are also electrically connected to the second terminal electrodes 5a to 5d, whereby second inner electrodes 71 to 82 are connected in parallel. The lead conductors 181, 182 are integrally formed with their corresponding first inner electrodes 73, 74, 77, 78, and extend therefrom so as to reach the side face 1a of the multilayer body 1. The lead conductors 183, 184 are integrally formed with their corresponding first inner electrodes 75, 76, 79, 80, and extend therefrom so as to reach the side face 1b of the multilayer body 1.

In the multilayer capacitor in accordance with the sixth embodiment, the number of first inner electrodes 53 to 60 connected to the first terminal electrodes 3a to 3d via the lead conductors 171 to 174 is 8, which is smaller than the total number of the first inner electrodes 51 to 62. In the multilayer capacitor in accordance with the sixth embodiment, the number of second inner electrodes 73 to 80 connected to the second terminal electrodes 5a to 5d via the lead conductors 181 to 184 is 8, which is smaller than the total number of the first inner electrodes 71 to 82. Therefore, the multilayer capacitor in accordance with the sixth embodiment yields an equivalent series resistance greater than that of the conventional multilayer capacitor in which all the inner electrodes are connected to their corresponding terminal electrodes via lead conductors.

As compared with the multilayer capacitor C1, the multilayer capacitor in accordance with the sixth embodiment has a greater number of first inner electrodes 53 to 60 connected to the first terminal electrodes 3a to 3d via the lead conductors 171 to 174, whereas the lead conductors 171 to 174 are connected in parallel to their corresponding first terminal electrodes 3a to 3d. Also, as compared with the multilayer capacitor C1, the multilayer capacitor in accordance with the sixth embodiment has a greater number of second inner electrodes 73 to 80 connected to the second terminal electrodes 5a to 5d via the lead conductors 181 to 184, whereas the lead conductors 181 to 184 are connected in parallel to their corresponding second terminal electrodes 5a to 5d. Therefore, the equivalent series resistance of the multilayer capacitor in accordance with the sixth embodiment is smaller than that of the multilayer capacitor C1.

Also, as in the multilayer capacitors in accordance with the second to fourth embodiments, the equivalent series resistance of the multilayer capacitor in accordance with the sixth embodiment is smaller than that of the multilayer capacitor in accordance with the fifth embodiment because of the difference in resistance components of the through-hole conductors 131a to 153a, 131b to 153b.

As in the foregoing, by adjusting the number and positions in the laminating direction of first inner electrodes 53 to 60 connected to the first terminal electrodes 3a to 3d via the lead conductors 171 to 174 and the number and positions in the laminating direction of second inner electrodes 73 to 80 connected to the second terminal electrodes 5a to 5d via the lead conductors 181 to 184, this embodiment sets the equivalent series resistance of the multilayer capacitor to a desirable value. As a result, the equivalent series resistance can be regulated easily with a high precision.

Seventh Embodiment

Figure 8:
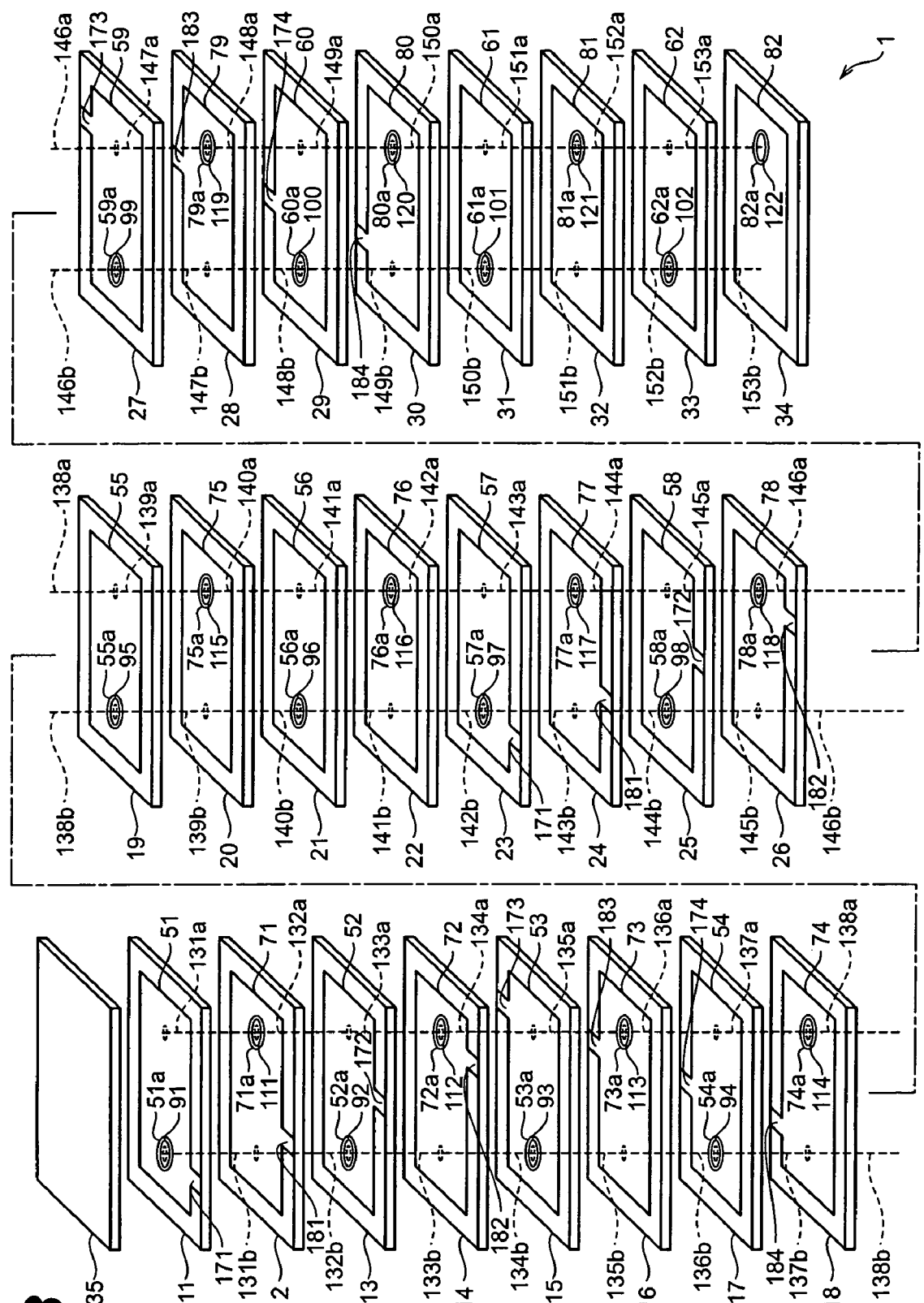
FIG. 8 is an exploded perspective view of the multilayer body included in the multilayer capacitor in accordance with a seventh embodiment.

With reference to FIG. 8, the structure of the multilayer capacitor in accordance with a seventh embodiment will now be explained. The multilayer capacitor in accordance with the seventh embodiment differs from the multilayer capacitor C1 in accordance with the first embodiment in terms of the number of first inner electrodes electrically connected to first terminal electrodes 3a to 3d via lead conductors 171 to 174 and the number of second inner electrodes electrically connected to second terminal electrodes 5a to 5d via lead conductors 181 to 184. The multilayer capacitor in accordance with the seventh embodiment also differs from the multilayer capacitor in accordance with the fifth embodiment in terms of positions of first inner electrodes electrically connected to the first terminal electrodes 3a to 3d via the lead conductors 171 to 174 in the laminating direction and positions of second inner electrodes electrically connected to the second terminal electrodes 5a to 5d via the lead conductors 181 to 184 in the laminating direction. FIG. 8 is an exploded perspective view of the multilayer body included in the multilayer capacitor in accordance with the seventh embodiment.

As with the multilayer capacitor C1 in accordance with the first embodiment, the multilayer capacitor in accordance with the seventh embodiment comprises a multilayer body 1, first terminal electrodes 3a to 3d formed on the multilayer body 1, and second terminal electrodes 5a to 5d similarly formed on the multilayer body 1, though they are not depicted.

In the multilayer capacitor in accordance with the seventh embodiment, the number of first inner electrodes 51 to 54, 57 to 60 connected to the first terminal electrodes 3a to 3d via the lead conductors 171 to 174 is 8, which is smaller than the total number of the first inner electrodes 51 to 62. In the multilayer capacitor in accordance with the seventh embodiment, the number of second inner electrodes 71 to 74, 77 to 80 connected to the second terminal electrodes 5a to 5d via the lead conductors 181 to 184 is 8, which is smaller than the total number of the second inner electrodes 71 to 82. Therefore, the multilayer capacitor in accordance with the seventh embodiment yields an equivalent series resistance greater than that of the conventional multilayer capacitor in which all the inner electrodes are connected to their corresponding terminal electrodes via lead conductors.

As compared with the multilayer capacitor C1, the multilayer capacitor in accordance with the seventh embodiment has a greater number of first inner electrodes 51 to 54, 57 to 60 connected to the first terminal electrodes 3a to 3d via the lead conductors 171 to 174, whereas the lead conductors 171 to 174 are connected in parallel to their corresponding first terminal electrodes 3a to 3d. Also, as compared with the multilayer capacitor C1, the multilayer capacitor in accordance with the seventh embodiment has a greater number of second inner electrodes 71 to 74, 77 to 80 connected to the second terminal electrodes 5a to 5d via the lead conductors 181 to 184, whereas the lead conductors 181 to 184 are connected in parallel to their corresponding second terminal electrodes 5a to 5d. Therefore, the equivalent series resistance of the multilayer capacitor in accordance with the seventh embodiment is smaller than that of the multilayer capacitor C1.

Also, as in the multilayer capacitors in accordance with the second to fourth embodiments, the equivalent series resistance of the multilayer capacitor in accordance with the seventh embodiment is smaller than that of the multilayer capacitor in accordance with the fifth embodiment because of the difference in resistance components of the through-hole conductors 131a to 153a, 131b to 153b.

As in the foregoing, by adjusting the number and positions in the laminating direction of first inner electrodes 51 to 54, 57 to 60 connected to the first terminal electrodes 3a to 3d via the lead conductors 171 to 174 and the number and positions in the laminating direction of second inner electrodes 71 to 74, 77 to 80 connected to the second terminal electrodes 5a to 5d via the lead conductors 181 to 184, this embodiment sets the equivalent series resistance of the multilayer capacitor to a desirable value. As a result, the equivalent series resistance can be regulated easily with a high precision.

Eighth Embodiment

Figure 9:
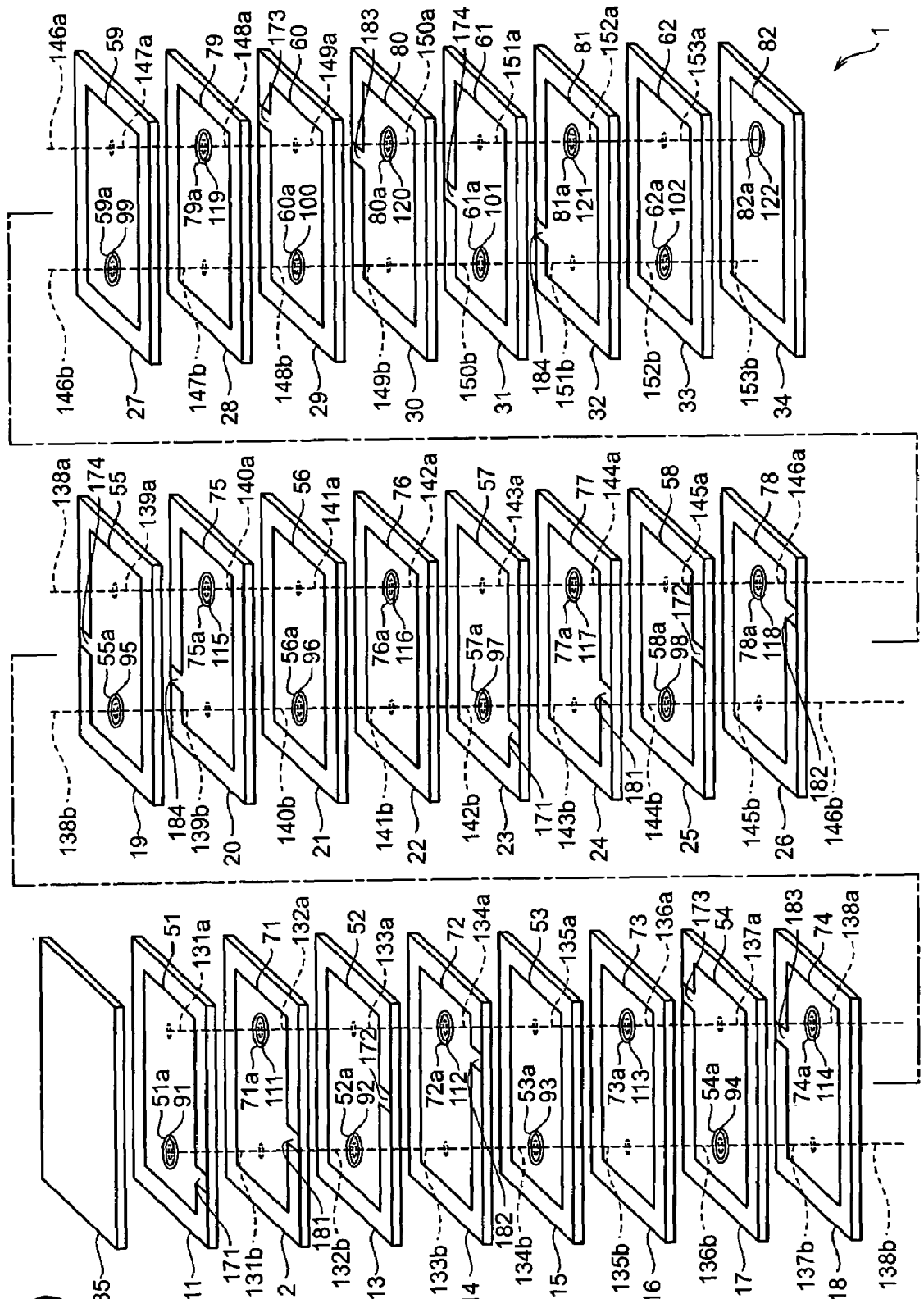
FIG. 9 is an exploded perspective view of the multilayer body included in the multilayer capacitor in accordance with an eighth embodiment.

With reference to FIG. 9, the structure of the multilayer capacitor in accordance with an eighth embodiment will now be explained. The multilayer capacitor in accordance with the eighth embodiment differs from the multilayer capacitor C1 in accordance with the first embodiment in terms of the number of first inner electrodes electrically connected to first terminal electrodes 3a to 3d via lead conductors 171 to 174 and the number of second inner electrodes electrically connected to second terminal electrodes 5a to 5d via lead conductors 181 to 184. The multilayer capacitor in accordance with the eighth embodiment also differs from the multilayer capacitor in accordance with the fifth embodiment in terms of positions of the first inner electrodes electrically connected to the first terminal electrodes 3a to 3d via the lead conductors 171 to 174 in the laminating direction and positions of the second inner electrodes electrically connected to the second terminal electrodes 5a to 5d via the lead conductors 181 to 184 in the laminating direction. FIG. 9 is an exploded perspective view of the multilayer body included in the multilayer capacitor in accordance with the eighth embodiment.

As with the multilayer capacitor C1 in accordance with the first embodiment, the multilayer capacitor in accordance with the eighth embodiment comprises a multilayer body 1, first terminal electrodes 3a to 3d formed on the multilayer body 1, and second terminal electrodes 5a to 5d similarly formed on the multilayer body 1, though they are not depicted.

In the multilayer capacitor in accordance with the eighth embodiment, the number of first inner electrodes 51, 52, 54, 55, 57, 58, 60, 61 connected to the first terminal electrodes 3a to 3d via the lead conductors 171 to 174 is 8, which is smaller than the total number of the first inner electrodes 51 to 62. In the multilayer capacitor in accordance with the eighth embodiment, the number of second inner electrodes 71, 72, 74, 75, 77, 78, 80, 81 connected to the second terminal electrodes 5a to 5d via the lead conductors 181 to 184 is 8, which is smaller than the total number of the second inner electrodes 71 to 82. Therefore, the multilayer capacitor in accordance with the eighth embodiment yields an equivalent series resistance greater than that of the conventional multilayer capacitor in which all the inner electrodes are connected to their corresponding terminal electrodes via lead conductors.

As compared with the multilayer capacitor C1, the multilayer capacitor in accordance with the eighth embodiment has a greater number of first inner electrodes 51, 52, 54, 55, 57, 58, 60, 61 connected to the first terminal electrodes 3a to 3d via the lead conductors 171 to 174, whereas the lead conductors 171 to 174 are connected in parallel to their corresponding first terminal electrodes 3a to 3d. Also, the multilayer capacitor in accordance with the eighth embodiment has a greater number of second inner electrodes 71, 72, 74, 75, 77, 78, 80, 81 connected to the second terminal electrodes 5a to 5d via the lead conductors 181 to 184, whereas the lead conductors 181 to 184 are connected in parallel to their corresponding second terminal electrodes 5a to 5d. Therefore, the equivalent series resistance of the multilayer capacitor in accordance with the eighth embodiment is smaller than that of the multilayer capacitor C1.

Also, as in the multilayer capacitors in accordance with the second to fourth embodiments, the equivalent series resistance of the multilayer capacitor in accordance with the eighth embodiment is smaller than that of the multilayer capacitor in accordance with the fifth embodiment because of the difference in resistance components of the through-hole conductors 131a to 153a, 131b to 153b.

As in the foregoing, by adjusting the number and positions in the laminating direction of first inner electrodes 51, 52, 54, 55, 57, 58, 60, 61 connected to the first terminal electrodes 3a to 3d via the lead conductors 171 to 174 and the number and positions in the laminating direction of second inner electrodes 71, 72, 74, 75, 77, 78, 80, 81 connected to the second terminal electrodes 5a to 5d via the lead conductors 181 to 184, this embodiment sets the equivalent series resistance of the multilayer capacitor to a desirable value. As a result, the equivalent series resistance can be regulated easily with a high precision.

Ninth Embodiment

Figure 10:
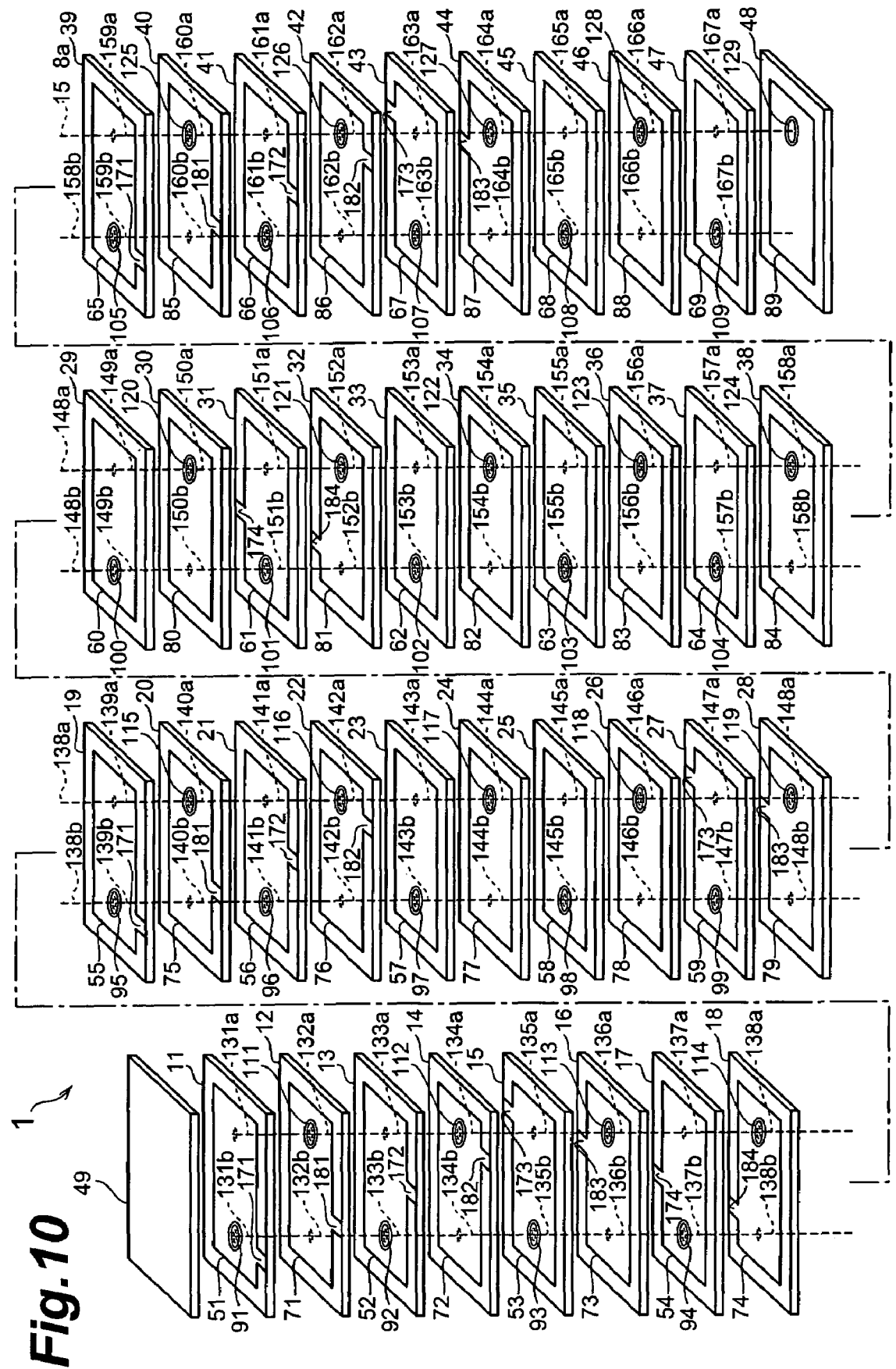
FIG. 10 is an exploded perspective view of the multilayer body included in the multilayer capacitor in accordance with a ninth embodiment.

With reference to FIG. 10, the structure of the multilayer capacitor in accordance with a ninth embodiment will now be explained. FIG. 10 is an exploded perspective view of the multilayer body included in the multilayer capacitor in accordance with the ninth embodiment.

As with the multilayer capacitor C1 in accordance with the first embodiment, the multilayer capacitor in accordance with the ninth embodiment comprises a multilayer body 1, first terminal electrodes 3a to 3d formed on the multilayer body 1, and second terminal electrodes 5a to 5d similarly formed on the multilayer body 1, though they are not depicted.

As is also shown in FIG. 10, the multilayer body 1 is constructed by alternately laminating a plurality of (39 in this embodiment) dielectric layers 11 to 49 and a plurality of (19 each in this embodiment) first and second inner electrodes 51 to 69, 71 to 89. In the actual multilayer capacitor, the dielectric layers 11 to 49 are integrated together to such an extent that their boundaries are indiscernible.

Each of the first inner electrodes 51 to 69 has a rectangular form. The first inner electrodes 51 to 69 are formed at respective positions separated by a predetermined gap from a side face parallel to the laminating direction of the dielectric layers 11 to 49 (hereinafter simply referred to as "laminating direction") in the multilayer body 1. The first inner electrodes 51 to 69 are formed with openings such as to expose the dielectric layers 11, 13, 15, 17, 19, 21, 23, 25, 27, 29, 31, 33, 35, 37, 39, 41, 43, 45, 47, respectively. On the dielectric layers 11, 13, 15, 17, 19, 21, 23, 25, 27, 29, 31, 33, 35, 37, 39, 41, 43, 45, 47, land-like inner conductors 91 to 109 are positioned at regions corresponding to the openings formed in the first inner electrodes 51 to 69, respectively.

Each of the second inner electrodes 71 to 89 has a rectangular form. The second inner electrodes 71 to 69 are formed at respective positions separated by a predetermined gap from a side face parallel to the laminating direction in the multilayer body 1. The second inner electrodes 71 to 89 are formed with openings such as to expose the dielectric layers 12, 14, 16, 18, 20, 22, 24, 26, 28, 30, 32, 34, 36, 38, 40, 42, 44, 46, 48, respectively. On the dielectric layers 12, 14, 16, 18, 20, 22, 24, 26, 28, 30, 32, 34, 36, 38, 40, 42, 44, 46, 48, land-like inner conductors 111 to 129 are positioned at regions corresponding to the openings formed in the second inner electrodes 71 to 89, respectively.

Through-hole conductors 131a, 133a, 135a, 137a, 139a, 141a, 143a, 145a, 147a, 149a, 151a, 153a, 155a, 157a, 159a, 161a, 163a, 165a, 167a penetrating through the dielectric layers 11, 13, 15, 17, 19, 21, 23, 25, 27, 29, 31, 33, 35, 37, 39, 41, 43, 45, 47 in their thickness direction are formed at respective positions corresponding to the inner conductors 111 to 129 in these dielectric layers. Through-hole conductors 131b, 133b, 135b, 137b, 139b, 141b, 143b, 145b, 147b, 149b, 151b, 153b, 155b, 157b, 159b, 161b, 163b, 165b, 167b penetrating through the dielectric layers 11, 13, 15, 17, 19, 21, 23, 25, 27, 29, 31, 33, 35, 37, 39, 41, 43, 45, 47 in their thickness direction are formed at respective positions corresponding to the inner conductors 91 to 109 in these dielectric layers. The through-hole conductors 131a, 133a, 135a, 137a, 139a, 141a, 143a, 145a, 147a, 149a, 151a, 153a, 155a, 157a, 159a, 161a, 163a, 165a, 167a are electrically connected to their corresponding first inner electrodes 51 to 69. The through-hole conductors 131b, 133b, 135b, 137b, 139b, 141b, 143b, 145b, 147b, 149b, 151b, 153b, 155b, 157b, 159b, 161b, 163b, 165b, 167b are electrically connected to their corresponding inner conductors 91 to 109. While in a state laminated with the dielectric layers 11 to 48, the through-hole conductors 131a, 133a, 135a, 137a, 139a, 141a, 143a, 145a, 147a, 149a, 151a, 153a, 155a, 157a, 159a, 161a, 163a, 165a, 167a are electrically connected to their corresponding first inner electrodes 111 to 129. While in a state laminated with the dielectric layers 11 to 48, the through-hole conductors 131b, 133b, 135b, 137b, 139b, 141b, 143b, 145b, 147b, 149b, 151b, 153b, 155b, 157b, 159b, 161b, 163b, 165b, 167b are electrically connected to their corresponding second inner electrodes 71 to 89.

Through-hole conductors 132a, 134a, 136a, 138a, 140a, 142a, 144a, 146a, 148a, 150a, 152a, 154a, 156a, 158a, 160a, 162a, 164a, 166a penetrating through the dielectric layers 12, 14, 16, 18, 20, 22, 24, 26, 28, 30, 32, 34, 36, 38, 40, 42, 44, 46 in their thickness direction are formed at respective positions corresponding to the inner conductors 111 to 129 in these dielectric layers. Through-hole conductors 132b, 134b, 136b, 138b, 140b, 142b, 144b, 146b, 148b, 150b, 152b, 154b, 156b, 158b, 160b, 162b, 164b, 166b penetrating through the dielectric layers 12, 14, 16, 18, 20, 22, 24, 26, 28, 30, 32, 34, 36, 38, 40, 42, 44, 46 in their thickness direction are formed at respective positions corresponding to the inner conductors 91 to 109 in these dielectric layers. The through-hole conductors 132a, 134a, 136a, 138a, 140a, 142a, 144a, 146a, 148a, 150a, 152a, 154a, 156a, 158a, 160a, 162a, 164a, 166a are electrically connected to their corresponding inner conductors 111 to 129. The through-hole conductors 132b, 134b, 136b, 138b, 140b, 142b, 144b, 146b, 148b, 150b, 152b, 154b, 156b, 158b, 160b, 162b, 164b, 166b are electrically connected to their corresponding second inner electrodes 71 to 88. While in a state laminated with the dielectric layers 11 to 48, the through-hole conductors 132a, 134a, 136a, 138a, 140a, 142a, 144a, 146a, 148a, 150a, 152a, 154a, 156a, 158a, 160a, 162a, 164a, 166a are electrically connected to the first inner electrodes 51 to 69. While in a state laminated with the dielectric layers 11 to 48, the through-hole conductors 132b, 134b, 136b, 138b, 140b, 142b, 144b, 146b, 148b, 150b, 152b, 154b, 156b, 158b, 160b, 162b, 164b, 166b are electrically connected to their corresponding inner conductors 92 to 109.

When the dielectric layers 11 to 48 are laminated, the through-hole conductors 131a to 167a are arranged substantially linearly in parallel with each other in the laminating direction, and are electrically connected to each other, so as to construct a conductive path. The first inner electrodes 51 to 69 are electrically connected together via the through-hole conductors 131a to 167a and inner conductors 111 to 129.

The first inner electrodes 51, 55, 65 are electrically connected to the first terminal electrode 3a via a lead conductor 171. The first inner electrodes 52, 56, 66 are electrically connected to the first terminal electrode 3b via a lead conductor 172. The first inner electrodes 53, 59, 67 are electrically connected to the first terminal electrode 3c via a lead conductor 173. The first inner electrodes 54, 61 are electrically connected to the first terminal electrode 3d via a lead conductor 174. As a consequence, the first inner electrodes 57, 58, 60, 62 to 64, 68, 69 are also electrically connected to the first terminal electrodes 3a to 3d, whereby the first inner electrodes 51 to 69 are connected in parallel.

The lead conductors 171, 172 are integrally formed with their corresponding first inner electrodes 51, 55, 65, 52, 56, 66, and extend therefrom so as to reach a side face 1a of the multilayer body 1. The lead conductors 173, 174 are integrally formed with their corresponding first inner electrodes 53, 59, 67, 54, 61, and extend therefrom so as to reach a side face 1*b* of the multilayer body 1.

When the dielectric layers 11 to 48 are laminated, the through-hole conductors 131*b* to 167*b* are arranged substantially linearly in parallel with each other in the laminating direction, and are electrically connected to each other, so as to construct a conductive path as with the through-hole conductors 131*a* to 167*a*. The second inner electrodes 71 to 89 are electrically connected together via the through-hole conductors 131*b* to 167*b* and inner conductors 91 to 109.

The second inner electrodes 71, 75, 85 are electrically connected to the second terminal electrode 5*a* via a lead conductor 181. The second inner electrodes 72, 76, 86 are electrically connected to the second terminal electrode 5*b* via a lead conductor 182. The second inner electrodes 73, 79, 87 are electrically connected to the second terminal electrode 5*c* via a lead conductor 183. The second inner electrodes 74, 81 are electrically connected to the second terminal electrode 5*d* via a lead conductor 184. As a consequence, the second inner electrodes 77, 78, 80, 82 to 84, 88, 89 are also electrically connected to the second terminal electrodes 5*a* to 5*d*, whereby the second inner electrodes 71 to 89 are connected in parallel.

The lead conductors 181, 182 are integrally formed with their corresponding second inner electrodes 71, 75, 85, 72, 76, 86, and extend therefrom so as to reach the side face 1*a* of the multilayer body 1. The lead conductors 183, 184 are integrally formed with their corresponding second inner electrodes 73, 79, 87, 74, 81, and extend therefrom so as to reach the side face 1*b* of the multilayer body 1.

In the multilayer capacitor in accordance with the ninth embodiment, the number of first inner electrodes 51 to 56, 59, 61, 65 to 67 connected to the first terminal electrodes 3*a* to 3*d* via the lead conductors 171 to 174 is 11, which is smaller than the total number (19 in this embodiment) of the first inner electrodes 51 to 69. In the multilayer capacitor in accordance with the ninth embodiment, the number of second inner electrodes 71 to 76, 79, 81, 85 to 87 connected to the second terminal electrodes 5*a* to 5*d* via the lead conductors 181 to 184 is 11, which is smaller than the total number (19 in this embodiment) of the second inner electrodes 71 to 89. As a consequence, the multilayer capacitor in accordance with the ninth embodiment yields an equivalent series resistance greater than that of the conventional multilayer capacitor in which all the inner electrodes are connected to their corresponding terminal electrodes via lead conductors.

Also, because of the difference in the resistance components of the through-hole conductors 131*a* to 167*a*, 131*b* to 167*b* as in the multilayer capacitors in accordance with the second to fourth embodiments, the equivalent series resistance of the multilayer capacitor in accordance with the ninth embodiment is smaller than that of a multilayer capacitor in which the inner electrodes 51 to 56, 59, 61, 65 to 67, 71 to 76, 79, 81, 85 to 87 are connected to the terminal electrodes 3*a* to 3*d*, 5*a* to 5*d* via the lead conductors 171 to 174, 181 to 184 are arranged adjacent to each other in the laminating direction.

As in the foregoing, by adjusting the number and positions in the laminating direction of first inner electrodes 51 to 56, 59, 61, 65 to 67 connected to the first terminal electrodes 3*a* to 3*d* via the lead conductors 171 to 174 and the number and positions in the laminating direction of second inner electrodes 71 to 76, 79, 81, 85 to 87 connected to the second terminal electrodes 5*a* to 5*d* via the lead conductors 181 to 184, this embodiment sets the equivalent series resistance of the multilayer capacitor to a desirable value. As a result, the equivalent series resistance can be regulated easily with a high precision.

Tenth Embodiment

Figure 11:
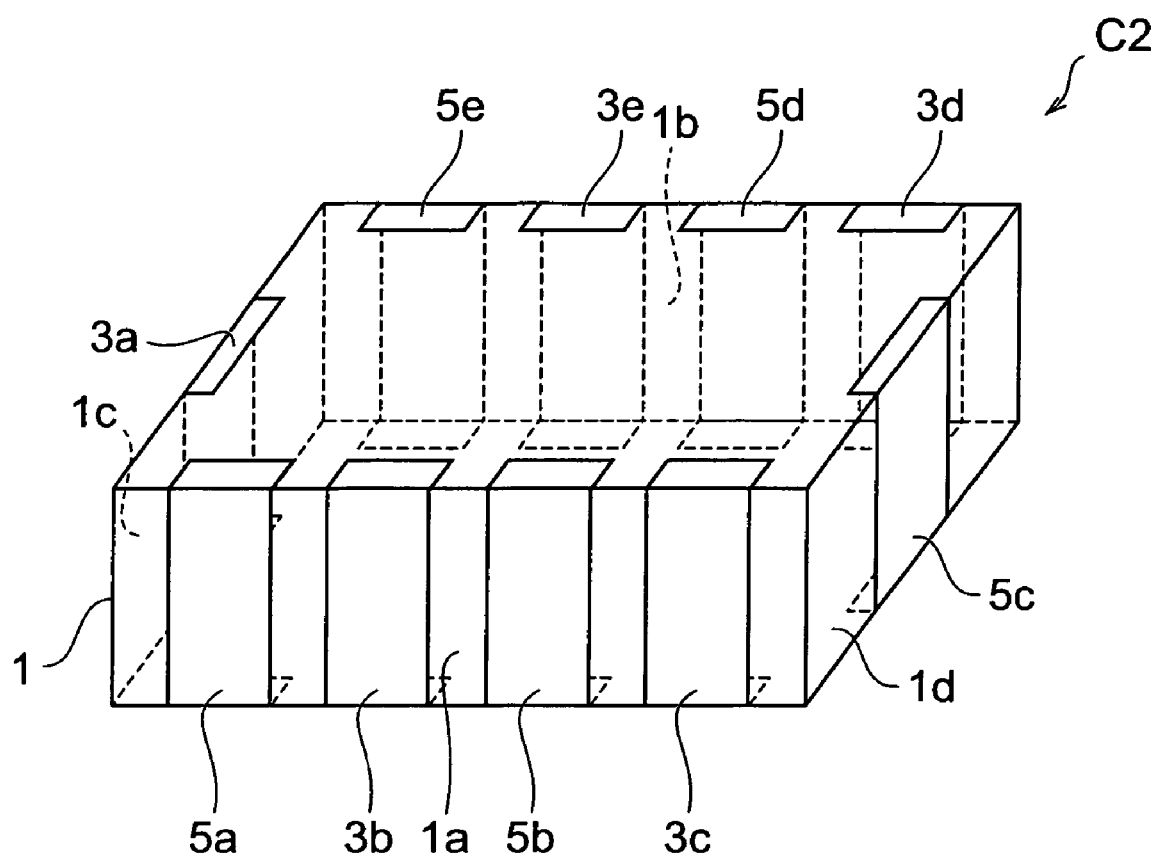
FIG. 11 is a perspective view showing the multilayer body included in the multilayer capacitor in accordance with a tenth embodiment.
Figure 12:
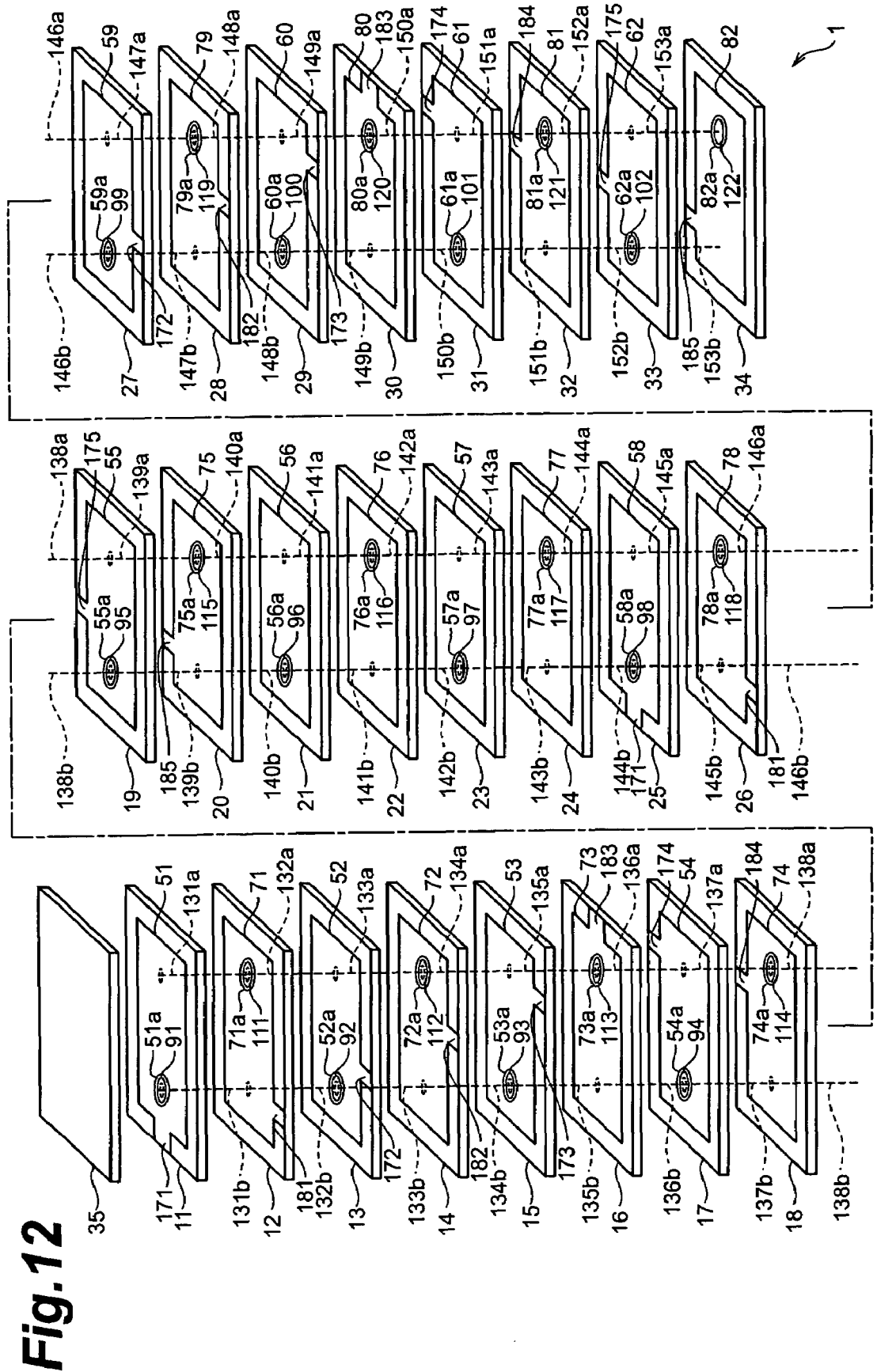
FIG. 12 is an exploded perspective view of the multilayer body included in the multilayer capacitor in accordance with the tenth embodiment.

With reference to FIGS. 11 and 12, the structure of the multilayer capacitor C2 in accordance with a tenth embodiment will be explained. FIG. 11 is a perspective view showing the multilayer capacitor in accordance with the tenth embodiment. FIG. 12 is an exploded perspective view of the multilayer body included in the multilayer capacitor in accordance with the tenth embodiment. The multilayer capacitor C2 in accordance with the tenth embodiment differs from the multilayer capacitor C1 in accordance with the first embodiment in terms of the number of first and second terminal electrodes.

As shown in FIG. 11, the multilayer capacitor C2 comprises a multilayer body 1, a plurality of (5 in this embodiment) first terminal electrodes 3*a* to 3*e* formed on the multilayer body 1, and a plurality of (5 in this embodiment) second terminal electrodes 5*a* to 5*e* similarly formed on the multilayer body 1.

The first terminal electrode 3*a* is positioned on the side of a side face 1*c* of the multilayer body 1. The first terminal electrodes 3*b*, 3*c* and second terminal electrodes 5*a*, 5*b* are positioned on the side of a side face 1*a* of the multilayer body 1. The second terminal electrode 5*c* is positioned on the side of a side face 1*d* of the multilayer body 1. The first terminal electrodes 3*d*, 3*e* and second terminal electrodes 5*d*, 5*e* are positioned on the side of a side face 1*b* of the multilayer body 1. The first terminal electrodes 3*a* to 3*e* are electrically insulated from the second terminal electrodes 5*a* to 5*e*.

In the multilayer capacitor C2, as shown in FIG. 12, first inner electrodes 51, 58 are electrically connected to the first terminal electrode 3*a* via a lead conductor 171. First inner electrodes 52, 59 are electrically connected to the first terminal electrode 3*b* via a lead conductor 172. First inner electrodes 53, 60 are electrically connected to the first terminal electrode 3*c* via a lead conductor 173. First inner electrodes 54, 61 are electrically connected to the first terminal electrode 3*d* via a lead conductor 174. First inner electrodes 55, 62 are electrically connected to the first terminal electrode 3*e* via a lead conductor 175. As a consequence, first inner electrodes 56, 57 are also electrically connected to the first terminal electrodes 3*a* to 3*e*, whereby first inner electrodes 51 to 62 are connected in parallel.

The lead conductor 171 is integrally formed with the first inner electrodes 51, 58, and extends therefrom so as to reach the side face 1*c* of the multilayer body 1. The lead conductors 172, 173 are integrally formed with their corresponding first inner electrodes 52, 53, 59, 60, and extend therefrom so as to reach the side face 1*a* of the multilayer body 1. The lead conductors 174, 175 are integrally formed with their corresponding first inner electrodes 54, 55, 61, 62, and extend therefrom so as to reach the side face 1*b* of the multilayer body 1.

Second inner electrodes 71, 78 are electrically connected to the second terminal electrode 5*a* via a lead conductor 181. Second inner electrodes 72, 79 are electrically connected to the second terminal electrode 5*b* via a lead conductor 182. Second inner electrodes 73, 80 are electrically connected to the second terminal electrode 5*c* via a lead conductor 183. Second inner electrodes 74, 81 are electrically connected to the second terminal electrode 5*d* via a lead conductor 184. Second inner electrodes 75, 82 are electrically connected to the second terminal electrode 5*e* via a lead conductor 185.

As a consequence, second inner electrodes 75, 76 are also electrically connected to the second terminal electrodes 5a to 5e, whereby the second inner electrodes 71 to 82 are connected in parallel.

The lead conductors 181, 182 are integrally formed with their corresponding second inner electrodes 71, 72, 78, 79, and extend therefrom so as to reach the side face 1a of the multilayer body 1. The lead conductor 183 is integrally formed with the second inner electrodes 73, 80, and extends therefrom so as to reach the side face 1d of the multilayer body 1. The lead conductors 184, 185 are integrally formed with their corresponding second inner electrodes 74, 75, 81, 82, and extend therefrom so as to reach the side face 1b of the multilayer body 1.

In the multilayer capacitor C2 in accordance with the tenth embodiment, the number of first inner electrodes 51 to 55, 58 to 62 connected to the first terminal electrodes 3a to 3e via the lead conductors 171 to 175 is 10, which is smaller than the total number (12 in this embodiment) of the first inner electrodes 51 to 62. In the multilayer capacitor C2, the number of second inner electrodes 71 to 75, 78 to 82 connected to the second terminal electrodes 5a to 5e via the lead conductors 181 to 185 is 10, which is smaller than the total number (12 in this embodiment) of the first inner electrodes 71 to 82. As a consequence, the multilayer capacitor C2 yields an equivalent series resistance greater than that of the conventional multilayer capacitor in which all the inner electrodes are connected to their corresponding terminal electrodes via lead conductors.

As in the foregoing, by adjusting the number and positions in the laminating direction of first inner electrodes 51 to 55, 58 to 62 connected to the first terminal electrodes 3a to 3e via the lead conductors 171 to 175 and the number and positions in the laminating direction of second inner electrodes 71 to 75, 78 to 82 connected to the second terminal electrodes 5a to 5e via the lead conductors 181 to 185, this embodiment sets the equivalent series resistance of the multilayer capacitor C2 to a desirable value. As a result, the equivalent series resistance can be regulated easily with a high precision.

Eleventh Embodiment

Figure 13:
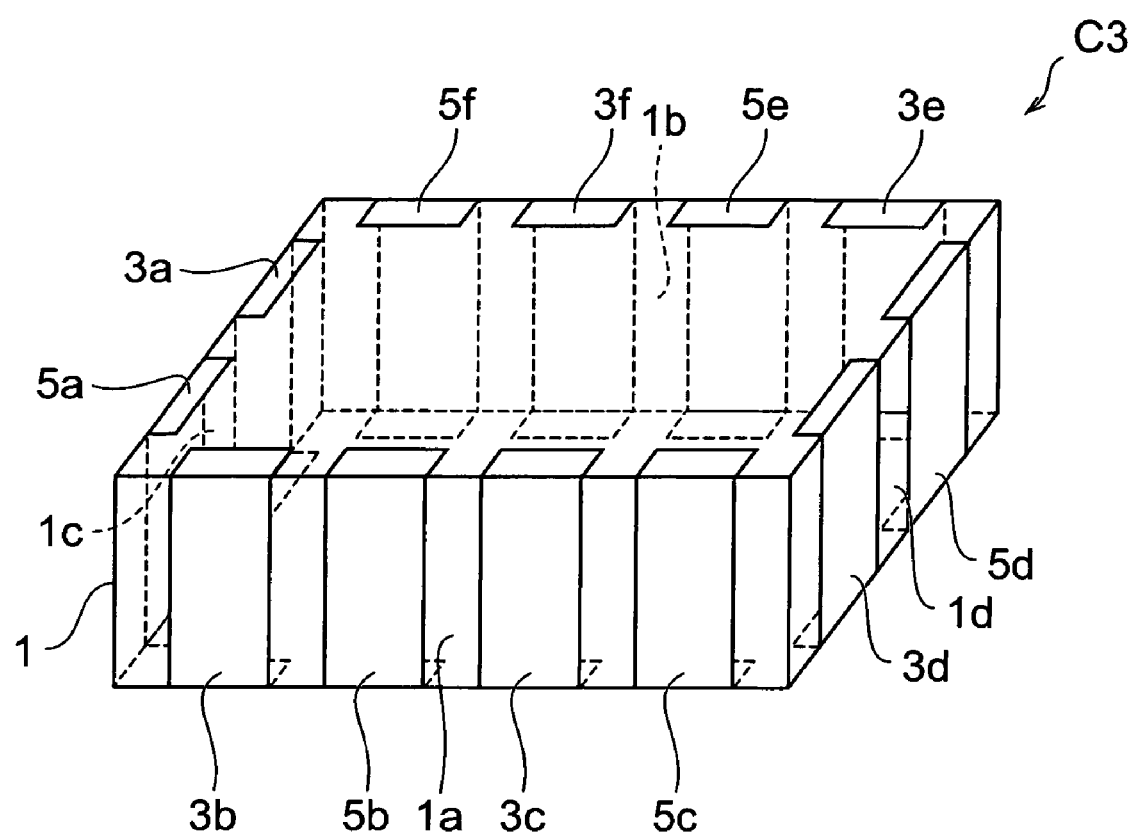
FIG. 13 is a perspective view showing the multilayer capacitor in accordance with an eleventh embodiment.
Figure 14:
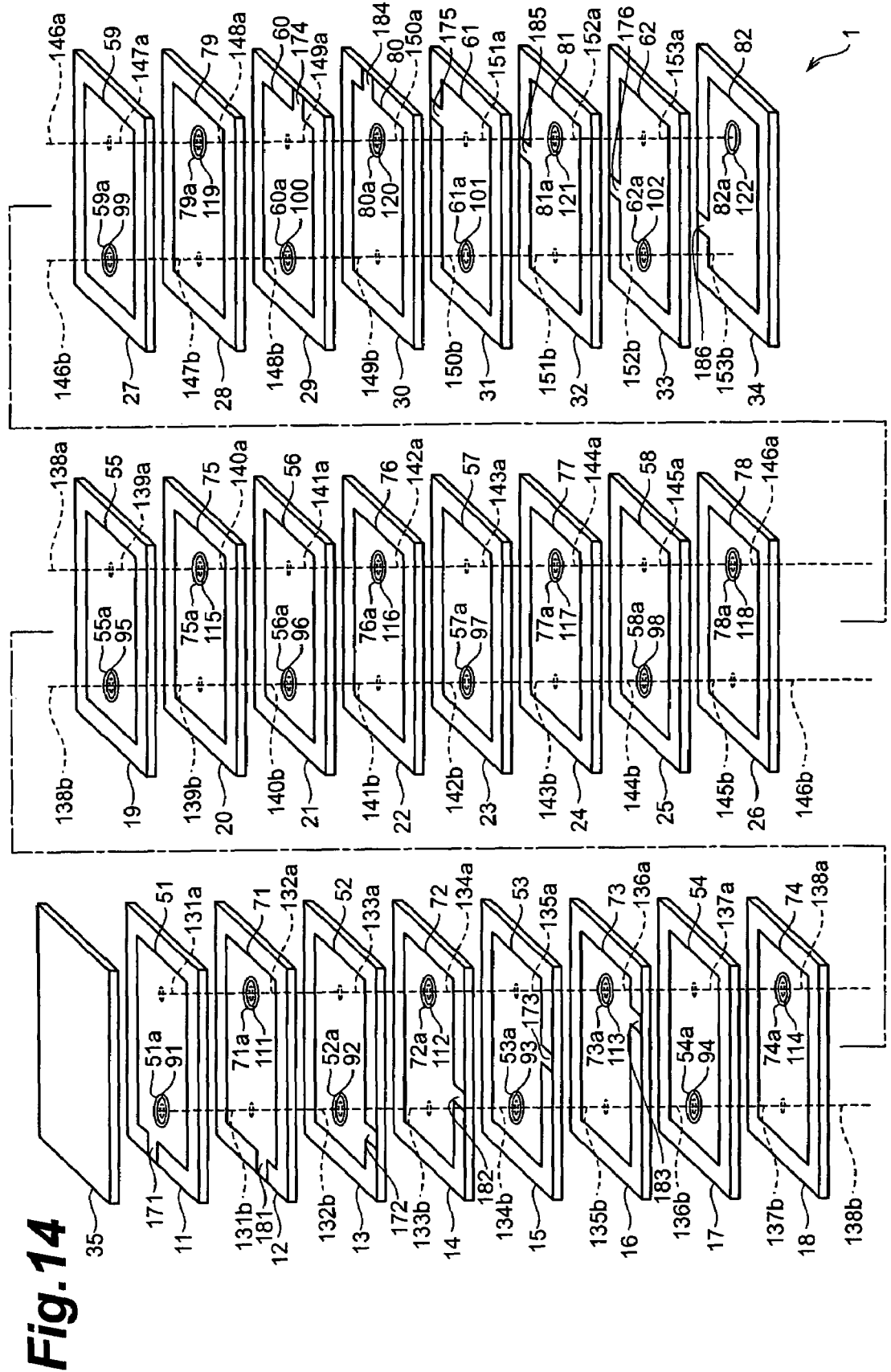
FIG. 14 is an exploded perspective view of the multilayer body included in the multilayer capacitor in accordance with the eleventh embodiment.

With reference to FIGS. 13 and 14, the structure of the multilayer capacitor C3 in accordance with an eleventh embodiment will be explained. FIG. 13 is a perspective view showing the multilayer capacitor in accordance with the eleventh embodiment. FIG. 14 is an exploded perspective view of the multilayer body included in the multilayer capacitor in accordance with the eleventh embodiment. The multilayer capacitor C3 in accordance with the eleventh embodiment differs from the multilayer capacitor C1 in accordance with the first embodiment in terms of the number of first and second inner electrodes.

As shown in FIG. 13, the multilayer capacitor C3 comprises a multilayer body 1, a plurality of (6 in this embodiment) first terminal electrodes 3a to 3f formed on the multilayer body 1, and a plurality of (6 in this embodiment) second terminal electrodes 5a to 5f similarly formed on the multilayer body 1.

The first terminal electrode 3a and second terminal electrode 5a are positioned on the side of a side face 1c of the multilayer body 1. The first terminal electrodes 3b, 3c and second terminal electrodes 5b, 5c are positioned on the side of a side face 1a of the multilayer body 1. The first terminal electrode 3d and second terminal electrode 5d are positioned on the side of a side face 1d of the multilayer body 1. The first terminal electrodes 3e, 3f and second terminal electrodes 5e, 5f are positioned on the side of a side face 1b of the multilayer body 1. The first terminal electrodes 3a to 3f are electrically insulated from the second terminal electrodes 5a to 5f.

In the multilayer capacitor C3, as shown in FIG. 14, a first inner electrode 51 is electrically connected to the first terminal electrode 3a via a lead conductor 171. A first inner electrode 52 is electrically connected to the first terminal electrode 3b via a lead conductor 172. A first inner electrode 53 is electrically connected to the first terminal electrode 3c via a lead conductor 173. A first inner electrode 60 is electrically connected to the first terminal electrode 3d via a lead conductor 174. A first inner electrode 61 is electrically connected to the first terminal electrode 3e via a lead conductor 175. A first inner electrode 62 is electrically connected to the first terminal electrode 3f via a lead conductor 176. As a consequence, first inner electrodes 54 to 59 are also electrically connected to the first terminal electrodes 3a to 3f, whereby first inner electrodes 51 to 62 are connected in parallel.

The lead conductor 171 is integrally formed with the first inner electrode 51, and extends therefrom so as to reach the side face 1c of the multilayer body 1. The lead conductors 172, 173 are integrally formed with their corresponding first inner electrodes 52, 53, and extend therefrom so as to reach the side face 1a of the multilayer body 1. The lead conductor 174 is integrally formed with the first inner electrode 60, and extends therefrom so as to reach the side face 1d of the multilayer body 1. The lead conductors 175, 176 are integrally formed with their corresponding first inner electrodes 61, 62, and extend therefrom so as to reach the side face 1b of the multilayer body 1.

A second inner electrode 71 is electrically connected to the second terminal electrode 5a via a lead conductor 181. A second inner electrode 72 is electrically connected to the second terminal electrode 5b via a lead conductor 182. A second inner electrode 73 is electrically connected to the second terminal electrode 5c via a lead conductor 183. A second inner electrode 80 is electrically connected to the second terminal electrode 5d via a lead conductor 184. A second inner electrode 81 is electrically connected to the second terminal electrode 5e via a lead conductor 185. A second inner electrode 82 is electrically connected to the second terminal electrode 5f via a lead conductor 186. As a consequence, second inner electrodes 74 to 79 are also electrically connected to the second terminal electrodes 5a to 5f, whereby second inner electrodes 71 to 82 are connected in parallel.

The lead conductor 181 is integrally formed with the second inner electrode 71, and extends therefrom so as to reach the side face 1c of the multilayer body 1. The lead conductors 182, 183 are integrally formed with their corresponding second inner electrodes 72, 73, and extend therefrom so as to reach the side face 1a of the multilayer body 1. The lead conductor 184 is integrally formed with the second inner electrode 80, and extends therefrom so as to reach the side face 1d of the multilayer body 1. The lead conductors 185, 186 are integrally formed with their corresponding second inner electrodes 81, 82, and extend therefrom so as to reach the side face 1b of the multilayer body 1.

In the multilayer capacitor C3 in accordance with the eleventh embodiment, the number of first inner electrodes 51 to 53, 60 to 62 connected to the first terminal electrodes 3a to 3f via the lead conductors 171 to 176 is 6, which is smaller than the total number (12 in this embodiment) of the first inner electrodes 51 to 62. In the multilayer capacitor C3, the number of second inner electrodes 71 to 73, 80 to 82 connected to the second terminal electrodes 5a to 5f via the lead conductors 181 to 186 is 6, which is smaller than the total number (12 in this embodiment) of the first inner electrodes 71 to 82. As a consequence, the multilayer capacitor C3 yields an equivalent series resistance greater than that of the conventional multilayer capacitor in which all the inner electrodes are connected to their corresponding terminal electrodes via lead conductors.

As in the foregoing, by adjusting the number and positions in the laminating direction of first inner electrodes 51 to 53, 60 to 62 connected to the first terminal electrodes 3a to 3f via the lead conductors 171 to 176 and the number and positions in the laminating direction of second inner electrodes 71 to 73, 80 to 82 connected to the second terminal electrodes 5a to 5f via the lead conductors 181 to 186, this embodiment sets the equivalent series resistance of the multilayer capacitor C3 to a desirable value. As a result, the equivalent series resistance can be regulated easily with a high precision.

Twelfth Embodiment

Figure 15:
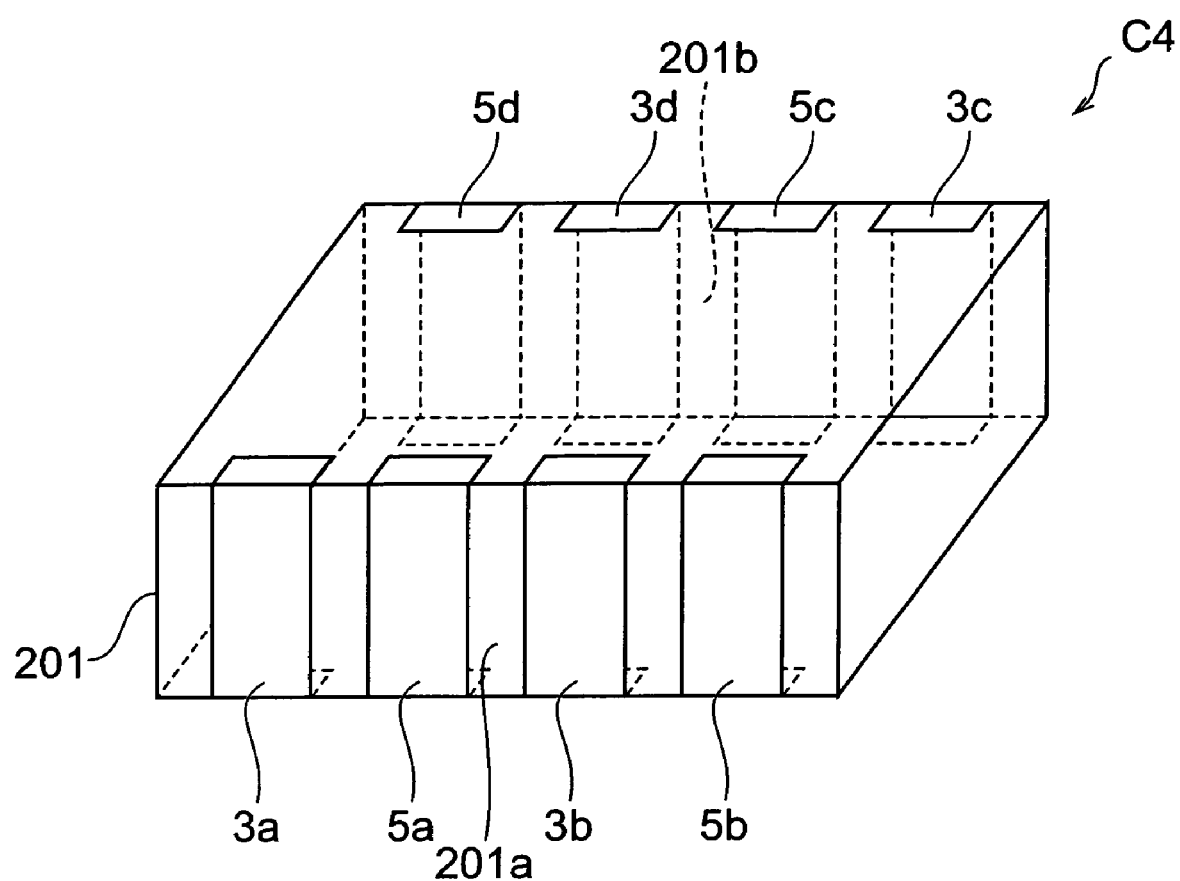
FIG. 15 is a perspective view showing the multilayer capacitor in accordance with a twelfth embodiment.
Figure 16:
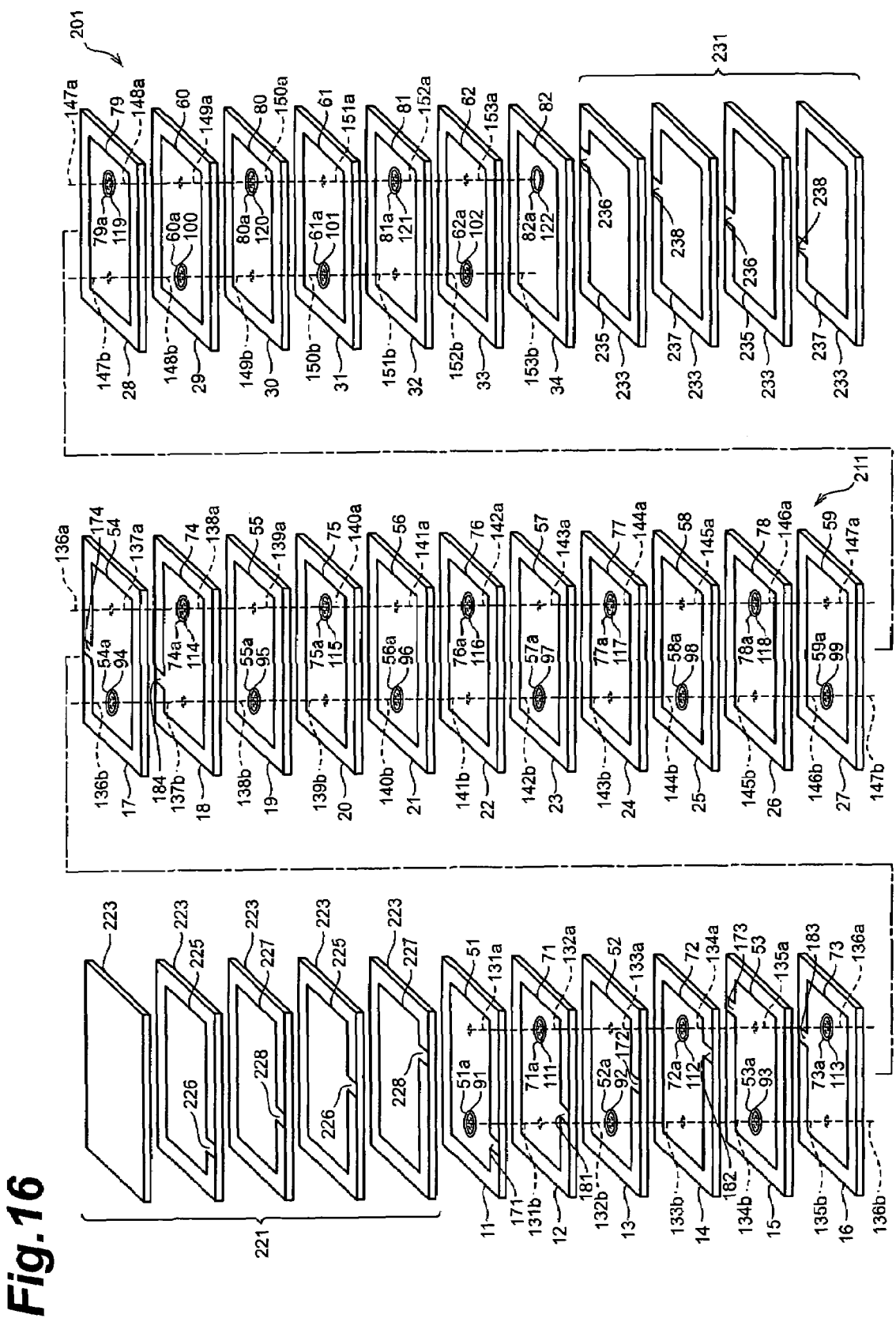
FIG. 16 is an exploded perspective view of the multilayer body included in the multilayer capacitor in accordance with the twelfth embodiment.

With reference to FIGS. 15 and 16, the structure of the multilayer capacitor C4 in accordance with a twelfth embodiment will be explained. FIG. 15 is a perspective view showing the multilayer capacitor in accordance with the twelfth embodiment. FIG. 16 is an exploded perspective view of the multilayer body included in the multilayer capacitor in accordance with the twelfth embodiment.

As shown in FIG. 15, the multilayer capacitor C4 in accordance with the twelfth embodiment comprises a multilayer body 201, first terminal electrodes 3a to 3d formed on the multilayer body 201, and second terminal electrodes 5a to 5d similarly formed on the multilayer body 201. The first terminal electrodes 3a. 3b and second terminal electrodes 5a, 5b are positioned on the side of a side face 201a of the multilayer body 201. The first terminal electrodes 3c. 3d and second terminal electrodes 5c, 5d are positioned on the side of a side face 201b of the multilayer body 201.

As shown in FIG. 16, the multilayer body 201 includes first to third capacitor portions 211, 221, 231. The first capacitor portion 211 is positioned between the second capacitor portion 221 and third capacitor portion 231.

To begin with, the structure of the first capacitor portion 211 will be explained. The first capacitor portion 211 has the same structure as the multilayer body 1 of the multilayer capacitor C1 in accordance with the first embodiment except for a dielectric layer 35. Namely, the first capacitor portion 211 is constructed by alternately laminating a plurality of (25 in this embodiment) dielectric layers 11 to 35 and a plurality of (12 each in this embodiment) first and second inner electrodes 51 to 62, 71 to 82. In the first multilayer capacitor 211, 4 first inner electrodes 51 to 54 among the 12 first inner electrodes 51 to 62 are electrically connected to their corresponding first terminal electrodes 3a to 3d via lead conductors 171 to 174. Also, 4 second inner electrodes 71 to 74 among the 12 second inner electrodes 71 to 82 are electrically connected to their corresponding second terminal electrodes 5a to 5d via lead conductors 181 to 184.

The structure of the second capacitor portion 221 will now be explained. The second capacitor portion 221 is constructed by alternately laminating a plurality of (5 in this embodiment) dielectric layers 223 and a plurality of (2 each in this embodiment) first and second inner electrodes 225, 227. The first inner electrodes 225 are electrically connected to the first terminal electrodes 3a, 3b via lead conductors 226. The lead conductors 226 are integrally formed with their corresponding first inner electrodes 225, and extend therefrom so as to reach the side face 201a of the multilayer body 201. The second inner electrodes 227 are electrically connected to the second terminal electrodes 5a, 5b via lead conductors 228. The lead conductors 228 are integrally formed with their corresponding second inner electrodes 227, and extend therefrom so as to reach the side face 201a of the multilayer body 201.

The structure of the third capacitor portion 231 will now be explained. The third capacitor portion 231 is constructed by alternately laminating a plurality of (4 in this embodiment) dielectric layers 233 and a plurality of (2 each in this embodiment) first and second inner electrodes 235, 237. The first inner electrodes 235 are electrically connected to the first terminal electrodes 3c, 3d via lead conductors 236. The lead conductors 236 are integrally formed with their corresponding first inner electrodes 235, and extend therefrom so as to reach the side face 201b of the multilayer body 201. The second inner electrodes 237 are electrically connected to the second terminal electrodes 5c, 5d via lead conductors 238. The lead conductors 238 are integrally formed with their corresponding second inner electrodes 237, and extend therefrom so as to reach the side face 201b of the multilayer body 201.

In the actual multilayer capacitor C4, the dielectric layers 11 to 35, 223, 233 are integrated together to such an extent that their boundaries are indiscernible. The first inner electrode 51 of the first capacitor portion 211 is electrically connected to the first inner electrodes 225 of the second capacitor portion 221 via the terminal electrode 3a. The first inner electrode 52 of the first capacitor portion 211 is electrically connected to the first inner electrodes 225 of the second capacitor portion 221 via the terminal electrode 3b. The first inner electrode 53 of the first capacitor portion 211 is electrically connected to the first inner electrodes 235 of the third capacitor portion 231 via the terminal electrode 3c. The first inner electrode 54 of the first capacitor portion 211 is electrically connected to the first inner electrodes 235 of the third capacitor portion 231 via the terminal electrode 3d. The second inner electrode 71 of the first capacitor portion 211 is electrically connected to the second inner electrodes 227 of the second capacitor portion 221 via the terminal electrode 5a. The second inner electrode 72 of the first capacitor portion 211 is electrically connected to the second inner electrodes 227 of the second capacitor portion 221 via the terminal electrode 5b. The second inner electrode 73 of the first capacitor portion 211 is electrically connected to the second inner electrodes 237 of the third capacitor portion 231 via the terminal electrode 5c. The second inner electrode 74 of the first capacitor portion 211 is electrically connected to the second inner electrodes 237 of the third capacitor portion 231 via the terminal electrode 5d.

As in the foregoing, this embodiment has the first capacitor portion 211, and thus sets the equivalent series resistance of the multilayer capacitor C4 to a desirable value as stated in the first embodiment. As a result, the equivalent series resistance can be regulated easily with a high precision.

Thirteenth Embodiment

Figure 17:
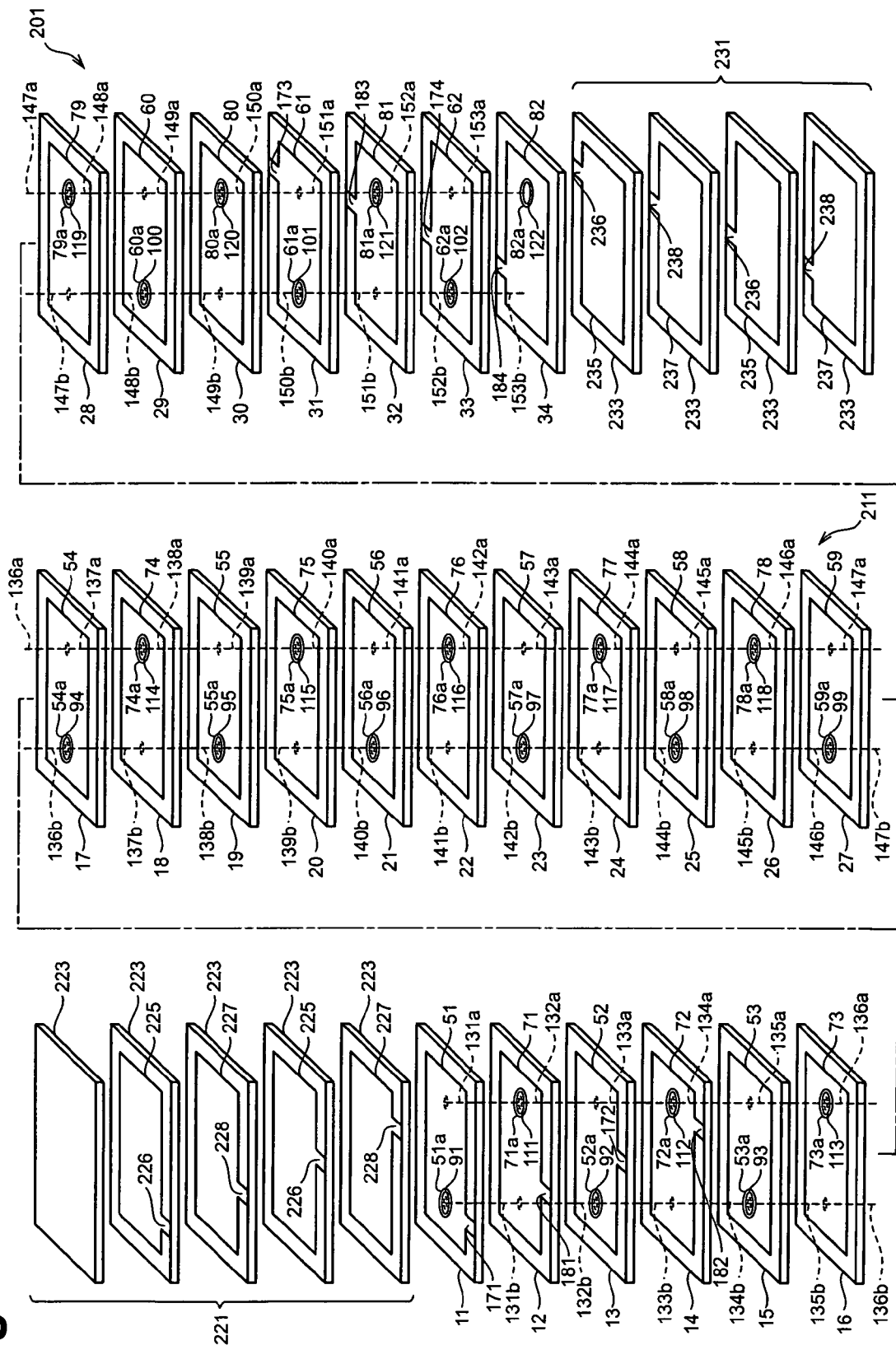
FIG. 17 is an exploded perspective view of the multilayer body included in the multilayer capacitor in accordance with a thirteenth embodiment.

With reference to FIG. 17, the structure of the multilayer capacitor in accordance with a thirteenth embodiment will be explained. The multilayer capacitor in accordance with the thirteenth embodiment differs from the multilayer capacitor C4 in accordance with the twelfth embodiment in terms of the structure of the first capacitor portion 211. FIG. 17 is an exploded perspective view of the multilayer body included in the multilayer capacitor in accordance with the thirteenth embodiment.

As with the multilayer capacitor C4 in accordance with the twelfth embodiment, the multilayer capacitor in accordance with the thirteenth embodiment comprises a multilayer body 201, first terminal electrodes 3a to 3d formed on the multilayer body 201, and second terminal electrodes 5a to 5d similarly formed on the multilayer body 201, though they are not depicted.

The first capacitor portion 211 has the same structure as that of the multilayer body 1 in accordance with the second embodiment except for a dielectric layer 35. Namely, the first capacitor portion 211 is constructed by alternately laminating a plurality of (25 in this embodiment) dielectric layers 11 to 35 and a plurality of (12 each in this embodiment) first and second inner electrodes 51 to 62, 71 to 82. In the first multilayer capacitor 211, 4 first inner electrodes 51, 52, 61, 62 among the 12 first inner electrodes 51 to 62 are electrically connected to their corresponding first terminal electrodes 3a to 3d via lead conductors 171 to 174. Also, 4 second inner electrodes 71, 72, 81, 82 among the 12 second inner electrodes 71 to 82 are electrically connected to their corresponding second terminal electrodes 5a to 5d via lead conductors 181 to 184.

As in the foregoing, this embodiment has the first capacitor portion 211, and thus sets the equivalent series resistance of the multilayer capacitor to a desirable value as stated in the second embodiment. As a result, the equivalent series resistance can be regulated easily with a high precision.

Fourteenth Embodiment

Figure 18:
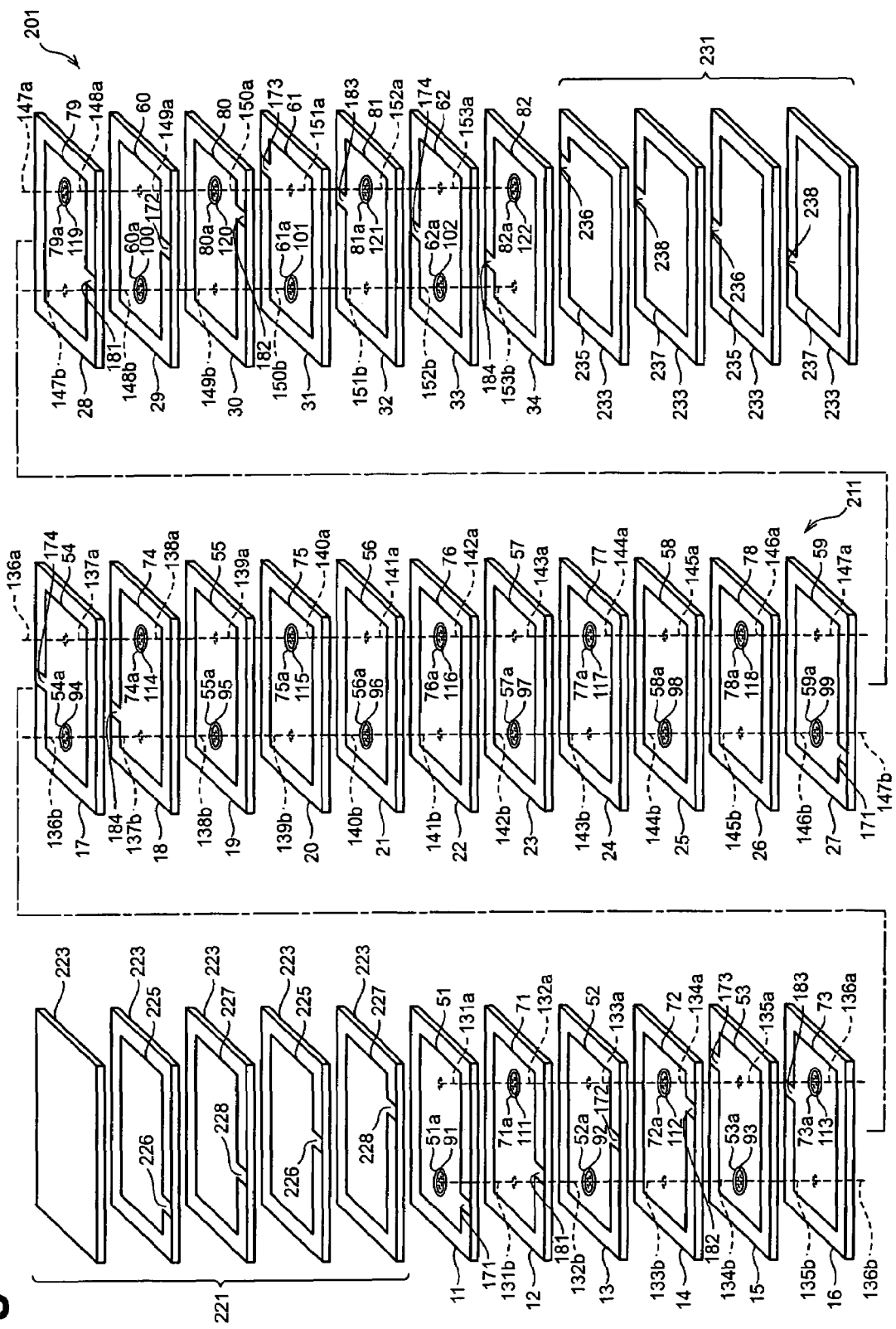
FIG. 18 is an exploded perspective view of the multilayer body included in the multilayer capacitor in accordance with a fourteenth embodiment.

With reference to FIG. 18, the structure of the multilayer capacitor in accordance with a fourteenth embodiment will be explained. The multilayer capacitor in accordance with the fourteenth embodiment differs from the multilayer capacitor C4 in accordance with the twelfth embodiment in terms of the structure of the first capacitor portion 211. FIG. 18 is an exploded perspective view of the multilayer body included in the multilayer capacitor in accordance with the fourteenth embodiment.

As with the multilayer capacitor C4 in accordance with the twelfth embodiment, the multilayer capacitor in accordance with the fourteenth embodiment comprises a multilayer body 201, first terminal electrodes 3a to 3d formed on the multilayer body 201, and second terminal electrodes 5a to 5d similarly formed on the multilayer body 201, though they are not depicted.

The first capacitor portion 211 has the same structure as that of the multilayer body 1 in accordance with the fifth embodiment except for a dielectric layer 35. Namely, the first capacitor portion 211 is constructed by alternately laminating a plurality of (25 in this embodiment) dielectric layers 11 to 35 and a plurality of (12 each in this embodiment) first and second inner electrodes 51 to 62, 71 to 82. In the first multilayer capacitor 211, 8 first inner electrodes 51 to 54, 59 to 62 among the 12 first inner electrodes 51 to 62 are electrically connected to their corresponding first terminal electrodes 3a to 3d via lead conductors 171 to 174. Also, 8 second inner electrodes 71 to 74, 79 to 82 among the 12 second inner electrodes 71 to 82 are electrically connected to their corresponding second terminal electrodes 5a to 5d via lead conductors 181 to 184.

As in the foregoing, this embodiment has the first capacitor portion 211, and thus sets the equivalent series resistance of the multilayer capacitor to a desirable value as stated in the fifth embodiment. As a result, the equivalent series resistance can be regulated easily with a high precision.

Fifteenth Embodiment

Figure 19:
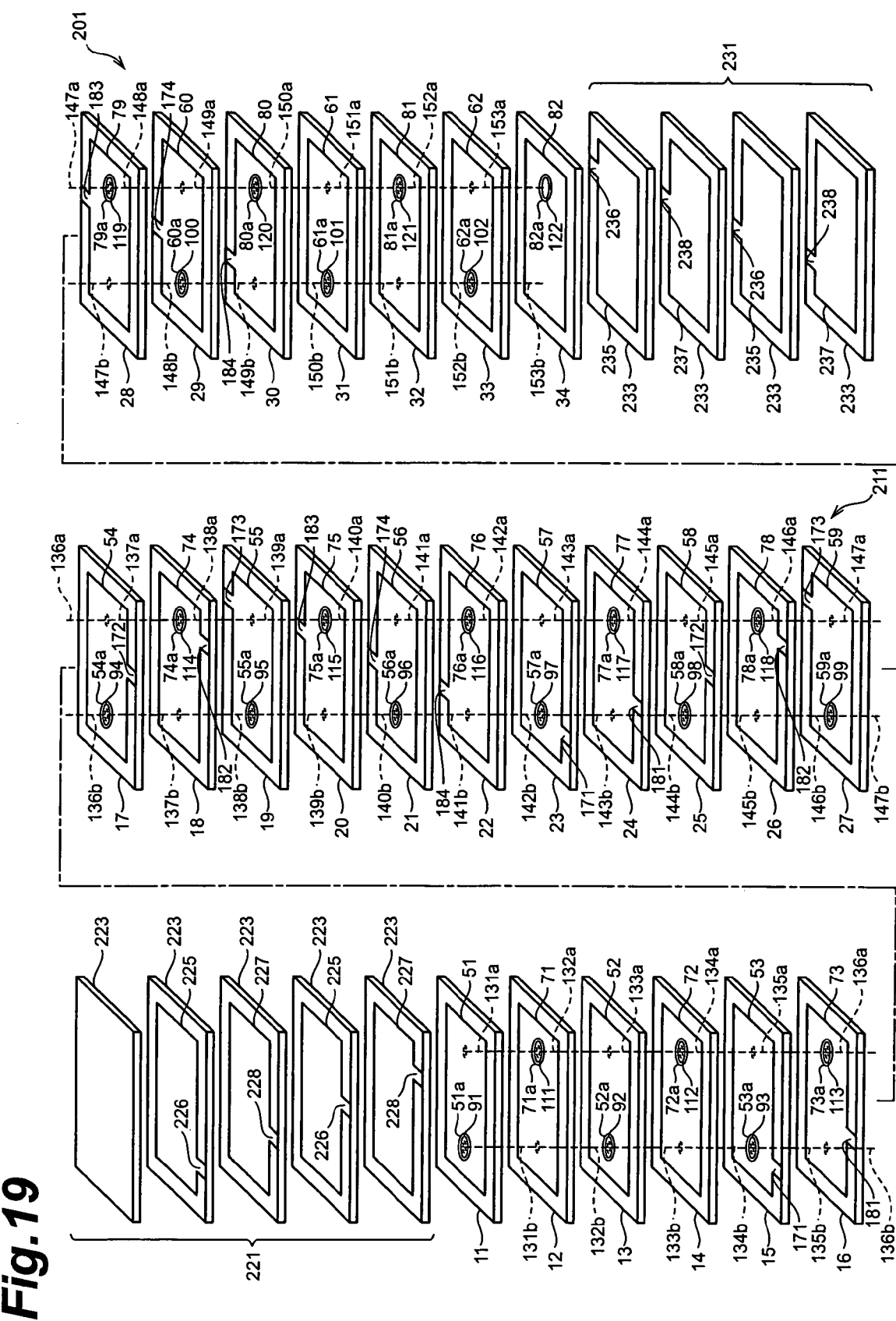
FIG. 19 is an exploded perspective view of the multilayer body included in the multilayer capacitor in accordance with a fifteenth embodiment.

With reference to FIG. 19, the structure of the multilayer capacitor in accordance with a fifteenth embodiment will be explained. The multilayer capacitor in accordance with the fifteenth embodiment differs from the multilayer capacitor C4 in accordance with the twelfth embodiment in terms of the structure of the first capacitor portion 211. FIG. 19 is an exploded perspective view of the multilayer body included in the multilayer capacitor in accordance with the fifteenth embodiment.

As with the multilayer capacitor C4 in accordance with the twelfth embodiment, the multilayer capacitor in accordance with the fifteenth embodiment comprises a multilayer body 201, first terminal electrodes 3a to 3d formed on the multilayer body 201, and second terminal electrodes 5a to 5d similarly formed on the multilayer body 201, though they are not depicted.

The first capacitor portion 211 has the same structure as that of the multilayer body 1 in accordance with the sixth embodiment except for a dielectric layer 35. Namely, the first capacitor portion 211 is constructed by alternately laminating a plurality of (25 in this embodiment) dielectric layers 11 to 35 and a plurality of (12 each in this embodiment) first and second inner electrodes 51 to 62, 71 to 82. In the first multilayer capacitor 211, 8 first inner electrodes 53 to 60 among the 12 first inner electrodes 51 to 62 are electrically connected to their corresponding first terminal electrodes 3a to 3d via lead conductors 171 to 174. Also, 8 second inner electrodes 73 to 80 among the 12 second inner electrodes 71 to 82 are electrically connected to their corresponding second terminal electrodes 5a to 5d via lead conductors 181 to 184.

As in the foregoing, this embodiment has the first capacitor portion 211, and thus sets the equivalent series resistance of the multilayer capacitor to a desirable value as stated in the sixth embodiment. As a result, the equivalent series resistance can be regulated easily with a high precision.

The first capacitor portion 211 may employ the same structure as that of the multilayer body 1 in accordance with any of the third, fourth, and seventh to eleventh embodiments (except for the dielectric layers 35, 49).

Sixteenth Embodiment

Figure 20:
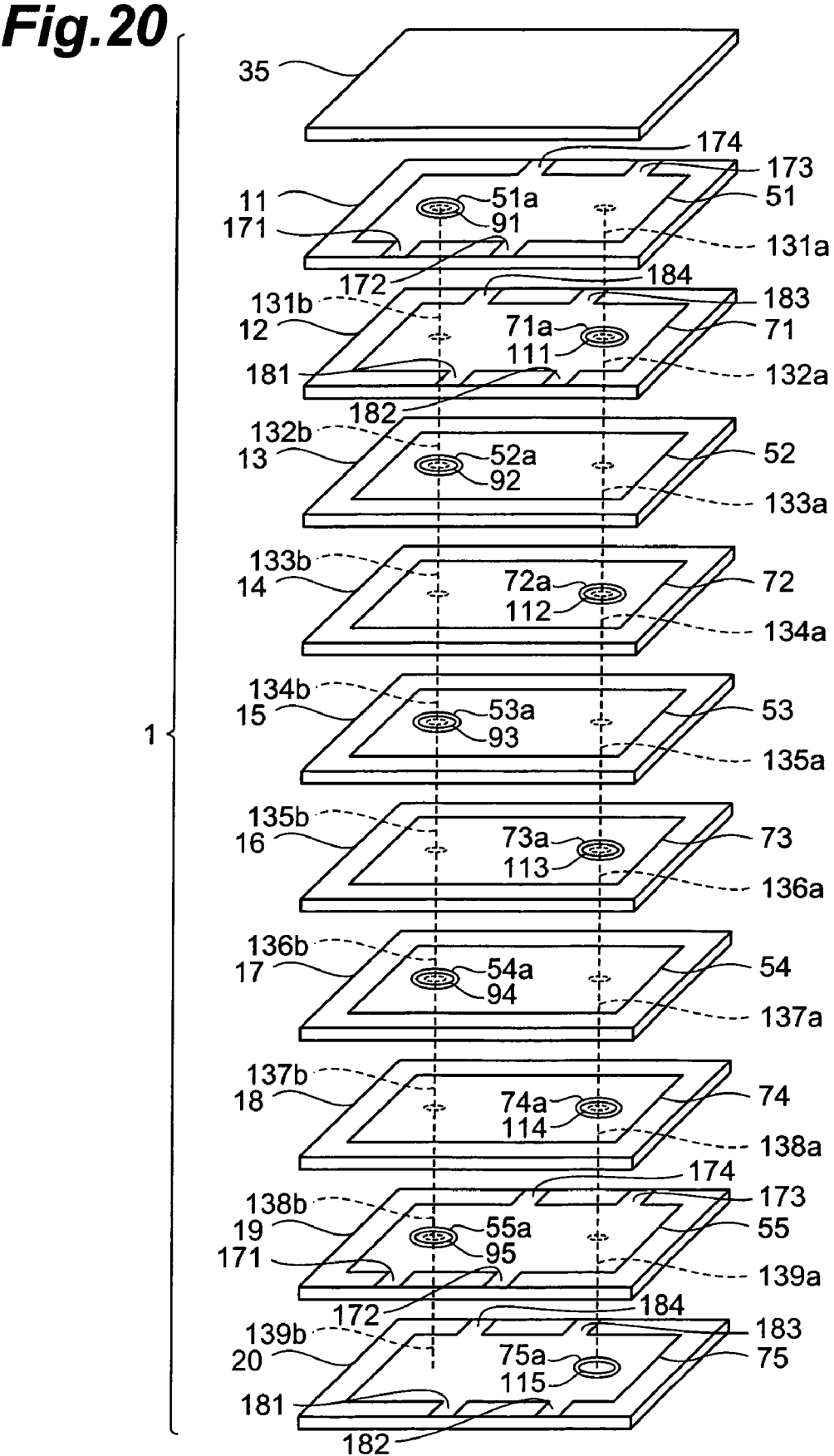
FIG. 20 is an exploded perspective view of the multilayer body included in the multilayer capacitor in accordance with a sixteenth embodiment.

With reference to FIG. 20, the structure of the multilayer capacitor in accordance with a sixteenth embodiment will be explained. The multilayer capacitor in accordance with the sixteenth embodiment differs from the multilayer capacitor C1 in accordance with the first embodiment in terms of the structure of the multilayer body 1. FIG. 20 is an exploded perspective view of the multilayer body included in the multilayer capacitor in accordance with the sixteenth embodiment.

As with the multilayer capacitor C1 in accordance with the first embodiment, the multilayer capacitor in accordance with the sixteenth embodiment comprises a multilayer body 1, first terminal electrodes 3a to 3d formed on the multilayer body 1, and second terminal electrodes 5a to 5d similarly formed on the multilayer body 1, though they are not depicted.

As is also shown in FIG. 20, the multilayer body 1 is constructed by alternately laminating a plurality of (11 in this embodiment) dielectric layers 11 to 20, 35 and a plurality of (5 each in this embodiment) first and second inner electrodes 51 to 55, 71 to 75. In the actual multilayer capacitor, the dielectric layers 11 to 20, 35 are integrated together to such an extent that their boundaries are indiscernible.

The first inner electrodes 51, 55 are electrically connected to the first terminal electrodes 3a to 3d via lead conductors 171 to 174. As a consequence, the first inner electrodes 52 to 54 are also electrically connected to the first terminal electrodes 3a to 3d, whereby the first inner electrodes 51 to 55 are connected in parallel. The lead conductors 171, 172 are integrally formed with the first inner electrodes 51, 55, and extend therefrom so as to reach a side face 1a of the multilayer body 1. The lead conductors 173, 174 are also integrally formed with the first inner electrodes 51, 55, and extend therefrom so as to reach a side face 1b of the multilayer body 1.

The second inner electrodes 71, 75 are electrically connected to the second terminal electrodes 5a to 5d via lead conductors 181 to 184. As a consequence, the second inner electrodes 72 to 74 are also electrically connected to the second terminal electrodes 5a to 5d, whereby the second inner electrodes 71 to 75 are connected in parallel. The lead conductors 181, 182 are integrally formed with the second inner electrodes 71, 75, and extend therefrom so as to reach the side face 1a of the multilayer body 1. The lead conductors 183, 184 are also integrally formed with the second inner electrodes 71, 75, and extend therefrom so as to reach the side face 1b of the multilayer body 1.

In the multilayer capacitor in accordance with the sixteenth embodiment, the number of first inner electrodes 51, 55 connected to the first terminal electrodes 3a to 3d via the lead conductors 171 to 174 is 2, which is smaller than the total number (5 in this embodiment) of the first inner electrodes 51 to 55. In the multilayer capacitor in accordance with the sixteenth embodiment, the number of second inner electrodes 71, 75 connected to the second terminal electrodes 5a to 5d via the lead conductors 181 to 184 is 2, which is smaller than the total number (5 in this embodiment) of the second inner electrodes 71 to 75. As a consequence, the multilayer capacitor in accordance with the sixteenth embodiment yields an equivalent series resistance greater than that of the conventional multilayer capacitor in which all the inner electrodes are connected to their corresponding terminal electrodes via lead conductors.

As in the foregoing, by adjusting the number of first inner electrodes 51, 55 electrically connected to the first terminal electrodes 3a to 3d via the lead conductors 171 to 174 and the number of second inner electrodes 71, 75 electrically connected to the second terminal electrodes 5a to 5d via the lead conductors 181 to 184, this embodiment sets the equivalent series resistance of the multilayer capacitor to a desirable value. As a result, the equivalent series resistance can be regulated easily with a high precision.

In this embodiment, the first inner electrodes 51 to 55 are connected in parallel, while the second inner electrodes 71 to 75 are connected in parallel. Therefore, even when the ohmic value varies among the first inner electrodes 51 to 55 or among the second inner electrodes 71 to 75, such a variation is less influential in the equivalent series resistance of the multilayer capacitor as a whole, whereby the accuracy in equivalent series resistance control can be restrained from lowering.

Seventeenth Embodiment

Figure 21:
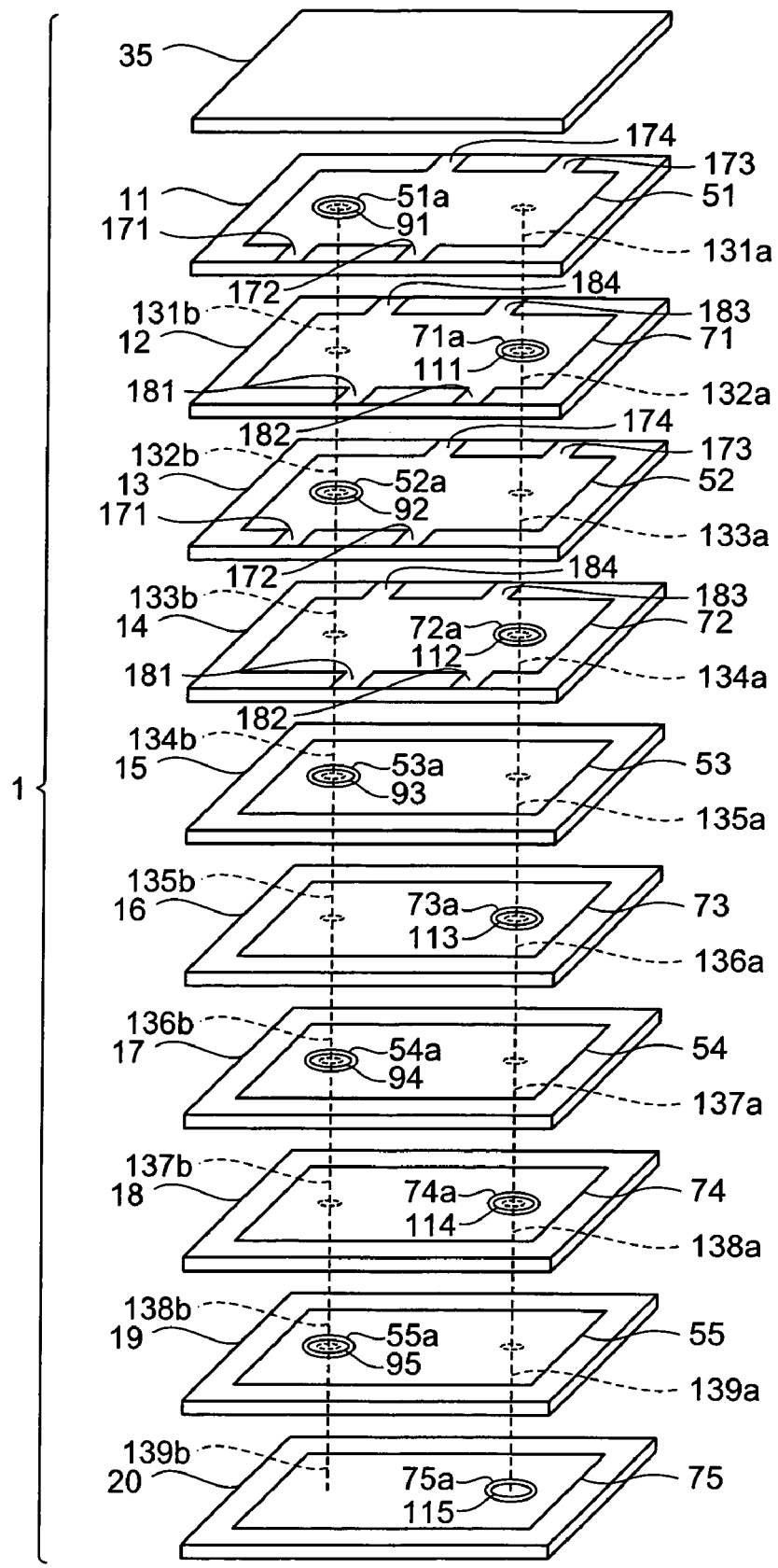
FIG. 21 is an exploded perspective view of the multilayer body included in the multilayer capacitor in accordance with a seventeenth embodiment.

With reference to FIG. 21, the structure of the multilayer capacitor in accordance with a seventeenth embodiment will now be explained. The multilayer capacitor in accordance with the seventeenth embodiment differs from the multilayer capacitor in accordance with the sixteenth embodiment in terms of positions of first inner electrodes electrically connected to first terminal electrodes 3a to 3d via lead conductors 171 to 174 in the laminating direction and positions of second inner electrodes electrically connected to second terminal electrodes 5a to 5d via lead conductors 181 to 184 in the laminating direction. FIG. 21 is an exploded perspective view of the multilayer body included in the multilayer capacitor in accordance with the seventeenth embodiment.

As with the multilayer capacitor C1 in accordance with the first embodiment, the multilayer capacitor in accordance with the seventeenth embodiment comprises a multilayer body 1, first terminal electrodes 3a to 3d formed on the multilayer body 1, and second terminal electrodes 5a to 5d similarly formed on the multilayer body 1, though they are not depicted.

A first inner electrode 52 is electrically connected to the first terminal electrodes 3a to 3d via the lead conductors 171 to 174. As a consequence, first inner electrodes 53 to 55 are also electrically connected to the first terminal electrodes 3a to 3d, whereby first inner electrodes 51 to 55 are connected in parallel. The lead conductors 171, 172 are integrally formed with the first inner electrode 52, and extend therefrom so as to reach a side face 1a of the multilayer body 1. The lead conductors 173, 174 are also integrally formed with the first inner electrode 52, and extend therefrom so as to reach a side face 1b of the multilayer body 1.

A first inner electrode 72 is electrically connected to the second terminal electrodes 5a to 5d via the lead conductors 181 to 184. As a consequence, second inner electrodes 73 to 75 are also electrically connected to the second terminal electrodes 5a to 5d, whereby second inner electrodes 71 to 75 are connected in parallel. The lead conductors 181, 182 are integrally formed with the second inner electrode 72, and extend therefrom so as to reach the side face 1a of the multilayer body 1. The lead conductors 183, 184 are also integrally formed with the second inner electrode 72, and extend therefrom so as to reach the side face 1b of the multilayer body 1.

In the multilayer capacitor in accordance with the seventeenth embodiment, the number of first inner electrodes 51, 52 connected to the first terminal electrodes 3a to 3d via the lead conductors 171 to 174 is 2, which is smaller than the total number (5 in this embodiment) of the first inner electrodes 51 to 55. In the multilayer capacitor in accordance with the seventeenth embodiment, the number of second inner electrodes 71, 72 connected to the second terminal electrodes 5a to 5d via the lead conductors 181 to 184 is 2, which is smaller than the total number (5 in this embodiment) of the second inner electrodes 71 to 75. As a consequence, the multilayer capacitor in accordance with the seventeenth embodiment yields an equivalent series resistance greater than that of the conventional multilayer capacitor in which all the inner electrodes are connected to their corresponding terminal electrodes via lead conductors.

As in the foregoing, by adjusting the number of first inner electrodes 51, 52 electrically connected to the first terminal electrodes 3a to 3d via the lead conductors 171 to 174 and the number of second inner electrodes 71, 72 electrically connected to the second terminal electrodes 5a to 5d via the lead conductors 181 to 184, this embodiment sets the equivalent series resistance of the multilayer capacitor to a desirable value. As a result, the equivalent series resistance can be regulated easily with a high precision.

Eighteenth Embodiment

Figure 22:
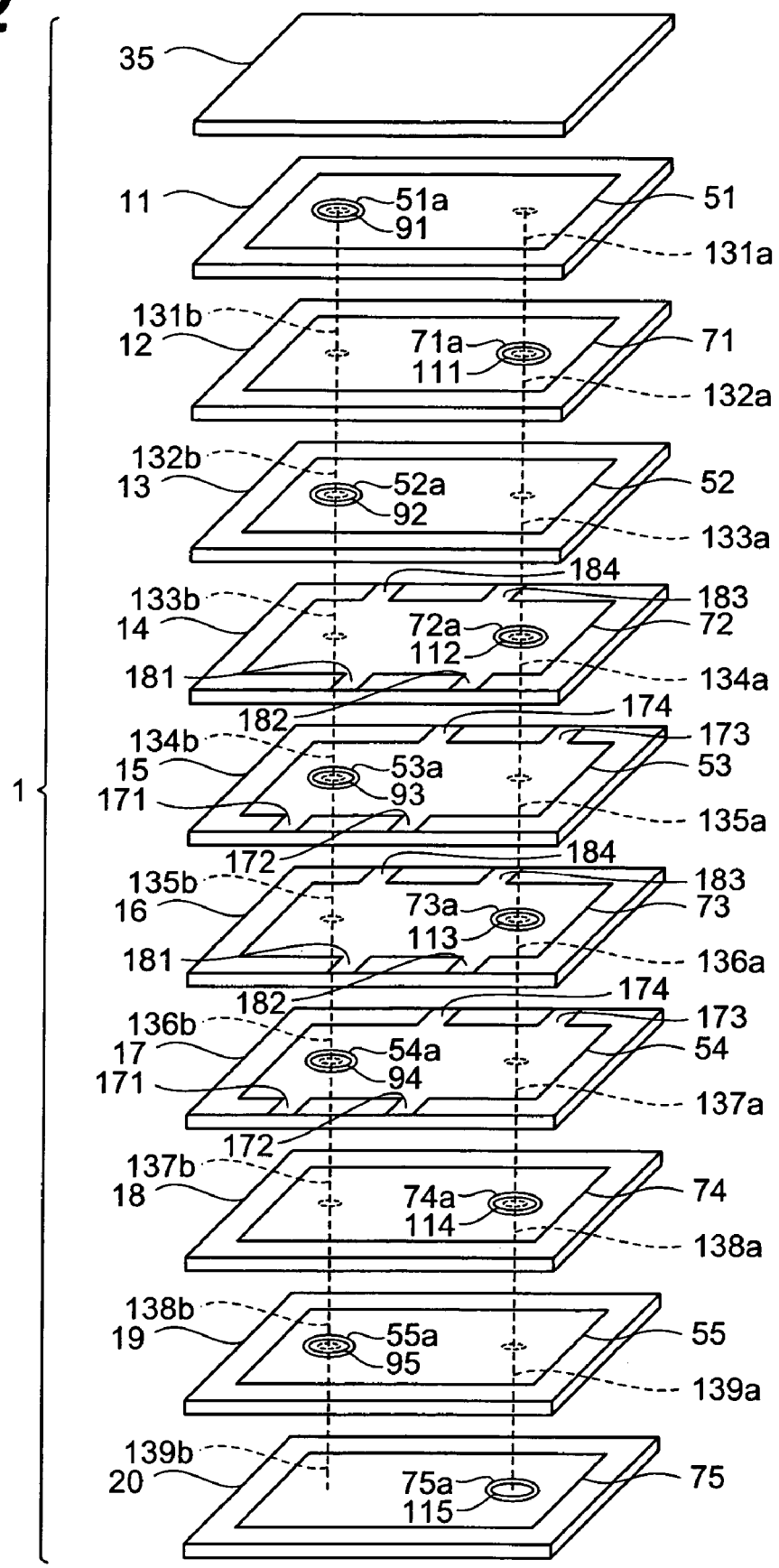
FIG. 22 is an exploded perspective view of the multilayer body included in the multilayer capacitor in accordance with an eighteenth embodiment.

With reference to FIG. 22, the structure of the multilayer capacitor in accordance with an eighteenth embodiment will now be explained. The multilayer capacitor in accordance with the eighteenth embodiment differs from the multilayer capacitor in accordance with the sixteenth embodiment in terms of positions of first inner electrodes electrically connected to first terminal electrodes 3a to 3d via lead conductors 171 to 174 in the laminating direction and positions of second inner electrodes electrically connected to second terminal electrodes 5a to 5d via lead conductors 181 to 184 in the laminating direction. FIG. 22 is an exploded perspective view of the multilayer body included in the multilayer capacitor in accordance with the eighteenth embodiment.

As with the multilayer capacitor C1 in accordance with the first embodiment, the multilayer capacitor in accordance with the eighteenth embodiment comprises a multilayer body 1, first terminal electrodes 3a to 3d formed on the multilayer body 1, and second terminal electrodes 5a to 5d similarly formed on the multilayer body 1, though they are not depicted.

First inner electrodes 53, 54 are electrically connected to the first terminal electrodes 3a to 3d via the lead conductors 171 to 174. As a consequence, first inner electrodes 51, 52, 55 are also electrically connected to the first terminal electrodes 3a to 3d, whereby first inner electrodes 51 to 55 are connected in parallel. The lead conductors 171, 172 are integrally formed with the first inner electrodes 53, 54, and extend therefrom so as to reach a side face 1a of the multilayer body 1. The lead conductors 173, 174 are also integrally formed with the first inner electrodes 53, 54, and extend therefrom so as to reach a side face 1b of the multilayer body 1.

Second inner electrodes 73, 74 are electrically connected to the second terminal electrodes 5a to 5d via the lead conductors 181 to 184. As a consequence, second inner electrodes 71, 72, 75 are also electrically connected to the second terminal electrodes 5a to 5d, whereby second inner electrodes 71 to 75 are connected in parallel. The lead conductors 181, 182 are integrally formed with the second inner electrodes 73, 74, and extend therefrom so as to reach the side face 1a of the multilayer body 1. The lead conductors 183, 184 are also integrally formed with the second inner electrodes 73, 74, and extend therefrom so as to reach the side face 1b of the multilayer body 1.

In the multilayer capacitor in accordance with the eighteenth embodiment, the number of first inner electrodes 53, 54 connected to the first terminal electrodes 3a to 3d via the lead conductors 171 to 174 is 2, which is smaller than the total number (5 in this embodiment) of the first inner electrodes 51 to 55. In the multilayer capacitor in accordance with the eighteenth embodiment, the number of second inner electrodes 71, 72 connected to the second terminal electrodes 5a to 5d via the lead conductors 181 to 184 is 2, which is smaller than the total number (5 in this embodiment) of the second inner electrodes 71 to 75. As a consequence, the multilayer capacitor in accordance with the eighteenth embodiment yields an equivalent series resistance greater than that of the conventional multilayer capacitor in which all the inner electrodes are connected to their corresponding terminal electrodes via lead conductors.

As in the foregoing, by adjusting the number of first inner electrodes 53, 54 electrically connected to the first terminal electrodes 3a to 3d via the lead conductors 171 to 174 and the number of second inner electrodes 73, 74 electrically connected to the second terminal electrodes 5a to 5d via the lead conductors 181 to 184, this embodiment sets the equivalent series resistance of the multilayer capacitor to a desirable value. As a result, the equivalent series resistance can be regulated easily with a high precision.

Nineteenth Embodiment

Figure 23:
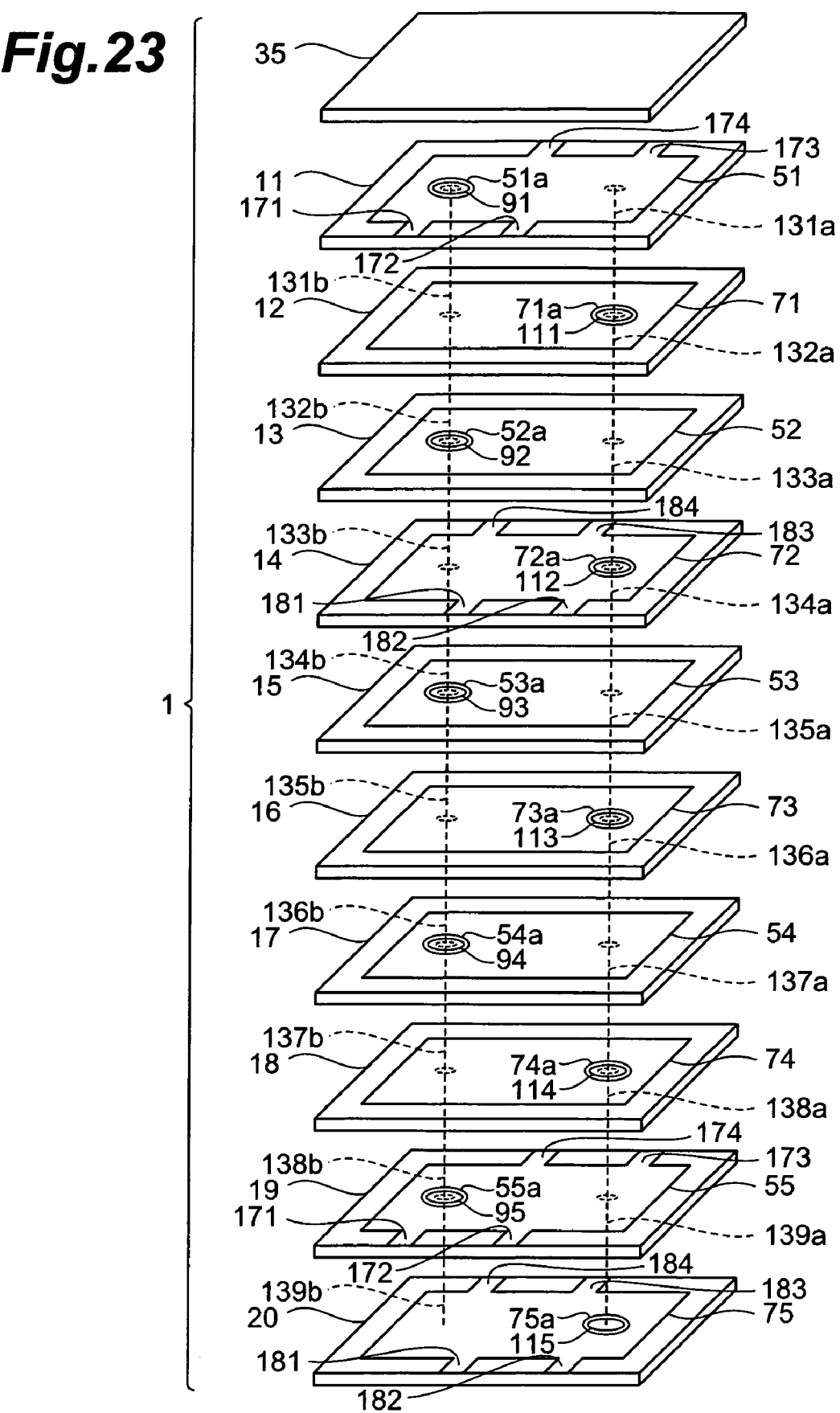
FIG. 23 is an exploded perspective view of the multilayer body included in the multilayer capacitor in accordance with a nineteenth embodiment.

With reference to FIG. 23, the structure of the multilayer capacitor in accordance with a nineteenth embodiment will now be explained. The multilayer capacitor in accordance with the nineteenth embodiment differs from the multilayer capacitor in accordance with the sixteenth embodiment in terms of positions of second inner electrodes electrically connected to second terminal electrodes 5a to 5d via lead conductors 181 to 184 in the laminating direction. FIG. 23 is an exploded perspective view of the multilayer body included in the multilayer capacitor in accordance with the nineteenth embodiment.

As with the multilayer capacitor C1 in accordance with the first embodiment, the multilayer capacitor in accordance with the nineteenth embodiment comprises a multilayer body 1, first terminal electrodes 3a to 3d formed on the multilayer body 1, and second terminal electrodes 5a to 5d similarly formed on the multilayer body 1, though they are not depicted.

A second inner electrode 72 is electrically connected to the second terminal electrodes 5a to 5d via the lead conductors 181 to 184. As a consequence, second inner electrodes 71, 73, 74 are also electrically connected to the second terminal electrodes 5a to 5d, whereby second inner electrodes 71 to 75 are connected in parallel. The lead conductors 181, 182 are integrally formed with the second inner electrode 72, and extend therefrom so as to reach a side face 1a of the multilayer body 1. The lead conductors 183, 184 are also integrally formed with the second inner electrode 72, and extend therefrom so as to reach a side face 1b of the multilayer body 1.

In the multilayer capacitor in accordance with the nineteenth embodiment, the number of first inner electrodes 51, 55 connected to the first terminal electrodes 3a to 3d via the lead conductors 171 to 174 is 2, which is smaller than the total number (5 in this embodiment) of the first inner electrodes 51 to 55. In the multilayer capacitor in accordance with the nineteenth embodiment, the number of second inner electrodes 72, 75 connected to the second terminal electrodes 5a to 5d via the lead conductors 181 to 184 is 2, which is smaller than the total number (5 in this embodiment) of the second inner electrodes 71 to 75. As a consequence, the multilayer capacitor in accordance with the nineteenth embodiment yields an equivalent series resistance greater than that of the conventional multilayer capacitor in which all the inner electrodes are connected to their corresponding terminal electrodes via lead conductors.

As in the foregoing, by adjusting the number of first inner electrodes 51, 55 electrically connected to the first terminal electrodes 3a to 3d via the lead conductors 171 to 174 and the number of second inner electrodes 72, 75 electrically connected to the second terminal electrodes 5a to 5d via the lead conductors 181 to 184, this embodiment sets the equivalent series resistance of the multilayer capacitor to a desirable value. As a result, the equivalent series resistance can be regulated easily with a high precision.

Twentieth Embodiment

Figure 24:
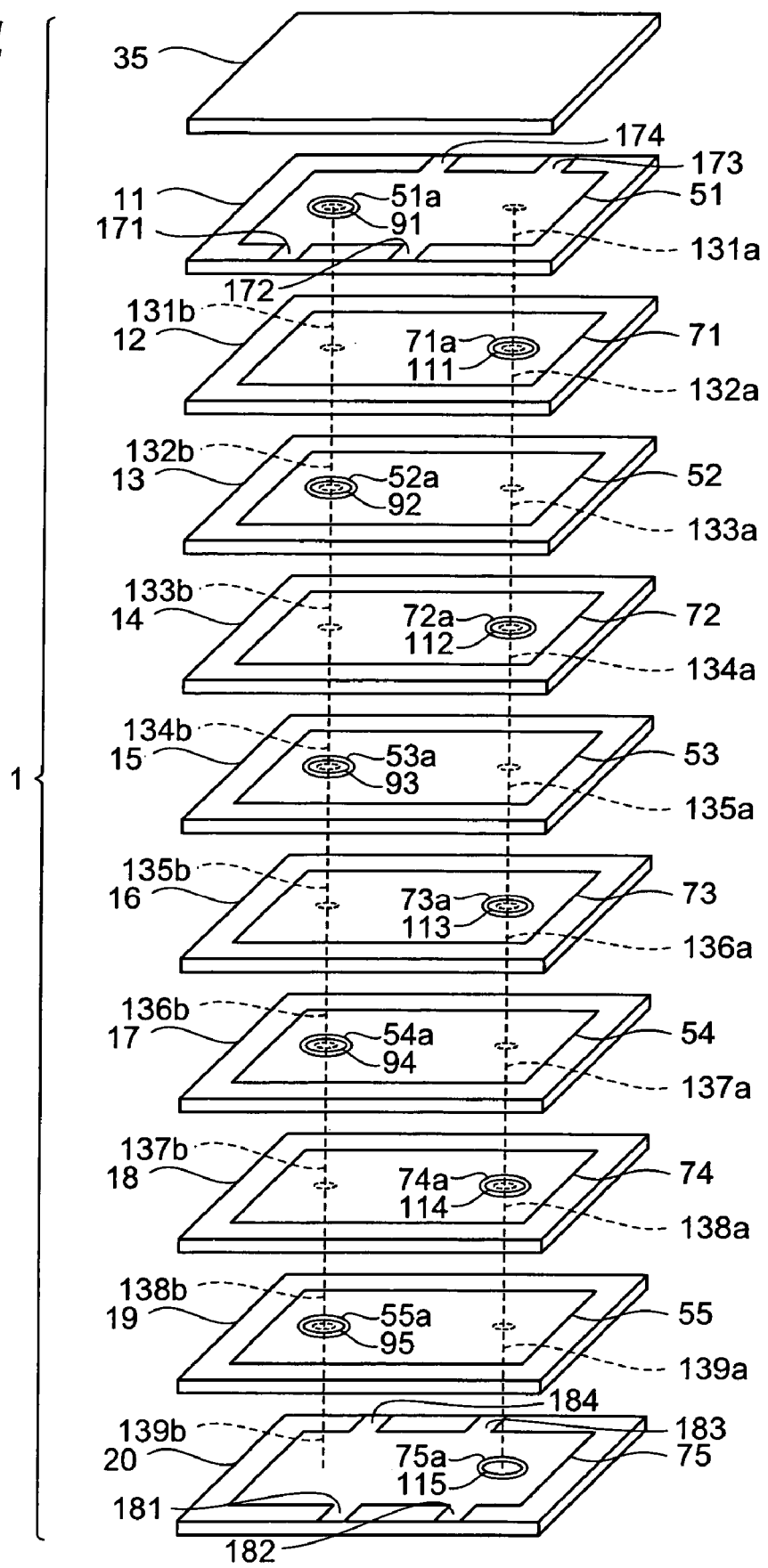
FIG. 24 is an exploded perspective view of the multilayer body included in the multilayer capacitor in accordance with a twentieth embodiment.

With reference to FIG. 24, the structure of the multilayer capacitor in accordance with a twentieth embodiment will now be explained. The multilayer capacitor in accordance with the twentieth embodiment differs from the multilayer capacitor in accordance with the sixteenth embodiment in terms of the number of first inner electrodes electrically connected to first terminal electrodes 3a to 3d via lead conductors 171 to 174 and the number of second inner electrodes electrically connected to second terminal electrodes 5a to 5d via lead conductors 181 to 184. FIG. 24 is an exploded perspective view of the multilayer body included in the multilayer capacitor in accordance with the twentieth embodiment.

As with the multilayer capacitor C1 in accordance with the first embodiment, the multilayer capacitor in accordance with the twentieth embodiment comprises a multilayer body 1, first terminal electrodes 3a to 3d formed on the multilayer body 1, and second terminal electrodes 5a to 5d similarly formed on the multilayer body 1, though they are not depicted.

In the multilayer capacitor in accordance with the twentieth embodiment, the number of first inner electrode 51 connected to the first terminal electrodes 3a to 3d via the lead conductors 171 to 174 is 1, which is smaller than the total number (5 in this embodiment) of first inner electrodes 51 to 55. In the multilayer capacitor in accordance with the twentieth embodiment, the number of second inner electrode 75 connected to the second terminal electrodes 5a to 5d via the lead conductors 181 to 184 is 1, which is smaller than the total number (5 in this embodiment) of second inner electrodes 71 to 75. As a consequence, the multilayer capacitor in accordance with the twentieth embodiment yields an equivalent series resistance greater than that of the conventional multilayer capacitor in which all the inner electrodes are connected to their corresponding terminal electrodes via lead conductors.

As in the foregoing, by adjusting the number of first inner electrode 51 connected to the first terminal electrodes 3a to 3d via the lead conductors 171 to 174 and the number of second inner electrode 75 connected to the second terminal electrodes 5a to 5d via the lead conductors 181 to 184, this embodiment sets the equivalent series resistance of the multilayer capacitor to a desirable value. As a result, the equivalent series resistance can be regulated easily with a high precision.

Twenty-First Embodiment

Figure 25:
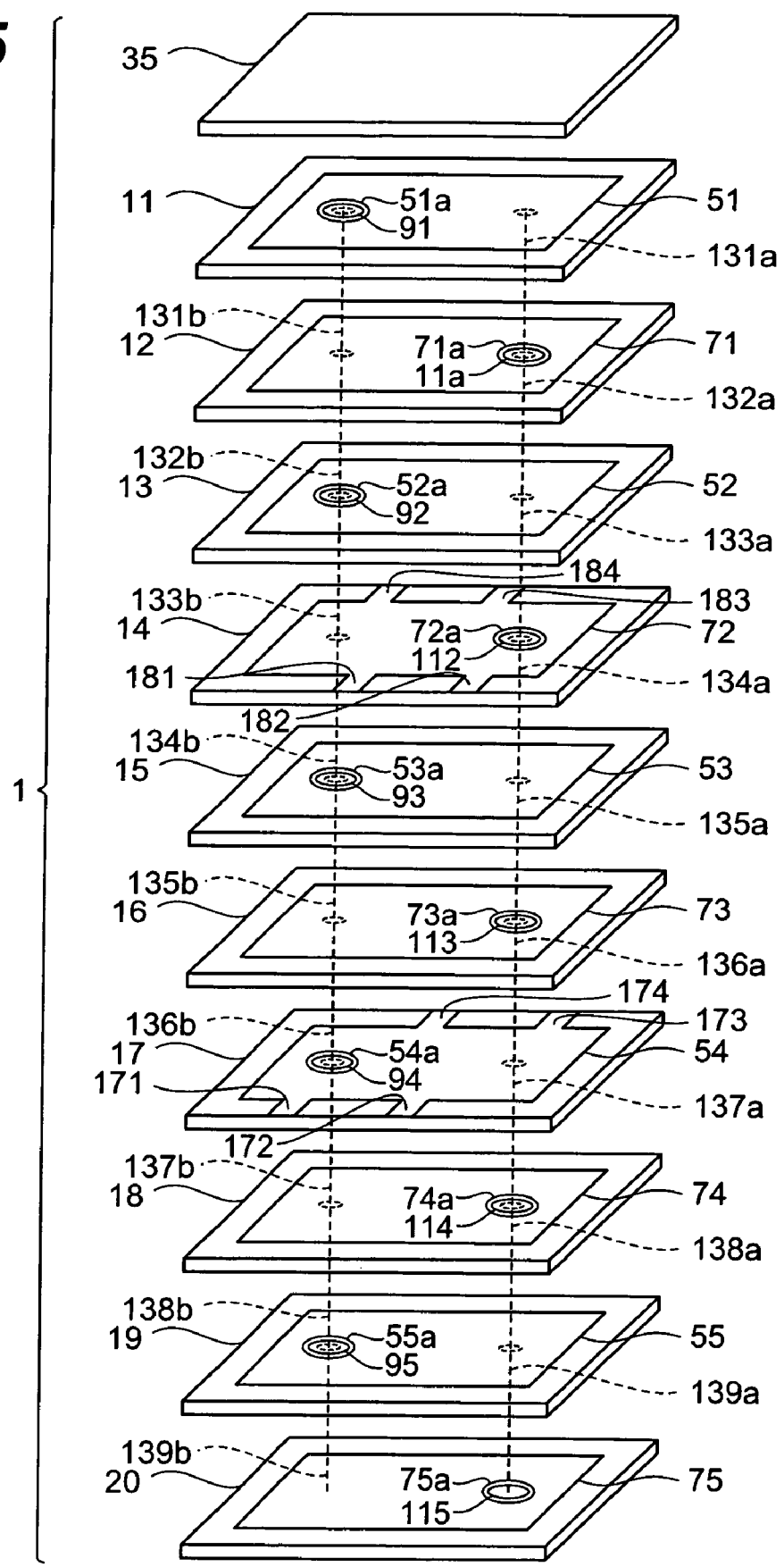
FIG. 25 is an exploded perspective view of the multilayer body included in the multilayer capacitor in accordance with a twenty-first embodiment.

With reference to FIG. 25, the structure of the multilayer capacitor in accordance with a twenty-first embodiment will now be explained. The multilayer capacitor in accordance with the twenty-first embodiment differs from the multilayer capacitor in accordance with the sixteenth embodiment in terms of the number and positions of first inner electrodes electrically connected to first terminal electrodes 3a to 3d via lead conductors 171 to 174 in the laminating direction and the number and positions of second inner electrodes electrically connected to second terminal electrodes 5a to 5d via lead conductors 181 to 184 in the laminating direction. FIG. 25 is an exploded perspective view of the multilayer body included in the multilayer capacitor in accordance with the twenty-first embodiment.

As with the multilayer capacitor C1 in accordance with the first embodiment, the multilayer capacitor in accordance with the twenty-first embodiment comprises a multilayer body 1, first terminal electrodes 3a to 3d formed on the multilayer body 1, and second terminal electrodes 5a to 5d similarly formed on the multilayer body 1, though they are not depicted.

In the multilayer capacitor in accordance with the twenty-first embodiment, the number of first inner electrode 54 connected to the first terminal electrodes 3a to 3d via the lead conductors 171 to 174 is 1, which is smaller than the total number (5 in this embodiment) of first inner electrodes 51 to 55. In the multilayer capacitor in accordance with the twenty-first embodiment, the number of second inner electrode 72 connected to the second terminal electrodes 5a to 5d via the lead conductors 181 to 184 is 1, which is smaller than the total number (5 in this embodiment) of second inner electrodes 71 to 75. As a consequence, the multilayer capacitor in accordance with the twenty-first embodiment yields an equivalent series resistance greater than that of the conventional multilayer capacitor in which all the inner electrodes are connected to their corresponding terminal electrodes via lead conductors.

As in the foregoing, by adjusting the number of first inner electrode 54 connected to the first terminal electrodes 3a to 3d via the lead conductors 171 to 174 and the number of second inner electrode 72 connected to the second terminal electrodes 5a to 5d via the lead conductors 181 to 184, this embodiment sets the equivalent series resistance of the multilayer capacitor to a desirable value. As a result, the equivalent series resistance can be regulated easily with a high precision.

Twenty-Second Embodiment

Figure 26:
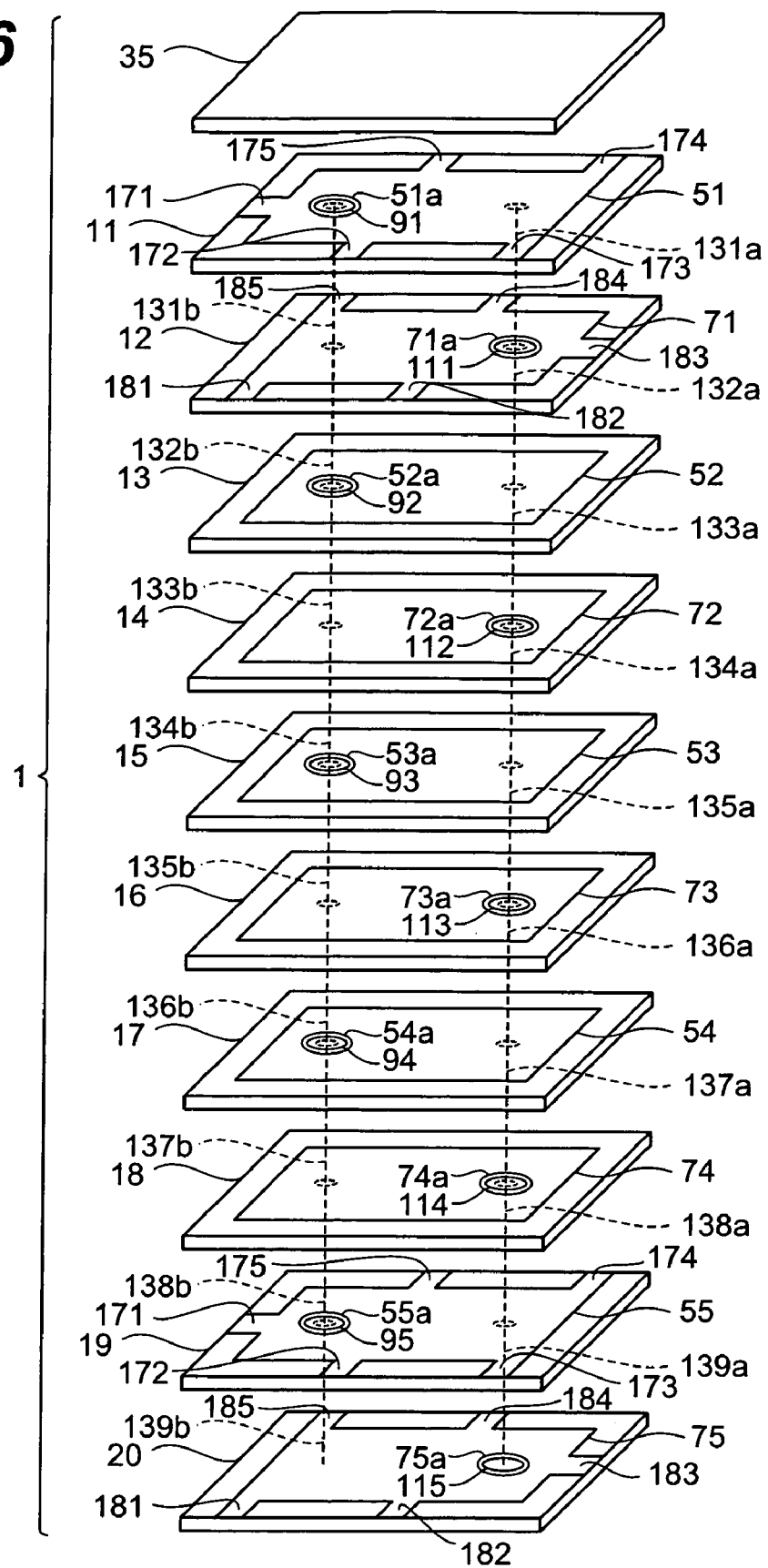
FIG. 26 is an exploded perspective view of the multilayer body included in the multilayer capacitor in accordance with a twenty-second embodiment.

With reference to FIG. 26, the structure of the multilayer capacitor in accordance with a twenty-second embodiment will be explained. The multilayer capacitor in accordance with the twenty-second embodiment differs from the multilayer capacitor C2 in accordance with the tenth embodiment in terms of the structure of the multilayer body 1. FIG. 26 is an exploded perspective view of the multilayer body included in the multilayer capacitor in accordance with the twenty-second embodiment.

As with the multilayer capacitor C2 in accordance with the tenth embodiment, the multilayer capacitor in accordance with the twenty-second embodiment comprises a multilayer body 1, first terminal electrodes 3a to 3e formed on the multilayer body 1, and second terminal electrodes 5a to 5e similarly formed on the multilayer body 1, though they are not depicted.

As is also shown in FIG. 26, the multilayer body 1 is constructed by alternately laminating a plurality of (11 in this embodiment) dielectric layers 11 to 20, 35 and a plurality of (5 each in this embodiment) first and second inner electrodes 51 to 55, 71 to 75. In the actual multilayer capacitor, the dielectric layers 11 to 20, 35 are integrated together to such an extent that their boundaries are indiscernible.

The first inner electrodes 51, 55 are electrically connected to the first terminal electrodes 3a to 3e via lead conductors 171 to 175. As a consequence, the first inner electrodes 52 to 54 are also electrically connected to the first terminal electrodes 3a to 3e, whereby the first inner electrodes 51 to 55 are connected in parallel. The lead conductor 171 is integrally formed with the first inner electrodes 51, 55, and extends therefrom so as to reach a side face 1c of the multilayer body 1. The lead conductors 172, 173 are integrally formed with the first inner electrodes 51, 55, and extend therefrom so as to reach a side face 1a of the multilayer body 1. The lead conductors 174, 175 are also integrally formed with the first inner electrodes 51, 55, and extend therefrom so as to reach a side face 1b of the multilayer body 1.

The second inner electrodes 71, 75 are electrically connected to the second terminal electrodes 5a to 5e via lead conductors 181 to 185. As a consequence, the second inner electrodes 72 to 74 are also electrically connected to the second terminal electrodes 5a to 5e, whereby the second inner electrodes 71 to 75 are connected in parallel. The lead conductors 181, 182 are integrally formed with the second inner electrodes 71, 75, and extend therefrom so as to reach the side face 1a of the multilayer body 1. The lead conductor 183 is integrally formed with the second inner electrodes 71, 75, and extends therefrom so as to reach a side face 1d of the multilayer body 1. The lead conductors 184, 185 are also integrally formed with the second inner electrodes 71, 75, and extend therefrom so as to reach the side face 1b of the multilayer body 1.

In the multilayer capacitor in accordance with the twenty-second embodiment, the number of first inner electrodes 51, 55 connected to the first terminal electrodes 3a to 3e via the lead conductors 171 to 175 is 2, which is smaller than the total number (5 in this embodiment) of the first inner electrodes 51 to 55. In the multilayer capacitor in accordance with the twenty-second embodiment, the number of second inner electrodes 71, 75 connected to the second terminal electrodes 5a to 5e via the lead conductors 181 to 185 is 2, which is smaller than the total number (5 in this embodiment) of the second inner electrodes 71 to 75. As a consequence, the multilayer capacitor in accordance with the twenty-second embodiment yields an equivalent series resistance greater than that of the conventional multilayer capacitor in which all the inner electrodes are connected to their corresponding terminal electrodes via lead conductors.

As in the foregoing, by adjusting the number of first inner electrodes 51, 55 electrically connected to the first terminal electrodes 3a to 3e via the lead conductors 171 to 175 and the number of second inner electrodes 71, 75 electrically connected to the second terminal electrodes 5a to 5e via the lead conductors 181 to 185, this embodiment sets the equivalent series resistance of the multilayer capacitor to a desirable value. As a result, the equivalent series resistance can be regulated easily with a high precision.

Twenty-Third Embodiment

Figure 27:
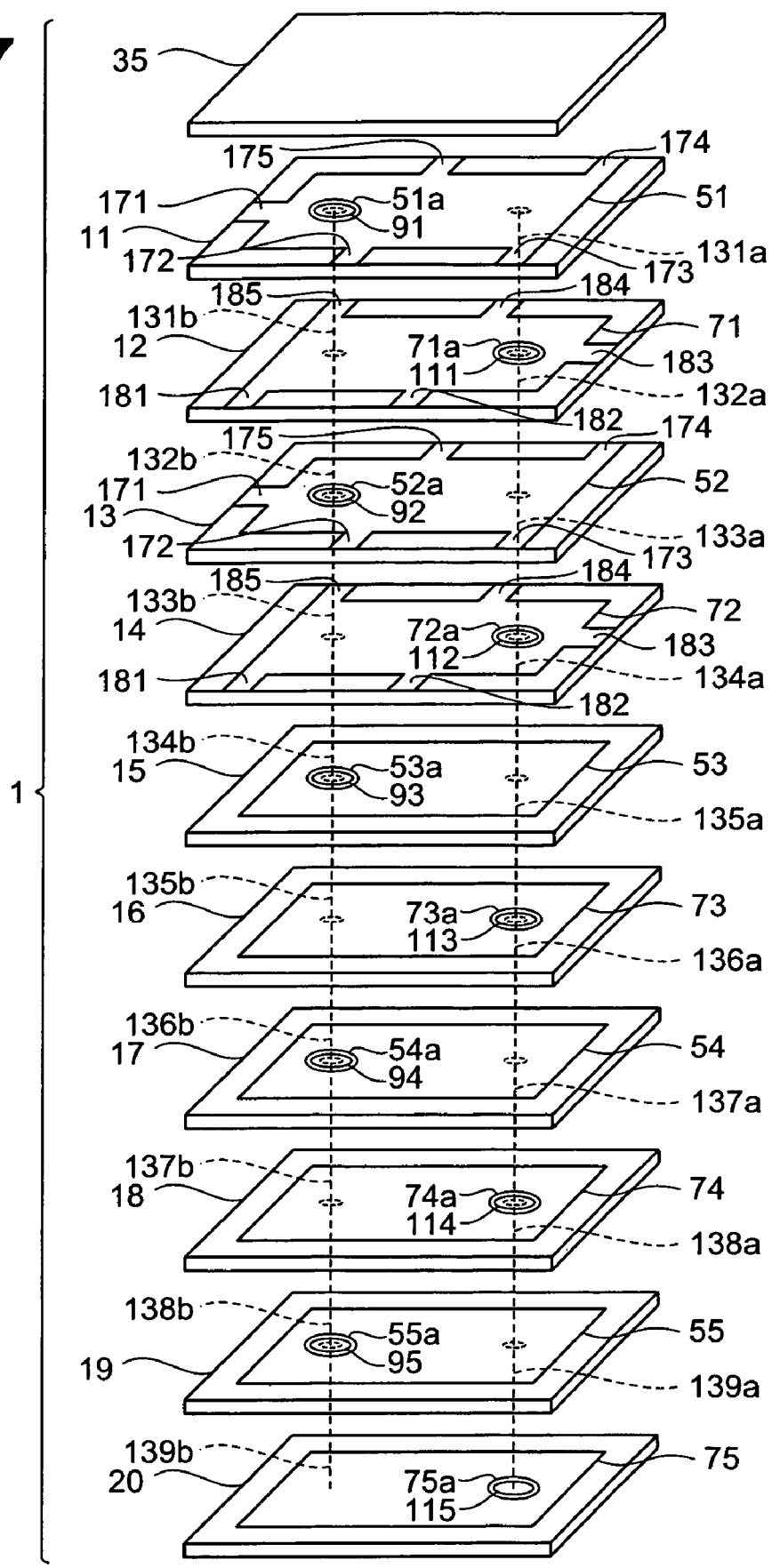
FIG. 27 is an exploded perspective view of the multilayer body included in the multilayer capacitor in accordance with a twenty-third embodiment.

With reference to FIG. 27, the structure of the multilayer capacitor in accordance with a twenty-third embodiment will now be explained. The multilayer capacitor in accordance with the twenty-third embodiment differs from the multilayer capacitor in accordance with the twenty-second embodiment in terms of positions of first inner electrodes electrically connected to first terminal electrodes 3a to 3e via lead conductors 171 to 175 in the laminating direction and positions of second inner electrodes electrically connected to second terminal electrodes 5a to 5e via lead conductors 181 to 185 in the laminating direction. FIG. 27 is an exploded perspective view of the multilayer body included in the multilayer capacitor in accordance with the twenty-third embodiment.

As with the multilayer capacitor C2 in accordance with the tenth embodiment, the multilayer capacitor in accordance with the twenty-third embodiment comprises a multilayer body 1, first terminal electrodes 3a to 3e formed on the multilayer body 1, and second terminal electrodes 5a to 5e similarly formed on the multilayer body 1, though they are not depicted.

A first inner electrode 52 is electrically connected to the first terminal electrodes 3a to 3e via the lead conductors 171 to 175. As a consequence, first inner electrodes 53 to 55 are also electrically connected to the first terminal electrodes 3a to 3e, whereby first inner electrodes 51 to 55 are connected in parallel. The lead conductor 171 is integrally formed with the first inner electrode 52, and extends therefrom so as to reach a side face 1c of the multilayer body 1. The lead conductors 172, 173 are integrally formed with the first inner electrode 52, and extend therefrom so as to reach a side face 1a of the multilayer body 1. The lead conductors 174, 175 are also integrally formed with the first inner electrode 52, and extend therefrom so as to reach a side face 1b of the multilayer body 1.

A first inner electrode 72 is electrically connected to the second terminal electrodes 5a to 5e via the lead conductors 181 to 185. As a consequence, second inner electrodes 73 to 75 are also electrically connected to the second terminal electrodes 5a to 5e, whereby second inner electrodes 71 to 75 are connected in parallel. The lead conductors 181, 182 are integrally formed with the second inner electrode 72, and extend therefrom so as to reach the side face 1a of the multilayer body 1. The lead conductor 183 is integrally formed with the second inner electrode 72, and extends therefrom so as to reach a side face 1d of the multilayer body 1. The lead conductors 184, 185 are integrally formed with the second inner electrode 72, and extend therefrom so as to reach the side face 1b of the multilayer body 1.

In the multilayer capacitor in accordance with the twenty-third embodiment, the number of first inner electrodes 51, 52 connected to the first terminal electrodes 3a to 3e via the lead conductors 171 to 175 is 2, which is smaller than the total number (5 in this embodiment) of the first inner electrodes 51 to 55. In the multilayer capacitor in accordance with the twenty-third embodiment, the number of second inner electrodes 71, 72 connected to the second terminal electrodes 5a to 5e via the lead conductors 181 to 185 is 2, which is smaller than the total number (5 in this embodiment) of the second inner electrodes 71 to 75. As a consequence, the multilayer capacitor in accordance with the twenty-third embodiment yields an equivalent series resistance greater than that of the conventional multilayer capacitor in which all the inner electrodes are connected to their corresponding terminal electrodes via lead conductors.

As in the foregoing, by adjusting the number of first inner electrodes 51, 52 electrically connected to the first terminal electrodes 3a to 3e via the lead conductors 171 to 175 and the number of second inner electrodes 71, 72 electrically connected to the second terminal electrodes 5a to 5e via the lead conductors 181 to 185, this embodiment sets the equivalent series resistance of the multilayer capacitor to a desirable value. As a result, the equivalent series resistance can be regulated easily with a high precision.

Twenty-Fourth Embodiment

Figure 28:
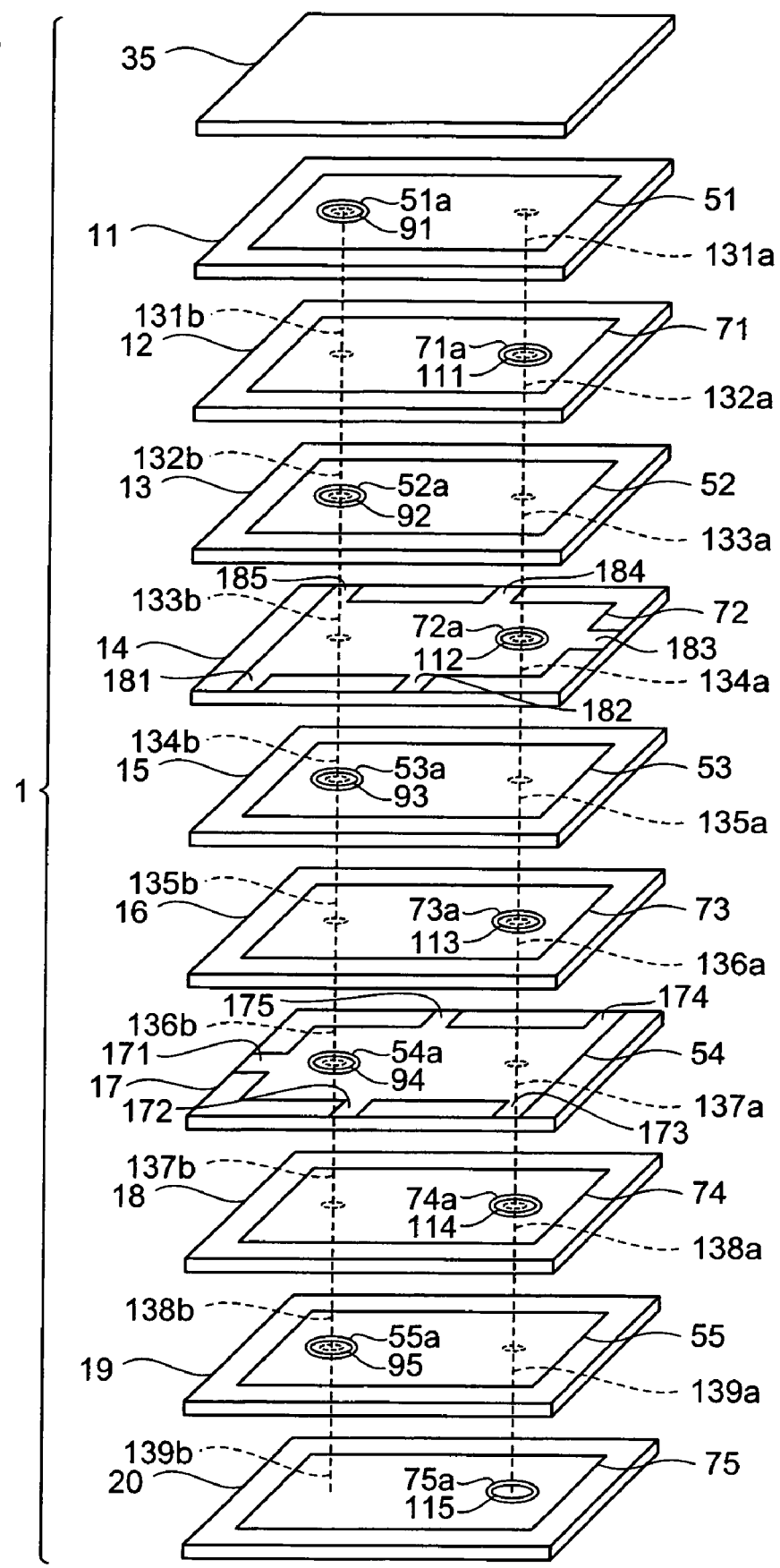
FIG. 28 is an exploded perspective view of the multilayer body included in the multilayer capacitor in accordance with a twenty-fourth embodiment.

With reference to FIG. 28, the structure of the multilayer capacitor in accordance with a twenty-fourth embodiment will now be explained. The multilayer capacitor in accordance with the twenty-fourth embodiment differs from the multilayer capacitor in accordance with the twenty-second embodiment in terms of the number and positions of first inner electrodes electrically connected to first terminal electrodes 3a to 3e via lead conductors 171 to 175 in the laminating direction and the number and positions of second inner electrodes electrically connected to second terminal electrodes 5a to 5e via lead conductors 181 to 185 in the laminating direction. FIG. 28 is an exploded perspective view of the multilayer body included in the multilayer capacitor in accordance with the twenty-fourth embodiment.

As with the multilayer capacitor C2 in accordance with the tenth embodiment, the multilayer capacitor in accordance with the twenty-fourth embodiment comprises a multilayer body 1, first terminal electrodes 3a to 3e formed on the multilayer body 1, and second terminal electrodes 5a to 5e similarly formed on the multilayer body 1, though they are not depicted.

In the multilayer capacitor in accordance with the twenty-fourth embodiment, the number of first inner electrode 54 connected to the first terminal electrodes 3a to 3e via the lead conductors 171 to 175 is 1, which is smaller than the total number (5 in this embodiment) of first inner electrodes 51 to 55. In the multilayer capacitor in accordance with the twenty-fourth embodiment, the number of second inner electrode 72 connected to the second terminal electrodes 5a to 5e via the lead conductors 181 to 185 is 1, which is smaller than the total number (5 in this embodiment) of second inner electrodes 71 to 75. As a consequence, the multilayer capacitor in accordance with the twenty-fourth embodiment yields an equivalent series resistance greater than that of the conventional multilayer capacitor in which all the inner electrodes are connected to their corresponding terminal electrodes via lead conductors.

As in the foregoing, by adjusting the number of first inner electrode 54 electrically connected to the first terminal electrodes 3a to 3e via the lead conductors 171 to 175 and the number of second inner electrode 72 electrically connected to the second terminal electrodes 5a to 5e via the lead conductors 181 to 185, this embodiment sets the equivalent series resistance of the multilayer capacitor to a desirable value. As a result, the equivalent series resistance can be regulated easily with a high precision.

Twenty-Fifth Embodiment

Figure 29:
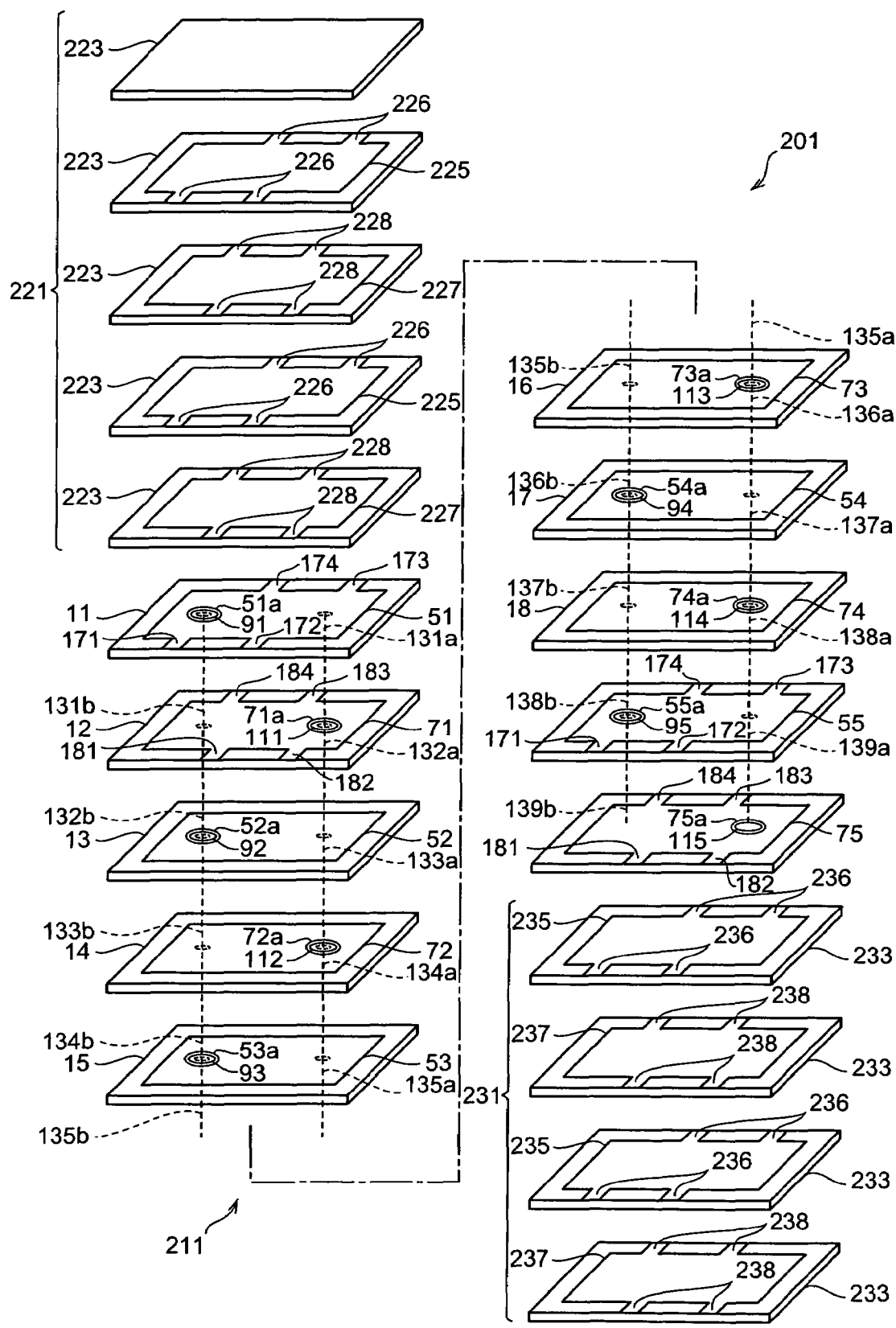
FIG. 29 is an exploded perspective view of the multilayer body included in the multilayer capacitor in accordance with a twenty-fifth embodiment.

With reference to FIG. 29, the structure of the multilayer capacitor in accordance with a twenty-fifth embodiment will be explained. The multilayer capacitor in accordance with the twenty-fifth embodiment differs from the multilayer capacitor C4 in accordance with the twelfth embodiment in terms of the structure of the multilayer body 201. FIG. 29 is an exploded perspective view of the multilayer body included in the multilayer capacitor in accordance with the twenty-fifth embodiment.

As with the multilayer capacitor C4 in accordance with the twelfth embodiment, the multilayer capacitor in accordance with the twenty-fifth embodiment comprises a multilayer body 201 including first to third capacitor portions 211, 221, 231, first terminal electrodes 3a to 3d formed on the multilayer body 1, and second terminal electrodes 5a to 5d similarly formed on the multilayer body 1, though they are not depicted.

To begin with, the structure of the first capacitor portion 211 will be explained. The first capacitor portion 211 has the same structure as that of the multilayer body 1 in the multilayer capacitor in accordance with the sixteenth embodiment except for a dielectric layer 35. Namely, the first capacitor portion 211 is constructed by alternately laminating a plurality of (11 in this embodiment) dielectric layers 11 to 20, 35 and a plurality of (5 each in this embodiment) first and second inner electrodes 51 to 55, 71 to 75. In the first multilayer capacitor 211, two first inner electrodes 51, 55 among the five first inner electrodes 51 to 55 are electrically connected to their corresponding first terminal electrodes 3a to 3d via lead conductors 171 to 174. Also, two second inner electrodes 71, 75 among the five second inner electrodes 71 to 75 are electrically connected to their corresponding second terminal electrodes 5a to 5d via lead conductors 181 to 184.

The structure of the second capacitor portion 221 will now be explained. The second capacitor portion 221 is constructed by alternately laminating a plurality of (5 in this embodiment) dielectric layers 223 and a plurality of (2 each in this embodiment) first and second inner electrodes 225, 227. The first inner electrodes 225 are electrically connected to the first terminal electrodes 3a to 3d via lead conductors 226. The lead conductors 226 are integrally formed with their corresponding first inner electrodes 225, and extend therefrom so as to reach side faces 201a, 201b of the multilayer body 201. The second inner electrodes 227 are electrically connected to the second terminal electrodes 5a to 5d via lead conductors 228. The lead conductors 228 are integrally formed with their corresponding second inner electrodes 227, and extend therefrom so as to reach the side faces 201a, 201b of the multilayer body 201.

The structure of the third capacitor portion 231 will now be explained. The third capacitor portion 231 is constructed by alternately laminating a plurality of (4 in this embodiment) dielectric layers 233 and a plurality of (2 each in this embodiment) first and second inner electrodes 235, 237. The first inner electrodes 235 are electrically connected to the first terminal electrodes 3a to 3d via lead conductors 236. The lead conductors 236 are integrally formed with their corresponding first inner electrodes 235, and extend therefrom so as to reach the side faces 201a, 201b of the multilayer body 201. The second inner electrodes 237 are electrically connected to the second terminal electrodes 5a to 5d via lead conductors 238. The lead conductors 238 are integrally formed with their corresponding second inner electrodes 237, and extend therefrom so as to reach the side faces 201a, 201b of the multilayer body 201.

Via the terminal electrodes 3a to 3d, the first inner electrodes 51, 55 of the first capacitor portion 211 are electrically connected to the first inner electrodes 225 of the second capacitor portion 221 and the first inner electrodes 235 of the third capacitor portion 231. Via the terminal electrodes 5a to 5d, the second inner electrode 71 of the first capacitor portion 211 is electrically connected to the second inner electrodes 227 of the second capacitor portion 221 and the second inner electrodes 237 of the third capacitor portion 231.

As in the foregoing, this embodiment has the first capacitor portion 211, and thus sets the equivalent series resistance of the multilayer capacitor to a desirable value as stated in the sixteenth embodiment. As a result, the equivalent series resistance can be regulated easily with a high precision.

Twenty-Sixth Embodiment

Figure 30:
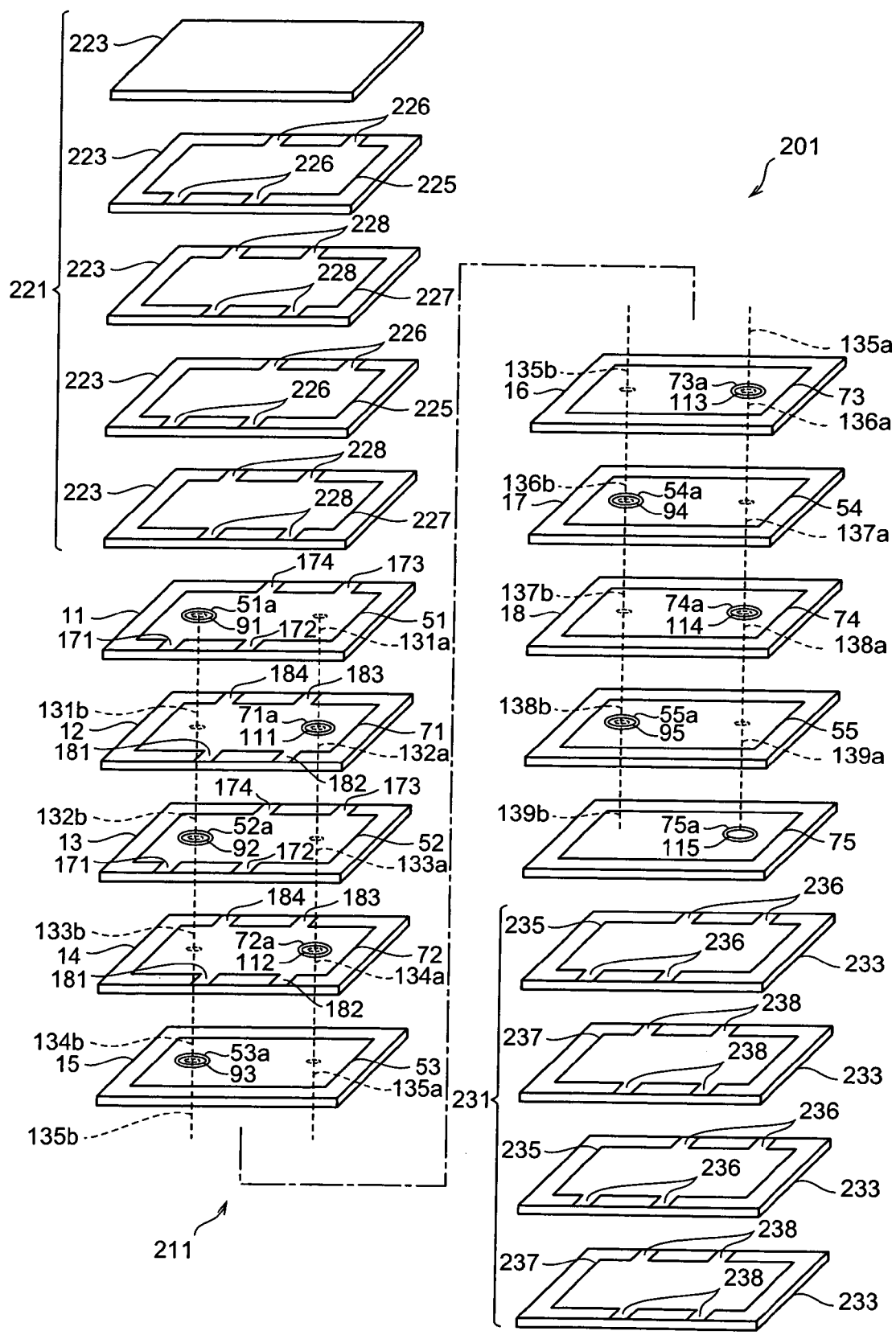
FIG. 30 is an exploded perspective view of the multilayer body included in the multilayer capacitor in accordance with a twenty-sixth embodiment.

With reference to FIG. 30, the structure of the multilayer capacitor in accordance with a twenty-sixth embodiment will be explained. The multilayer capacitor in accordance with the twenty-sixth embodiment differs from the multilayer capacitor in accordance with the twenty-fifth embodiment in terms of the structure of the first capacitor portion 211. FIG. 30 is an exploded perspective view of the multilayer body included in the multilayer capacitor in accordance with the twenty-sixth embodiment.

As with the multilayer capacitor C4 in accordance with the twelfth embodiment, the multilayer capacitor in accordance with the twenty-sixth embodiment comprises a multilayer body 201, first terminal electrodes 3a to 3d formed on the multilayer body 201, and second terminal electrodes 5a to 5d similarly formed on the multilayer body 201, though they are not depicted.

The first capacitor portion 211 has the same structure as that of the multilayer body 1 in accordance with the seventeenth embodiment except for a dielectric layer 35. Namely, the first capacitor portion 211 is constructed by alternately laminating a plurality of (11 in this embodiment) dielectric layers 11 to 20 and a plurality of (5 each in this embodiment) first and second inner electrodes 51 to 55, 71 to 75. In the first multilayer capacitor 211, two first inner electrodes 51, 52 among the five first inner electrodes 51 to 55 are electrically connected to their corresponding first terminal electrodes 3a to 3d via lead conductors 171 to 174. Also, two second inner electrodes 71, 72 among the five second inner electrodes 71 to 75 are electrically connected to their corresponding second terminal electrodes 5a to 5d via lead conductors 181 to 184.

As in the foregoing, this embodiment has the first capacitor portion 211, and thus sets the equivalent series resistance of the multilayer capacitor to a desirable value as stated in the seventeenth embodiment. As a result, the equivalent series resistance can be regulated easily with a high precision.

Twenty-Seventh Embodiment

Figure 31:
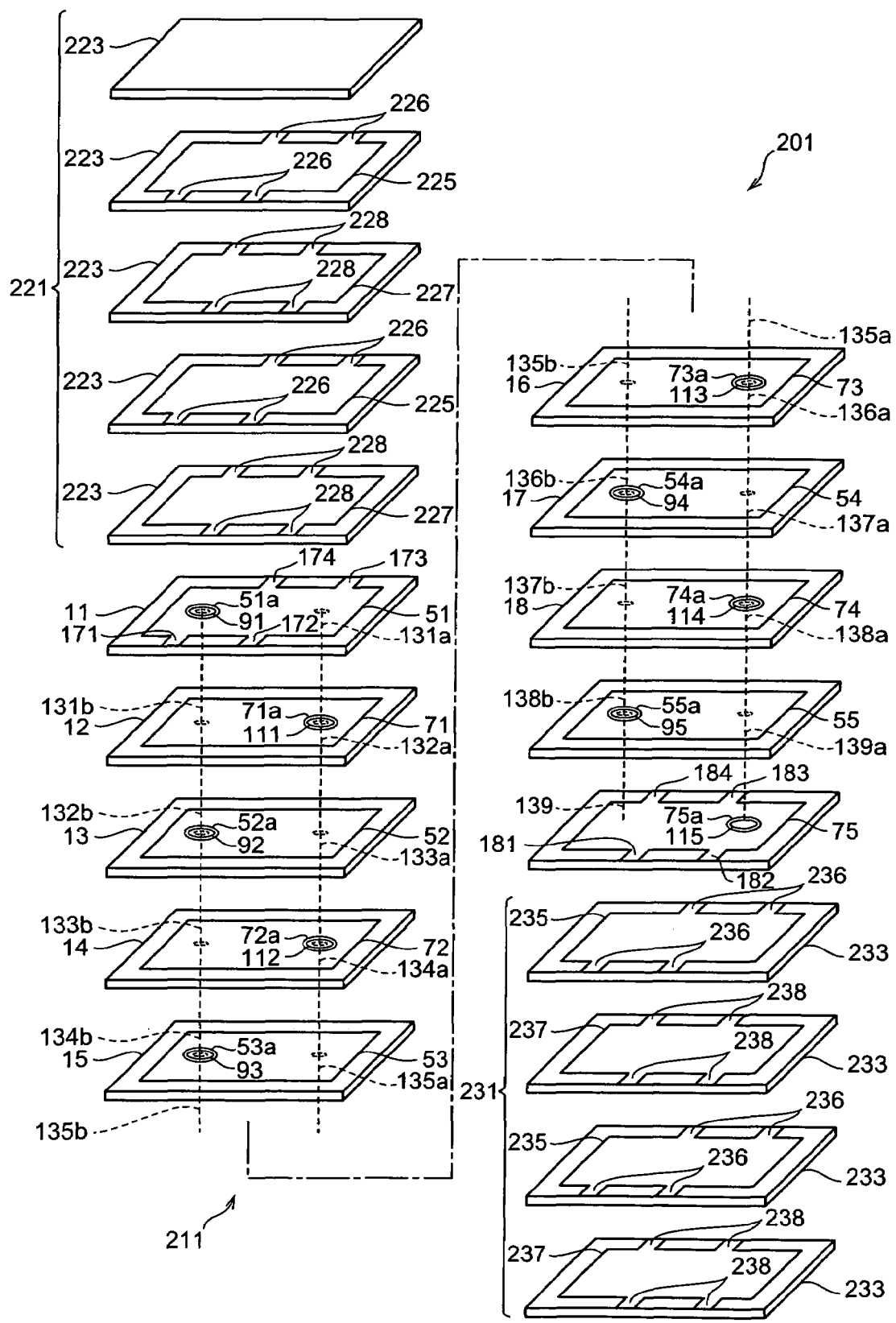
FIG. 31 is an exploded perspective view of the multilayer body included in the multilayer capacitor in accordance with a twenty-seventh embodiment.

With reference to FIG. 31, the structure of the multilayer capacitor in accordance with a twenty-seventh embodiment will be explained. The multilayer capacitor in accordance with the twenty-seventh embodiment differs from the multilayer capacitor in accordance with the twenty-fifth embodiment in terms of the structure of the first capacitor portion 211. FIG. 31 is an exploded perspective view of the multilayer body included in the multilayer capacitor in accordance with the twenty-seventh embodiment.

As with the multilayer capacitor C4 in accordance with the twelfth embodiment, the multilayer capacitor in accordance with the twenty-sixth embodiment comprises a multilayer body 201, first terminal electrodes 3a to 3d formed on the multilayer body 201, and second terminal electrodes 5a to 5d similarly formed on the multilayer body 201, though they are not depicted.

The first capacitor portion 211 has the same structure as that of the multilayer body 1 in accordance with the twentieth embodiment except for a dielectric layer 35. Namely, the first capacitor portion 211 is constructed by alternately laminating a plurality of (11 in this embodiment) dielectric layers 11 to 20 and a plurality of (5 each in this embodiment) first and second inner electrodes 51 to 55, 71 to 75. In the first multilayer capacitor 211, one first inner electrode 51 among the five first inner electrodes 51 to 55 is electrically connected to the first terminal electrodes 3a to 3d via lead conductors 171 to 174. Also, one second inner electrode 75 among the five second inner electrodes 71 to 75 is electrically connected to the second terminal electrodes 5a to 5d via lead conductors 181 to 184.

As in the foregoing, this embodiment has the first capacitor portion 211, and thus sets the equivalent series resistance of the multilayer capacitor to a desirable value as stated in the twentieth embodiment. As a result, the equivalent series resistance can be regulated easily with a high precision.

The first capacitor portion 211 may employ the same structure as that of the multilayer body 1 in accordance with any of the eighteenth, nineteenth, and twenty-first embodiments (except for the dielectric layer 35). The number of terminal electrodes may be increased, so that the first capacitor portion 211 may employ the same structure as that of the multilayer body 1 in accordance with any of the twenty-second to twenty-fourth embodiments (except for the dielectric layer 35).

Each of the first to twenty-seventh embodiments sets the equivalent series resistance of its corresponding multilayer capacitor to a desirable value by adjusting at least one of the number and position in the laminating direction of inner electrodes connected to the terminal electrodes 3a to 3f, 5a to 5f via the lead conductors 171 to 176, 181 to 186. As a result, the equivalent series resistance of each multilayer capacitor can be regulated easily with a high precision.

The number of first inner electrodes 51 to 69 mentioned above can be adjusted within the range of at least 1 but smaller than the total number of first inner electrodes 51 to 69 by 1. The number of second inner electrodes 71 to 89 mentioned above can be adjusted within the range of at least 1 but smaller than the total number of first inner electrodes 71 to 89 by 1. The number of first inner electrodes connected to the terminal electrodes 3a to 3f via the lead conductors 171 to 176 and the number of second inner electrodes connected to the terminal electrodes 5a to 5f via the lead conductors 181 to 186 may differ from each other.

Further, the number of through-hole conductors 131a to 167a, 131b to 167b may be adjusted such as to set the equivalent series resistance of each multilayer capacitor to a desirable value. In this case, the equivalent series resistance of each multilayer capacitor can be regulated with a higher precision.

FIG. 32 shows an example of adjustment of the number of through-hole conductors. The multilayer body of the multilayer capacitor shown in FIG. 32 sets the equivalent series resistance to a desirable value by employing two each of through-hole conductors 131a to 153a, 131b to 153b. Therefore, the first inner electrodes 51 to 62 are electrically connected to each other via two conductive paths, while the second inner electrodes 71 to 82 are electrically connected to each other via two conductive paths. Not only the multilayer capacitor in accordance with the second embodiment, but any of the multilayer capacitors in accordance with the first and third to twenty-seventh embodiments may employ a plurality of each of through-hole conductors 131a to 167a, 131b to 167b.

Though preferred embodiments of the present invention are explained in detail in the foregoing, the present invention is not limited to the above-mentioned embodiments and their modified examples. For example, the number of laminated dielectric layers 11 to 49, 223, 233 and the number of laminated first and second inner electrodes 51 to 69, 225, 235, 71 to 89, 227, 237 are not limited to those stated in the above-mentioned embodiments. The number of terminal electrodes 3a to 3f, 5a to 5f is not limited to those stated in the above-mentioned embodiments. The number and position in the laminating direction of inner electrodes connected to the terminal electrodes 3a to 3f, 5a to 5f via lead conductors 171 to 176, 181 to 186 are not limited to those stated in the above-mentioned embodiments. The number and position in the laminating direction of the first capacitor portion 211 are not limited to those stated in the above-mentioned embodiments.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A multilayer capacitor comprising a multilayer body in which a plurality of dielectric layers and a plurality of inner electrodes are alternately laminated, and a plurality of terminal electrodes formed on the multilayer body;
    wherein the plurality of inner electrodes include a plurality of first inner electrodes and a plurality of second inner electrodes alternately arranged;
    wherein the plurality of terminal electrodes include at least three terminal electrodes;
    wherein the plurality of first inner electrodes are electrically connected to each other via a through-hole conductor;
    wherein the plurality of second inner electrodes are electrically connected to each other via a through-hole conductor;
    wherein at least two first inner electrodes in the plurality of first inner electrodes are electrically connected via a lead conductor to at least two respective terminal electrodes whose number is smaller than the total number of the terminal electrodes by at least 1 in the at least three terminal electrodes;
    wherein at least one second inner electrode in the plurality of second inner electrodes is electrically connected via a lead conductor to the remainder of terminal electrodes other than the terminal electrodes electrically connected to the first inner electrodes via the lead conductor; and
    wherein an equivalent series resistance is set to a desirable value by adjusting the number of at least one species of the first and second inner electrodes electrically connected to the terminal electrodes via the lead conductors.

2. The multilayer capacitor according to claim 1, wherein the plurality of terminal electrodes include at least two first terminal electrodes and at least two second terminal electrodes;
    wherein the plurality of first inner electrodes are electrically connected to at least two first terminal electrodes via the lead conductor and through-hole conductor; and
    wherein the plurality of second inner electrodes are electrically connected to at least two second terminal electrodes via the lead conductor and through-hole conductor.

3. The multilayer capacitor according to claim 1, wherein the equivalent series resistance is set to the desirable value by further adjusting the number of through-hole conductors electrically connecting the plurality of first inner electrodes to each other and the number of through-hole conductors electrically connecting the plurality of second inner electrodes to each other.

4. The multilayer capacitor according to claim 1, wherein the plurality of first inner electrodes are connected in parallel; and
    wherein the plurality of second inner electrodes are connected in parallel.

5. A multilayer capacitor comprising a multilayer body in which a plurality of dielectric layers and a plurality of inner electrodes are alternately laminated, and a plurality of terminal electrodes formed on the multilayer body;
    wherein the plurality of inner electrodes include a plurality of first inner electrodes and a plurality of second inner electrodes alternately arranged;
    wherein the plurality of terminal electrodes include at least three terminal electrodes;
    wherein the plurality of first inner electrodes are electrically connected to each other via a through-hole conductor;
    wherein the plurality of second inner electrodes are electrically connected to each other via a through-hole conductor;
    wherein at least two first inner electrodes in the plurality of first inner electrodes are electrically connected via a lead conductor to at least two respective terminal electrodes whose number is smaller than the total number of the terminal electrodes by at least 1 in the at least three terminal electrodes;
    wherein at least one second inner electrode in the plurality of second inner electrodes is electrically connected via a lead conductor to the remainder of terminal electrodes other than the terminal electrodes electrically connected to the first inner electrodes via the lead conductor; and
    wherein an equivalent series resistance is set to a desirable value by adjusting a position of at least one species of the first and second inner electrodes electrically connected to the terminal electrodes via the lead conductors in the laminating direction of the multilayer body.

6. The multilayer capacitor according to claim 5, wherein the plurality of terminal electrodes include at least two first terminal electrodes and at least two second terminal electrodes;
    wherein the plurality of first inner electrodes are electrically connected to at least two first terminal electrodes via the lead conductor and through-hole conductor; and
    wherein the plurality of second inner electrodes are electrically connected to at least two second terminal electrodes via the lead conductor and through-hole conductor.

7. The multilayer capacitor according to claim 5, wherein the equivalent series resistance is set to the desirable value by further adjusting the number of through-hole conductors electrically connecting the plurality of first inner electrodes to each other and the number of through-hole conductors electrically connecting the plurality of second inner electrodes to each other.

8. The multilayer capacitor according to claim 5, wherein the plurality of first inner electrodes are connected in parallel; and
    wherein the plurality of second inner electrodes are connected in parallel.

9. A multilayer capacitor comprising a multilayer body in which a plurality of dielectric layers and a plurality of inner electrodes are alternately laminated, and a plurality of terminal electrodes formed on the multilayer body;
    wherein the plurality of inner electrodes include a plurality of first inner electrodes and a plurality of second inner electrodes alternately arranged;
    wherein the plurality of terminal electrodes include at least three terminal electrodes;
    wherein the plurality of first inner electrodes are electrically connected to each other via a through-hole conductor;
    wherein the plurality of second inner electrodes are electrically connected to each other via a through-hole conductor;
    wherein at least one first inner electrode in the plurality of first inner electrodes is electrically connected via a lead conductor to at least two terminal electrodes whose number is smaller than the total number of the terminal electrodes by at least 1 in the at least three terminal electrodes;

wherein at least one second inner electrode in the plurality of second inner electrodes is electrically connected via a lead conductor to the remainder of terminal electrodes other than the terminal electrodes electrically connected to the first inner electrode via the lead conductor; and wherein an equivalent series resistance is set to a desirable value by adjusting the number of at least one species of the first and second inner electrodes electrically connected to the terminal electrodes via the lead conductors.

10. The multilayer capacitor according to claim 9, wherein the plurality of terminal electrodes include at least two first terminal electrodes and at least two second terminal electrodes;

wherein the plurality of first inner electrodes are electrically connected to at least two first terminal electrodes via the lead conductor and through-hole conductor; and wherein the plurality of second inner electrodes are electrically connected to at least two second terminal electrodes via the lead conductor and through-hole conductor.

11. The multilayer capacitor according to claim 9, wherein the equivalent series resistance is set to the desirable value by further adjusting the number of through-hole conductors electrically connecting the plurality of first inner electrodes to each other and the number of through-hole conductors electrically connecting the plurality of second inner electrodes to each other.

12. The multilayer capacitor according to claim 9, wherein the plurality of first inner electrodes are connected in parallel; and wherein the plurality of second inner electrodes are connected in parallel.

13. A multilayer capacitor comprising a multilayer body in which a plurality of dielectric layers and a plurality of inner electrodes are alternately laminated, and a plurality of terminal electrodes formed on the multilayer body;

wherein the plurality of inner electrodes include a plurality of first inner electrodes and a plurality of second inner electrodes alternately arranged;

wherein the plurality of terminal electrodes include at least three terminal electrodes;

wherein the plurality of first inner electrodes are electrically connected to each other via a through-hole conductor;

wherein the plurality of second inner electrodes are electrically connected to each other via a through-hole conductor;

wherein at least one first inner electrode in the plurality of first inner electrodes is electrically connected via a lead conductor to at least two terminal electrodes whose number is smaller than the total number of the terminal electrodes by at least 1 in the at least three terminal electrodes;

wherein at least one second inner electrode in the plurality of second inner electrodes is electrically connected via a lead conductor to the remainder of terminal electrodes other than the terminal electrodes electrically connected to the first inner electrode via the lead conductor; and wherein an equivalent series resistance is set to a desirable value by adjusting a position of at least one species of the first and second inner electrodes electrically connected to the terminal electrodes via the lead conductors in the laminating direction of the multilayer body.

14. The multilayer capacitor according to claim 13, wherein the plurality of terminal electrodes include at least two first terminal electrodes and at least two second terminal electrodes;

wherein the plurality of first inner electrodes are electrically connected to at least two first terminal electrodes via the lead conductor and through-hole conductor; and wherein the plurality of second inner electrodes are electrically connected to at least two second terminal electrodes via the lead conductor and through-hole conductor.

15. The multilayer capacitor according to claim 13, wherein the equivalent series resistance is set to the desirable value by further adjusting the number of through-hole conductors electrically connecting the plurality of first inner electrodes to each other and the number of through-hole conductors electrically connecting the plurality of second inner electrodes to each other.

16. The multilayer capacitor according to claim 13, wherein the plurality of first inner electrodes are connected in parallel; and wherein the plurality of second inner electrodes are connected in parallel.

17. A multilayer capacitor comprising a multilayer body in which a plurality of dielectric layers and a plurality of inner electrodes are alternately laminated, and a plurality of terminal electrodes formed on the multilayer body;

the multilayer capacitor having a capacitor portion including a first number of first inner electrodes and a second number of second inner electrodes alternately arranged as the plurality of inner electrodes;

wherein the first number of first inner electrodes are electrically connected to each other via a through-hole conductor;

wherein the second number of second inner electrodes are electrically connected to each other via a through-hole conductor;

wherein, in the first number of first inner electrodes, at least one first inner electrode whose number is smaller than the first number by at least 1 is connected via a lead conductor to the respective terminal electrode in the plurality of terminal electrodes;

wherein, in the second number of second inner electrodes, at least one second inner electrode whose number is smaller than the second number by at least 1 is connected via a lead conductor to the respective terminal electrode in the remainder of terminal electrodes other than the terminal electrode electrically connected to the first inner electrode via the lead conductor; and wherein an equivalent series resistance is set to a desirable value by adjusting the number of at least one species of the first and second inner electrodes electrically connected to the terminal electrodes via the lead conductors.

18. The multilayer capacitor according to claim 17, wherein the equivalent series resistance is set to the desirable value by further adjusting the number of through-hole conductors electrically connecting the plurality of first inner electrodes to each other and the number of through-hole conductors electrically connecting the plurality of second inner electrodes to each other.

19. The multilayer capacitor according to claim 17, wherein the plurality of first inner electrodes are connected in parallel; and wherein the plurality of second inner electrodes are connected in parallel.

20. A multilayer capacitor comprising a multilayer body in which a plurality of dielectric layers and a plurality of inner electrodes are alternately laminated, and a plurality of terminal electrodes formed on the multilayer body;
the multilayer capacitor having a capacitor portion including a first number of first inner electrodes and a second number of second inner electrodes alternately arranged as the plurality of inner electrodes;
wherein the first number of first inner electrodes are electrically connected to each other via a through-hole conductor;
wherein the second number of second inner electrodes are electrically connected to each other via a through-hole conductor;
wherein, in the first number of first inner electrodes, at least one first inner electrode whose number is smaller than the first number by at least 1 is connected via a lead conductor to the respective terminal electrode in the plurality of terminal electrodes;
wherein, in the second number of second inner electrodes, at least one second inner electrode whose number is smaller than the second number by at least 1 is connected via a lead conductor to the respective terminal electrode in the remainder of terminal electrodes other than the terminal electrode electrically connected to the first inner electrode via the lead conductor; and
wherein an equivalent series resistance is set to a desirable value by adjusting a position of at least one species of the first and second inner electrodes electrically connected to the terminal electrodes via the lead conductors in the laminating direction of the multilayer body.

21. The multilayer capacitor according to claim 20, wherein the equivalent series resistance is set to the desirable value by further adjusting the number of through-hole conductors electrically connecting the plurality of first inner electrodes to each other and the number of through-hole conductors electrically connecting the plurality of second inner electrodes to each other.

22. The multilayer capacitor according to claim 20, wherein the plurality of first inner electrodes are connected in parallel; and
wherein the plurality of second inner electrodes are connected in parallel.

23. A multilayer capacitor comprising a multilayer body in which a plurality of dielectric layers and a plurality of inner electrodes are alternately laminated, and a plurality of terminal electrodes formed on the multilayer body;
the multilayer capacitor having a capacitor portion including a first number of first inner electrodes and a second number of second inner electrodes alternately arranged as the plurality of inner electrodes;
wherein the first number of first inner electrodes are electrically connected to each other via a through-hole conductor;
wherein the second number of second inner electrodes are electrically connected to each other via a through-hole conductor;
wherein, in the first number of first inner electrodes, at least one first inner electrode whose number is smaller than the first number by at least 1 is connected via a lead conductor to at least one terminal electrode in the plurality of terminal electrodes;
wherein, in the second number of second inner electrodes, at least one second inner electrode whose number is smaller than the second number by at least 1 is connected via a lead conductor to at least one terminal electrode in the remainder of terminal electrodes other than the terminal electrode electrically connected to the first inner electrode via the lead conductor; and
wherein an equivalent series resistance is set to a desirable value by adjusting the number of at least one species of the first and second inner electrodes electrically connected to the terminal electrodes via the lead conductors.

24. The multilayer capacitor according to claim 23, wherein the equivalent series resistance is set to the desirable value by further adjusting the number of through-hole conductors electrically connecting the plurality of first inner electrodes to each other and the number of through-hole conductors electrically connecting the plurality of second inner electrodes to each other.

25. The multilayer capacitor according to claim 23, wherein the plurality of first inner electrodes are connected in parallel; and
wherein the plurality of second inner electrodes are connected in parallel.

26. A multilayer capacitor comprising a multilayer body in which a plurality of dielectric layers and a plurality of inner electrodes are alternately laminated, and a plurality of terminal electrodes formed on the multilayer body;
the multilayer capacitor having a capacitor portion including a first number of first inner electrodes and a second number of second inner electrodes alternately arranged as the plurality of inner electrodes;
wherein the first number of first inner electrodes are electrically connected to each other via a through-hole conductor;
wherein the second number of second inner electrodes are electrically connected to each other via a through-hole conductor;
wherein, in the first number of first inner electrodes, at least one first inner electrode whose number is smaller than the first number by at least 1 is connected via a lead conductor to at least one terminal electrode in the plurality of terminal electrodes;
wherein, in the second number of second inner electrodes, at least one second inner electrode whose number is smaller than the second number by at least 1 is connected via a lead conductor to at least one terminal electrode in the remainder of terminal electrodes other than the terminal electrode electrically connected to the first inner electrode via the lead conductor; and
wherein an equivalent series resistance is set to a desirable value by adjusting a position of at least one species of the first and second inner electrodes electrically connected to the terminal electrodes via the lead conductors in the laminating direction of the multilayer body.

27. The multilayer capacitor according to claim 26, wherein the equivalent series resistance is set to the desirable value by further adjusting the number of through-hole conductors electrically connecting the plurality of first inner electrodes to each other and the number of through-hole conductors electrically connecting the plurality of second inner electrodes to each other.

28. The multilayer capacitor according to claim 26, wherein the plurality of first inner electrodes are connected in parallel; and
wherein the plurality of second inner electrodes are connected in parallel.

29. A method of adjusting an equivalent series resistance of a multilayer capacitor comprising a multilayer body in which a plurality of dielectric layers and a plurality of inner electrodes are alternately laminated, and a plurality of terminal electrodes formed on the multilayer body;

wherein the plurality of inner electrodes include a plurality of first inner electrodes and a plurality of second inner electrodes alternately arranged; and wherein the plurality of terminal electrodes include at least three terminal electrodes;

the method comprising the steps of:

electrically connecting the plurality of first inner electrodes to each other via a through-hole conductor;

electrically connecting the plurality of second inner electrodes to each other via a through-hole conductor;

electrically connecting, in the plurality of first inner electrodes, at least two first inner electrodes via a lead conductor to at least two respective terminal electrodes whose number is smaller than the total number of the terminal electrodes by at least 1 in the at least three terminal electrodes;

electrically connecting, in the plurality of second inner electrodes, at least one second inner electrode via a lead conductor to the remainder of terminal electrodes other than the terminal electrodes electrically connected to the first inner electrodes; and setting the equivalent series resistance to a desirable value by adjusting the number of at least one species of the first and second inner electrodes electrically connected to the terminal electrodes via the lead conductors.

30. A method of adjusting an equivalent series resistance of a multilayer capacitor comprising a multilayer body in which a plurality of dielectric layers and a plurality of inner electrodes are alternately laminated, and a plurality of terminal electrodes formed on the multilayer body;

wherein the plurality of inner electrodes include a plurality of first inner electrodes and a plurality of second inner electrodes alternately arranged; and wherein the plurality of terminal electrodes include at least three terminal electrodes;

the method comprising the steps of:

electrically connecting the plurality of first inner electrodes to each other via a through-hole conductor;

electrically connecting the plurality of second inner electrodes to each other via a through-hole conductor;

electrically connecting, in the plurality of first inner electrodes, at least two first inner electrodes via a lead conductor to at least two respective terminal electrodes whose number is smaller than the total number of the terminal electrodes by at least 1 in the at least three terminal electrodes;

electrically connecting, in the plurality of second inner electrodes, at least one second inner electrode via a lead conductor to the remainder of terminal electrodes other than the terminal electrodes electrically connected to the first inner electrodes; and setting the equivalent series resistance to a desirable value by adjusting a position of at least one species of the first and second inner electrodes electrically connected to the terminal electrodes via the lead conductors in the laminating direction of the multilayer body.

31. A method of adjusting an equivalent series resistance of a multilayer capacitor comprising a multilayer body in which a plurality of dielectric layers and a plurality of inner electrodes are alternately laminated, and a plurality of terminal electrodes formed on the multilayer body;

wherein the plurality of inner electrodes include a plurality of first inner electrodes and a plurality of second inner electrodes alternately arranged; and wherein the plurality of terminal electrodes include at least three terminal electrodes;

the method comprising the steps of:

electrically connecting the plurality of first inner electrodes to each other via a through-hole conductor;

electrically connecting the plurality of second inner electrodes to each other via a through-hole conductor;

electrically connecting, in the plurality of first inner electrodes, at least one first inner electrode via a lead conductor to at least two terminal electrodes whose number is smaller than the total number of the terminal electrodes by at least 1 in the at least three terminal electrodes;

electrically connecting, in the plurality of second inner electrodes, at least one second inner electrode via a lead conductor to the remainder of terminal electrodes other than the terminal electrodes electrically connected to the first inner electrode; and setting the equivalent series resistance to a desirable value by adjusting the number of at least one species of the first and second inner electrodes electrically connected to the terminal electrodes via the lead conductors.

32. A method of adjusting an equivalent series resistance of a multilayer capacitor comprising a multilayer body in which a plurality of dielectric layers and a plurality of inner electrodes are alternately laminated, and a plurality of terminal electrodes formed on the multilayer body;

wherein the plurality of inner electrodes include a plurality of first inner electrodes and a plurality of second inner electrodes alternately arranged; and wherein the plurality of terminal electrodes include at least three terminal electrodes;

the method comprising the steps of:

electrically connecting the plurality of first inner electrodes to each other via a through-hole conductor;

electrically connecting the plurality of second inner electrodes to each other via a through-hole conductor;

electrically connecting, in the plurality of first inner electrodes, at least one first inner electrode via a lead conductor to at least two terminal electrodes whose number is smaller than the total number of the terminal electrodes by at least 1 in the at least three terminal electrodes;

electrically connecting, in the plurality of second inner electrodes, at least one second inner electrode via a lead conductor to the remainder of terminal electrodes other than the terminal electrodes electrically connected to the first inner electrode; and setting the equivalent series resistance to a desirable value by adjusting a position of at least one species of the first and second inner electrodes electrically connected to the terminal electrodes via the lead conductors in the laminating direction of the multilayer body.

33. A method of adjusting an equivalent series resistance of a multilayer capacitor comprising a multilayer body in which a plurality of dielectric layers and a plurality of inner electrodes are alternately laminated, and a plurality of terminal electrodes formed on the multilayer body; the multilayer capacitor having a capacitor portion including a first number of first inner electrodes and a second number of second inner electrodes alternately arranged as the plurality of inner electrodes;

the method comprising the steps of:

electrically connecting the first number of first inner electrodes to each other via a through-hole conductor;

electrically connecting the second number of second inner electrodes to each other via a through-hole conductor;

electrically connecting via a lead conductor, in the first number of first inner electrodes, at least one first inner electrode whose number is smaller than the first number by at least 1 to the respective terminal electrode in the plurality of terminal electrodes;

electrically connecting via a lead conductor, in the second number of second inner electrodes, at least one second inner electrode whose number is smaller than the second number by at least 1 to the respective terminal electrode in the remainder of terminal electrodes other than the terminal electrode electrically connected to the first inner electrode via the lead conductor; and setting the equivalent series resistance to a desirable value by adjusting the number of at least one species of the first and second inner electrodes electrically connected to the terminal electrodes via the lead conductors.

34. A method of adjusting an equivalent series resistance of a multilayer capacitor comprising a multilayer body in which a plurality of dielectric layers and a plurality of inner electrodes are alternately laminated, and a plurality of terminal electrodes formed on the multilayer body;

the multilayer capacitor having a capacitor portion including a first number of first inner electrodes and a second number of second inner electrodes alternately arranged as the plurality of inner electrodes;

the method comprising the steps of:

electrically connecting the first number of first inner electrodes to each other via a through-hole conductor;

electrically connecting the second number of second inner electrodes to each other via a through-hole conductor;

electrically connecting via a lead conductor, in the first number of first inner electrodes, at least one first inner electrode whose number is smaller than the first number by at least 1 to the respective terminal electrode in the plurality of terminal electrodes;

electrically connecting via a lead conductor, in the second number of second inner electrodes, at least one second inner electrode whose number is smaller than the second number by at least 1 to the respective terminal electrode in the remainder of terminal electrodes other than the terminal electrode electrically connected to the first inner electrode via the lead conductor; and setting the equivalent series resistance to a desirable value by adjusting a position of at least one species of the first and second inner electrodes electrically connected to the terminal electrodes via the lead conductors in the laminating direction of the multilayer body.

35. A method of adjusting an equivalent series resistance of a multilayer capacitor comprising a multilayer body in which a plurality of dielectric layers and a plurality of inner electrodes are alternately laminated, and a plurality of terminal electrodes formed on the multilayer body;

the multilayer capacitor having a capacitor portion including a first number of first inner electrodes and a second number of second inner electrodes alternately arranged as the plurality of inner electrodes;

the method comprising the steps of:

electrically connecting the first number of first inner electrodes to each other via a through-hole conductor;

electrically connecting the second number of second inner electrodes to each other via a through-hole conductor;

electrically connecting via a lead conductor, in the first number of first inner electrodes, at least one first inner electrode whose number is smaller than the first number by at least 1 to at least one terminal electrode in the plurality of terminal electrodes;

electrically connecting via a lead conductor, in the second number of second inner electrodes, at least one second inner electrode whose number is smaller than the second number by at least 1 to at least one terminal electrode in the remainder of terminal electrodes other than the terminal electrode electrically connected to the first inner electrode via the lead conductor; and setting the equivalent series resistance to a desirable value by adjusting the number of at least one species of the first and second inner electrodes electrically connected to the terminal electrodes via the lead conductors.

36. A method of adjusting an equivalent series resistance of a multilayer capacitor comprising a multilayer body in which a plurality of dielectric layers and a plurality of inner electrodes are alternately laminated, and a plurality of terminal electrodes formed on the multilayer body;

the multilayer capacitor having a capacitor portion including a first number of first inner electrodes and a second number of second inner electrodes alternately arranged as the plurality of inner electrodes;

the method comprising the steps of:

electrically connecting the first number of first inner electrodes to each other via a through-hole conductor;

electrically connecting the second number of second inner electrodes to each other via a through-hole conductor;

electrically connecting via a lead conductor, in the first number of first inner electrodes, at least one first inner electrode whose number is smaller than the first number by at least 1 to at least one terminal electrode in the plurality of terminal electrodes;

electrically connecting via a lead conductor, in the second number of second inner electrodes, at least one second inner electrode whose number is smaller than the second number by at least 1 to at least one terminal electrode in the remainder of terminal electrodes other than the terminal electrode electrically connected to the first inner electrode via the lead conductor; and setting the equivalent series resistance to a desirable value by adjusting a position of at least one species of the first and second inner electrodes electrically connected to the terminal electrodes via the lead conductors in the laminating direction of the multilayer body.

* * * * *